(12) United States Patent
Kadota

(10) Patent No.: US 7,337,225 B2
(45) Date of Patent: Feb. 26, 2008

(54) INFORMATION PROCESSING APPARATUS, ITS CONTROL METHOD, AND PROGRAM

(75) Inventor: Shigehiro Kadota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 10/409,381

(22) Filed: Apr. 8, 2003

(65) Prior Publication Data

US 2003/0234813 A1 Dec. 25, 2003

(30) Foreign Application Priority Data

| Apr. 11, 2002 | (JP) | ............................. 2002-109442 |
| Feb. 13, 2003 | (JP) | ............................. 2003-035314 |

(51) Int. Cl.
  *G06F 15/173* (2006.01)
  *G06F 12/00* (2006.01)
(52) U.S. Cl. ................... 709/225; 709/223; 711/150
(58) Field of Classification Search ................ 709/224, 709/225, 223; 711/150
  See application file for complete search history.

(56) References Cited

U.S. PATENT DOCUMENTS

| 5,798,738 A | 8/1998 | Yamada |
| 6,104,499 A | 8/2000 | Yamada |
| 2002/0078123 A1* | 6/2002 | Latour ........................ 709/104 |
| 2003/0028827 A1* | 2/2003 | Gray ........................... 714/46 |

FOREIGN PATENT DOCUMENTS

| JP | 06-282374 | 7/1994 |
| JP | 07-049834 | 2/1995 |
| JP | 08-329005 | 12/1996 |
| JP | 10-293813 | 11/1998 |
| JP | 11-168707 | 6/1999 |
| JP | 11-191027 | 7/1999 |

* cited by examiner

*Primary Examiner*—Jason Cardone
*Assistant Examiner*—Chirag R Patel
(74) *Attorney, Agent, or Firm*—Cowan, Liebowitz & Latman, P.C.

(57) ABSTRACT

In an information processing apparatus which is connected to an external terminal having an input unit via a network, can receive an input from the input unit of the external terminal, and has its own input unit, an exclusion manager (23) monitors an input from the input unit of the external terminal and that from the self input unit. As a result of monitoring, if an input from a given input unit is generated, the exclusion manager executes exclusion control that inhibits an input from the other input unit until that input is completed.

19 Claims, 34 Drawing Sheets

INFORMATION PROCESSING APPARATUS, ITS CONTROL METHOD, AND PROGRAM

FIELD OF THE INVENTION

The present invention relates to an image processing apparatus which is connected to an external terminal having an input unit via a network, can receive an input from the input unit of the external terminal, and has an input unit, its control method, and a program.

BACKGROUND OF THE INVENTION

In recent years, electronic conference systems that use computer systems have prevailed. Especially, in an electronic conference system using a large-screen display device, a mouse, a digitizer, and the like are used as coordinate input devices, which are used to designate processing contents (menus) and to make instructions corresponding to the processing contents.

Since a mouse is compact and easy to use, it is suited to a case wherein a pointer that interlocks with the movement of the mouse is displayed on the display screen of a computer, and an arbitrary position on the display screen is designated using a button, or an operation for selecting a menu displayed on the screen is made. However, the mouse is not suited to an operation that requires high precision, e.g., an operation for drawing an image such as a line segment or the like on the display screen.

A digitizer is suited to screen drawing since it can be operated as a conventional writing tool, and to handwriting input in an electronic conference system or the like.

However, text information must be input using a keyboard.

In an electronic conference system, participants may use a plurality of mice, digitizers, and keyboards upon operating a TV conference system.

However, a keyboard or mouse is not always located near each participant, and the participant must move to the position in front of the screen so as to use a digitizer.

As means for solving such drawback, for example, "Computer presentation system" disclosed in Japanese Patent Laid-Open No. 11-191027 has proposed means that uses a portable information terminal with a digitizer on hand as a coordinate input device of a TV conference system.

Also, "Handwriting input recognition system and its control method" disclosed in Japanese Patent Laid-Open No. 10-293813 has proposed a technique in which an image of a handwritten character input by a portable information terminal with a digitizer on hand is transmitted to a host PC.

Furthermore, "Remote collaboration system" disclosed in Japanese Patent Laid-Open No. 7-49834 has proposed a conference system that allows remote control by a plurality of computers.

In "Computer presentation system" disclosed in Japanese Patent Laid-Open No. 11-191027, screen information of the TV conference system is reduced in size and is transferred to a portable information terminal with a digitizer on hand of each participant, and the participant designates information on the screen of the portable information terminal using its digitizer. In this way, this invention has proposed means that uses a digitizer as a coordinate input device which converts the relative coordinate on the screen into a coordinate position on the screen of the TV conference system. However, since screen information is transferred in real time, it amounts to a considerable data size, and the loads on processes of both the portable terminal and host PC are heavy. In addition, a keyboard must be prepared to input text information.

In "Handwriting input recognition system and its control method" disclosed in Japanese Patent Laid-Open No. 10-293813, an image of a handwritten character input at a portable information terminal with a digitizer on hand is sent to a host PC, which makes character recognition based on that image. However, since a handwritten character is sent to the host PC as an image, the size of data to be transferred is large, and the load on the host PC becomes heavier.

Furthermore, "Remote collaboration system" disclosed in Japanese Patent Laid-Open No. 7-49834 is a conference system that allows remote control by a plurality of computers. However, since the respective computers are exclusively categorized to an observer, commenter, and controller, a sequence for changing their roles is required.

As means for directly connecting a plurality of mice to a computer and allowing these mice to remotely control the computer, "Mouse extension/expansion device" disclosed in Japanese Patent No. 2,543,272 is known. "Mouse extension/expansion device" disclosed in Japanese Patent No. 2,543,272 has disclosed means that implements remote control using a plurality of mice via a mouse driver. However, "Mouse extension/expansion device" disclosed in Japanese Patent No. 2,543,272 allows remote control by means of only a display and mice, but does not allow any key input. So, a new device must be added for key input.

In recent years, a software product that remotely controls a computer system via a network without the intervention of an input device driver on a host PC has been released. With such software product, a remote PC converts mouse information and key information into a TCP/IP packet, and sends it to a host PC. A remote control program of the host PC interprets the received TCP/IP packet, and outputs mouse and key events to an OS, thus controlling an application which runs on the host PC.

Such remote control software can solve the drawback of a process using only the display and mice, and the drawback of addition of a new device of "Mouse extension/expansion device" disclosed in Japanese Patent No. 2,543,272.

Since the above remote control software executes exclusion control among remote PCs, exclusion control of mice disclosed in "Mouse extension/expansion device" disclosed in Japanese Patent No. 2,543,272 is implemented by remote control.

Since the mouse and key inputs by the conventional remote control and the inputs by mouse and keyboard drivers have different routes until an application receives mouse or key information, the application may simultaneously receive the mouse or key information from both the routes, and a conflict upon using input devices, i.e., a trouble due to simultaneous use occurs.

For example, when a mouse is operated at a remote PC while a mouse connected to the host PC is operated, the former operation may be enabled.

On the other hand, when a key input is made at a remote PC while a key input is made at a keyboard connected to a host PC, the former key input may be enabled.

Such trouble, if any, can be avoided by setting a host PC priority mode or remote PC priority mode. However, the operation mode must be switched each time during user's operation, resulting in troublesome operations.

The present invention has been made to solve the aforementioned problems, and has as its object to provide an information processing apparatus which can efficiently and easily implement input control associated with a host terminal in a system in which the host terminal can be remotely controlled, its control method, and a program.

SUMMARY OF THE INVENTION

According to the present invention, the foregoing object is attained by providing an information processing apparatus which is connected to an external terminal having an input unit via a network, can receive an input from the input unit of the external terminal, and the information processing apparatus has its own input unit, comprising:

monitoring means for monitoring an input from the input unit of the external terminal, and an input from the input unit of the information processing apparatus; and exclusion management means for, when an input of a given input unit is generated as a result of monitoring by the monitoring means, executing exclusion control that inhibits an input from another input unit until that input is completed.

In a preferred embodiment, the monitoring means monitors an input from the input unit of the information processing apparatus via a driver that controls the input unit, and monitors an input from the input unit of the external terminal without the intervention of the driver.

In a preferred embodiment, the driver includes at least one of a mouse driver and keyboard driver.

In a preferred embodiment, each of the input units of the external terminal and the information processing apparatus includes at least one of an input device which can input coordinate information, and an input device which can input key information.

In a preferred embodiment, the network comprises either a wired or wireless network.

In a preferred embodiment, when an input from one input unit of the information processing apparatus is generated as a result of monitoring by the monitoring means, the exclusion management means permits an input from an input unit of the information processing apparatus other than that input unit and inhibits an input from the input unit of the external terminal until the generated input is completed.

In a preferred embodiment, when an input from one input unit of the external terminal is generated as a result of monitoring by the monitoring means, the exclusion management means permits an input from an input unit of the external terminal other than that input unit and inhibits an input from the input unit of the information processing apparatus until the generated input is completed.

In a preferred embodiment, each of the input units of the external terminal and the information processing apparatus comprises a keyboard, and when a key input from one of the keyboards of the external terminal and the information processing apparatus is generated as a result of monitoring by the monitoring means, the exclusion management means executes exclusion control that inhibits an input from the other keyboard until that key input is completed.

In a preferred embodiment, each of the input units of the external terminal and the information processing apparatus comprises a mouse, and when a mouse input from one of the mice of the external terminal and the information processing apparatus is generated as a result of monitoring by the monitoring means, the exclusion management means executes exclusion control that inhibits an input from the other mouse until that mouse input is completed.

According to the present invention, the foregoing object is attained by providing, a method of controlling an information processing apparatus, which is connected to an external terminal having an input unit via a network, can receive an input from the input unit of the external terminal, and the information processing apparatus has its own input unit, comprising:

a monitoring step of monitoring an input from the input unit of the external terminal, and an input from the input unit of the information processing apparatus; and an exclusion management step of executing, when an input of a given input unit is generated as a result of monitoring in the monitoring step, exclusion control that inhibits an input from another input unit until that input is completed.

According to the present invention, the foregoing object is attained by providing, a program for making a computer function as an information processing apparatus, which is connected to an external terminal having an input unit via a network, can receive an input from the input unit of the external terminal, and the information processing apparatus has its own input unit, comprising:

a program code of a monitoring step of monitoring an input from the input unit of the external terminal, and an input from the input unit of the information processing apparatus; and a program code of an exclusion management step of executing, when an input of a given input unit is generated as a result of monitoring in the monitoring step, exclusion control that inhibits an input from another input unit until that input is completed.

According to the present invention, the foregoing object is attained by providing, an information processing apparatus which is connected to a host terminal via a network, and has a digitizer function on a display screen thereof, comprising:

control means for dividing a digitizer area on the display screen into a plurality of areas, and making the respective divided areas serve as input areas of different input forms; and transmission means for transmitting input information input at each input area to the host terminal as input information to the host terminal.

In a preferred embodiment, the input area is one of a touch pad area, handwriting character input area, text input area, and software keyboard input area.

In a preferred embodiment, further comprises conversion means for, when the input area is the touch pad area, converting coordinate information input on the touch pad area into coordinate information of the host terminal.

In a preferred embodiment, further comprises conversion means for, when the input area is the handwriting character input area, recognizing a character based on strokes input on the handwriting character input area, and converting the recognized character into a character code.

In a preferred embodiment, wherein the host terminal is connected to a plurality of information processing apparatuses via the network, and the host terminal comprises:

monitoring means for monitoring input information from each of the plurality of information processing apparatuses; and exclusion management means for, when input information from a given information processing apparatus is detected as a result of monitoring by the monitoring means, executing exclusion control that inhibits an input of input information from other information processing apparatuses until that input is completed.

According to the present invention, the foregoing object is attained by providing, a method of controlling an information processing apparatus, which is connected to a host terminal via a network, and has a digitizer function on a display screen thereof, comprising:

a control step of dividing a digitizer area on the display screen into a plurality of areas, and making the respective divided areas serve as input areas of different input forms; and a transmission step of transmitting input information input at each input area to the host terminal as input information to the host terminal.

According to the present invention, the foregoing object is attained by providing, a program for implementing control of an information processing apparatus which is connected to a host terminal via a network, and has a digitizer function on a display screen thereof, comprising:

a program code of a control step of dividing a digitizer area on the display screen into a plurality of areas, and making the respective divided areas serve as input areas of different input forms; and a program code of a transmission step of transmitting input information input at each input area to the host terminal as input information to the host terminal.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail hereinafter with reference to the accompanying drawings.

<<System Arrangement>>

Figure 1:
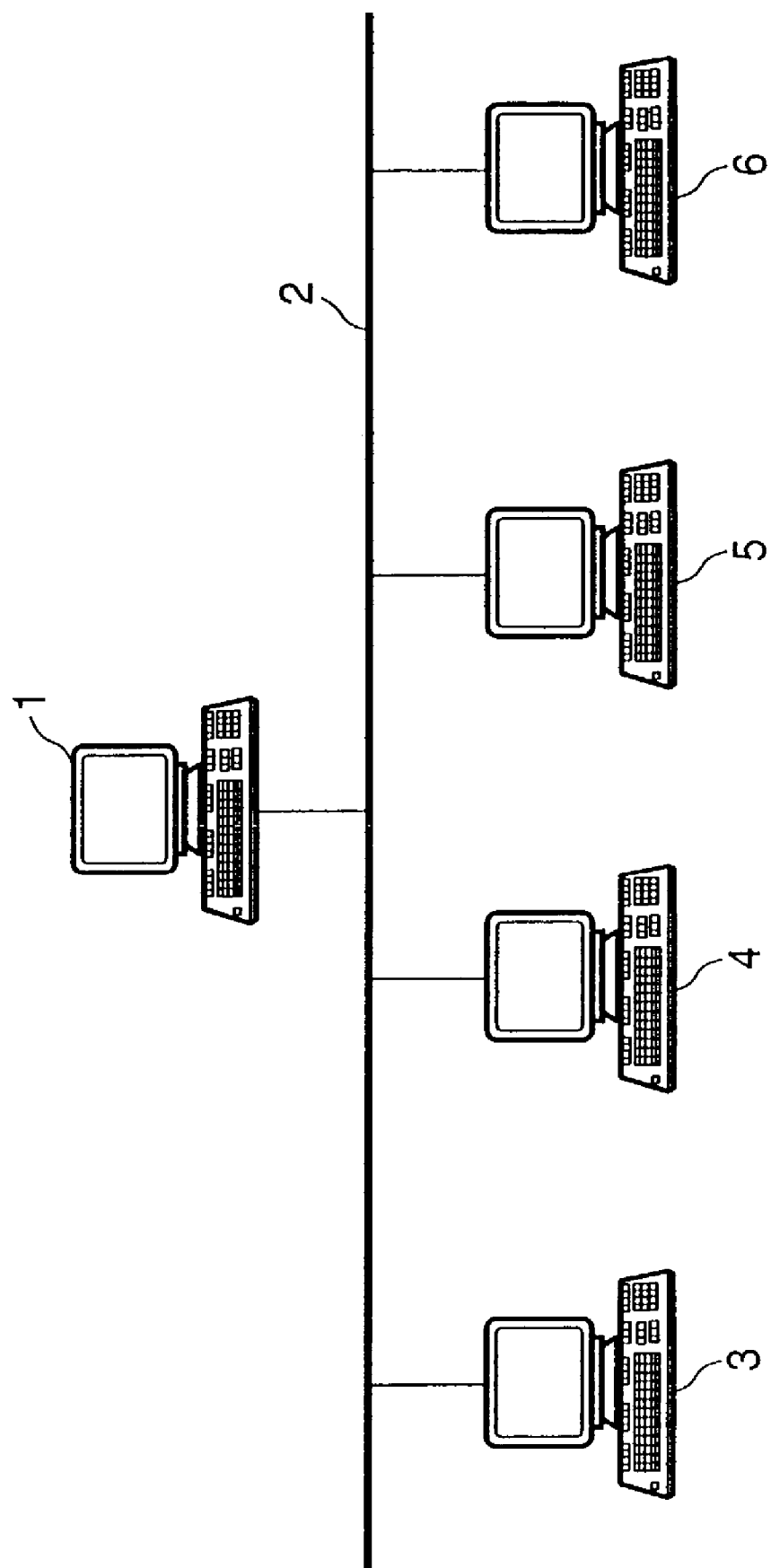
FIG. 1 is a schematic diagram showing the arrangement of an information processing system that can be applied to respective embodiments of the present invention.

FIG. 1 is a schematic diagram showing the arrangement of an information processing system which can be applied to respective embodiments of the present invention.

Referring to FIG. 1, reference numeral 1 denotes a host PC (personal computer) which implements the present invention. Reference numeral 2 denotes a network such as a LAN or the like. Reference numerals 3 to 6 denote remote PCs which remotely control the host PC 1. Inputs from a mouse and keyboard connected to the host PC 1 and remote control mouse and key inputs from the remote PCs 3 to 6 are both enabled.

Although details are not shown in FIG. 1, each of the host PC 1 and remote PCs 3 to 6 has standard building elements (e.g., a CPU, RAM, ROM, hard disk, external storage device, network interface, display, keyboard, mouse, and the like) equipped in a versatile computer. Also, each PC is assigned, e.g., a unique IP address.

Figure 2:
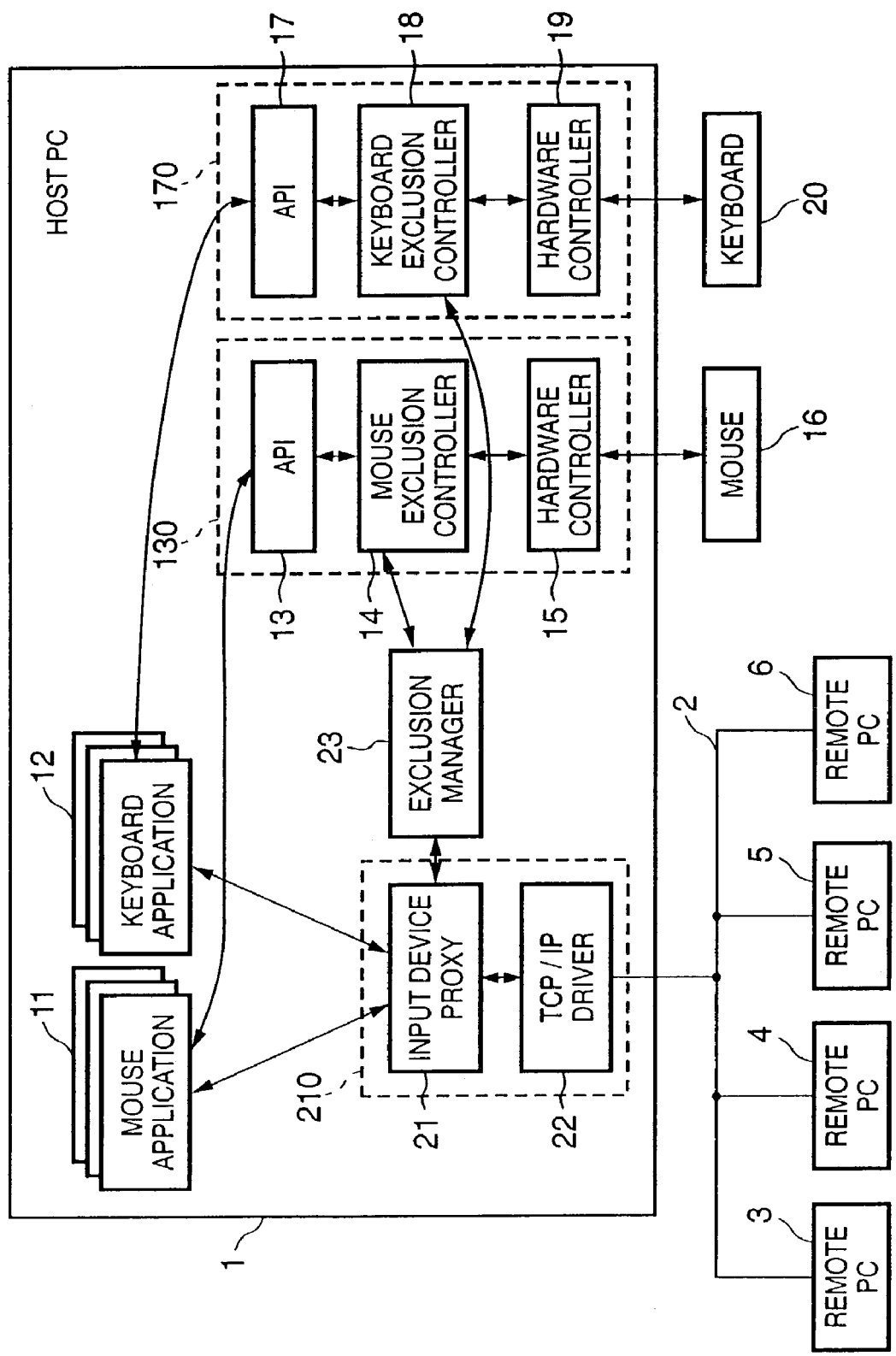
FIG. 2 is a functional block diagram of an information processing system implemented by each of the embodiments of the present invention.

FIG. 2 is a functional block diagram of an information processing system implemented by each of the embodiments of the present invention.

Note that various functions implemented by the functional arrangement shown in FIG. 2 may be implemented by executing a program stored in the ROM or external storage device in the host PC 1 by the CPU or by dedicated hardware.

The host PC 1 is an apparatus that implements the exclusion control function of respective embodiments to be described later. Reference numeral 11 denotes applications which run on the host PC 1 and can receive operations by a mouse 16. Reference numeral 12 denotes applications which run on the host PC 1 and can receive operations by a keyboard 20. The applications 11 and 12 may include identical ones, and also receive remote operations from the remote PCs 3 to 6.

Reference numeral 130 denotes a mouse driver main body consisting of mouse driver components 13 to 15. The mouse driver 130 outputs a mouse event generated upon operation of the mouse 16 to an OS (not shown) of the host PC 1. Reference numeral 13 denotes an application interface (API) of the mouse driver. Reference numeral 14 denotes a mouse exclusion controller that implements mouse exclusion control as one of embodiments of the present invention. Reference numeral 15 denotes a hardware controller (H/W Control) of the mouse driver, which receives a mouse input from the mouse 16.

Note that the mouse input includes those generated upon moving a mouse cursor and upon depression of a mouse button.

Reference numeral 170 denotes a keyboard driver main body consisting of keyboard driver components 17 to 19. The keyboard driver 170 outputs a key event generation upon operation of the keyboard 20 to the OS of the host PC 1. Reference numeral 17 denotes an application interface (API) of the keyboard driver. Reference numeral 18 denotes a keyboard exclusion controller that implements keyboard exclusion control as one of embodiments of the present invention. Reference numeral 19 denotes a hardware controller (H/W Control) of the keyboard driver, which receives a key input from the keyboard 20.

Note that completion of a mouse or key input to be described later in each of the embodiments is determined, for example, when a predetermined period of time which is an unoperable state, has elapsed after generation of the mouse or key input. The exclusion control of the mouse or key input to be described later in each of the embodiments inhibits other mouse or key inputs until a predetermined period of time which is an unoperable state, has elapses after generation of a given mouse or key input.

Reference numeral 210 denotes an input processor for processing mouse and key inputs from the remote PCs 3 to 6. In the input processor 210, reference numeral 21 denotes an input device proxy which interprets a TCP/IP packet, determines a remote PC as the source of that packet on the basis of an IP address, and also determines a mouse or key input on the basis of a port number.

If the input device proxy 21 determines a mouse input from the remote PC, it outputs a mouse event equivalent to that generated by the mouse 16 of the host PC 1 to the OS of the host PC 1 as a mouse event corresponding to that mouse input.

On the other hand, if the input device proxy 21 determines a key input from the remote PC, it outputs a key event equivalent to that generated by the keyboard 20 of the host PC 1 to the OS of the host PC 1 as a key event corresponding to that key input.

Note that the exclusion control among the remote PCs in the input device proxy 21 adopts a method described by the sixth embodiment.

Reference numeral 22 denotes a TCP/IP driver used by the host PC 1 to communicate with the remote PCs via TCP/IP.

Reference numeral 23 denotes an exclusion manager which arbitrates exclusion control between the mouse 16 and keyboard 20 of the host PC 1 and the mouse and key inputs from the remote PC. The exclusion manager 23 communicates with the input device proxy 21, mouse exclusion controller 14, and keyboard exclusion controller 18 via inter-process message exchange means.

The remote PCs 3 to 6 remote control the applications 11 and 12 which run on the host PC 1. Mouse and key inputs by the remote control are converted into a TCP/IP packet, which is sent from a network port.

The network 2 is used to make TCP/IP communications between the host PC 1 and the remote PCs 3 to 6. The network 2 may adopt either a wired connection such as a wired LAN, IEEE1394, USB, or the like or a wireless connection such as a wireless LAN, Bluetooth, mobile communication network, or the like.

The TCP/IP protocol is used in communications between the host PC 1 and the remote PCs 3 to 6. However, other protocols may be used.

In FIG. 2, the exclusion manager 23 is configured as an independent process, but may be configured as a module in the input device proxy 21, mouse exclusion controller 14, and keyboard exclusion controller 18.

Each of the host PC 1 and remote PCs 3 to 6 adopts a mouse as a (coordinate information) input device. However, any other input devices such as a tablet, touch pad, pen, and the like, and those which can generate coordinate information (e.g., a portable terminal such as a PDA or the like, a portable phone) may be used.

Each of the host PC 1 and remote PCs 3 to 6 adopts a keyboard as a (text information) input device. However, any other input devices such as input by means of handwritten character recognition, a software keyboard, and the like, and those which can generate text information (e.g., a portable terminal such as a PDA or the like, a portable phone) may be used.

First Embodiment

Figure 3:
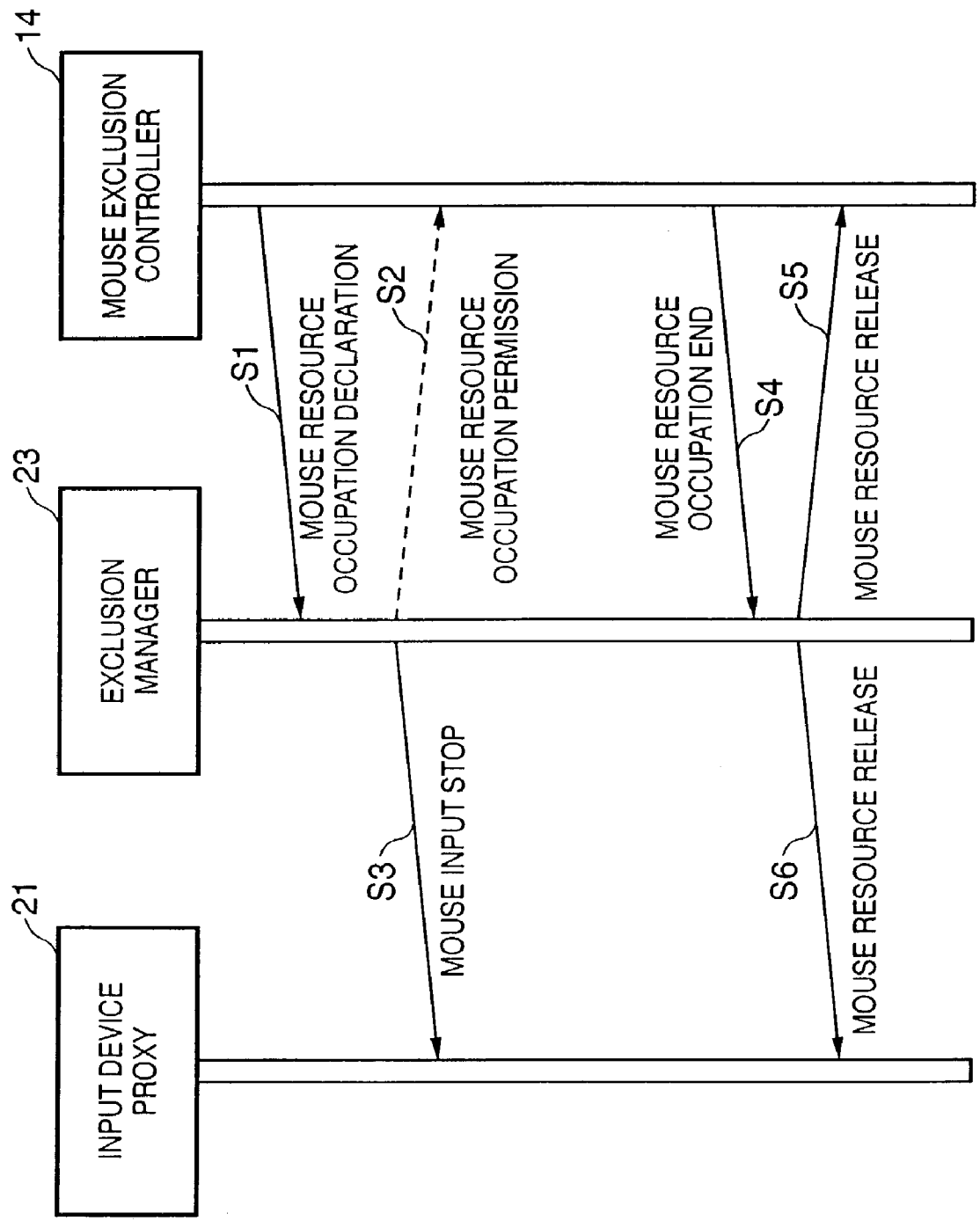
FIG. 3 is a chart showing the sequence of the first embodiment executed when a mouse of a host PC gains a control right.

FIG. 3 is a chart showing communications among the exclusion manager 23, input device proxy 21, and mouse exclusion controller 14 according to the first embodiment. Especially, FIG. 3 shows the sequence executed when the mouse 16 connected to the host PC 1 gains a control right.

Upon detection of an input from the mouse 16 connected to the host PC 1, the mouse exclusion controller 14 sends a mouse resource occupation declaration message to the exclusion manager 23 in step S1.

Upon reception of the mouse resource occupation declaration message, the exclusion manager 23 checks the occupation state of the mouse resource. If the mouse resource is not occupied by any other processes, the exclusion manager 23 sends a mouse resource occupation permission message to the mouse exclusion controller 14 in step S2. In step S3, the exclusion manager 23 sends a mouse input stop message to the input device proxy 21.

Upon completion of the input from the mouse 16 connected to the host PC 1, the mouse exclusion controller 14 sends a mouse resource occupation end message to the exclusion manager 23 in step S4.

Upon reception of the mouse resource occupation end message, the exclusion manager 23 sends a mouse resource release message to the mouse exclusion controller 14 and input device proxy 21 in steps S5 and S6, thus ending the exclusion control of the mouse input.

Upon reception of the mouse resource release message, the mouse exclusion controller 14 and input device proxy 21 respectively execute processes for permitting corresponding mouse inputs.

Figure 4:
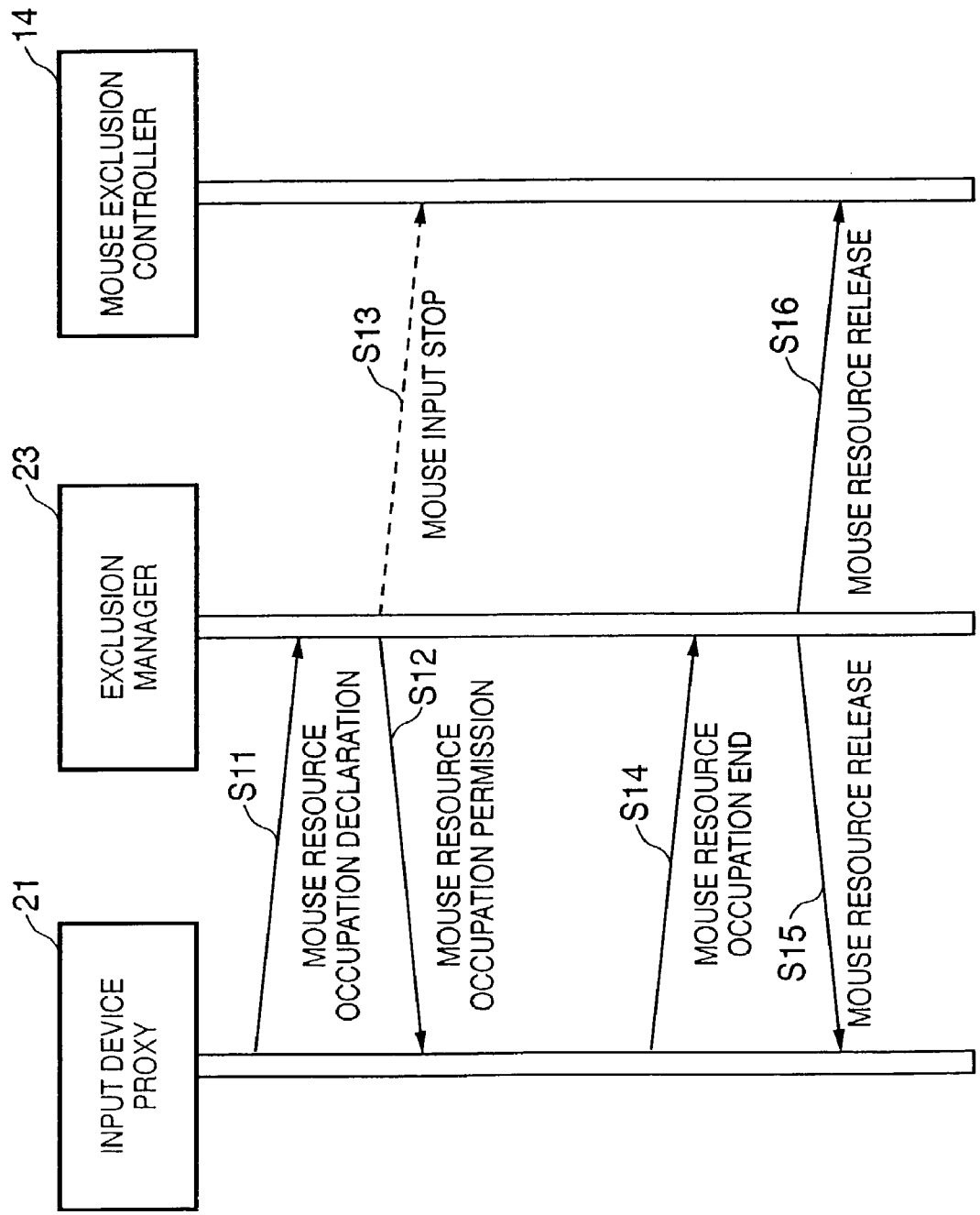
FIG. 4 is a chart showing the sequence of the first embodiment executed when a mouse of a remote PC gains a control right.

FIG. 4 is a chart showing communications among the exclusion manager 23, input device proxy 21, and mouse exclusion controller 14 according to the first embodiment. Especially, FIG. 4 shows the sequence executed when the mouse operation of the remote PC (e.g., the remote PC 3) gains a control right.

Upon detection of an input of the mouse operation from the remote PC 3, the input device proxy 21 sends a mouse resource occupation declaration message to the exclusion manager 23 in step S11.

Upon reception of the mouse resource occupation declaration message, the exclusion manager 23 checks the occupation state of the mouse resource. If the mouse resource is not occupied by any other processes, the exclusion manager 23 sends a mouse resource occupation permission message to the input device proxy 21 in step S12. In step S13, the exclusion manager 23 sends a mouse input stop message to the mouse exclusion controller 14.

Upon completion of the mouse input from the remote PC 3, the input device proxy 21 sends a mouse resource occupation end message to the exclusion manager 23 in step S14.

Upon reception of the mouse resource occupation end message, the exclusion manager 23 sends a mouse resource release message to the input device proxy 21 and mouse exclusion controller 14 in steps S15 and S16, thus ending the exclusion control of the mouse input.

Upon reception of the mouse resource release message, the input device proxy 21 and mouse exclusion controller 14 respectively execute processes for permitting corresponding mouse inputs.

Figure 5:
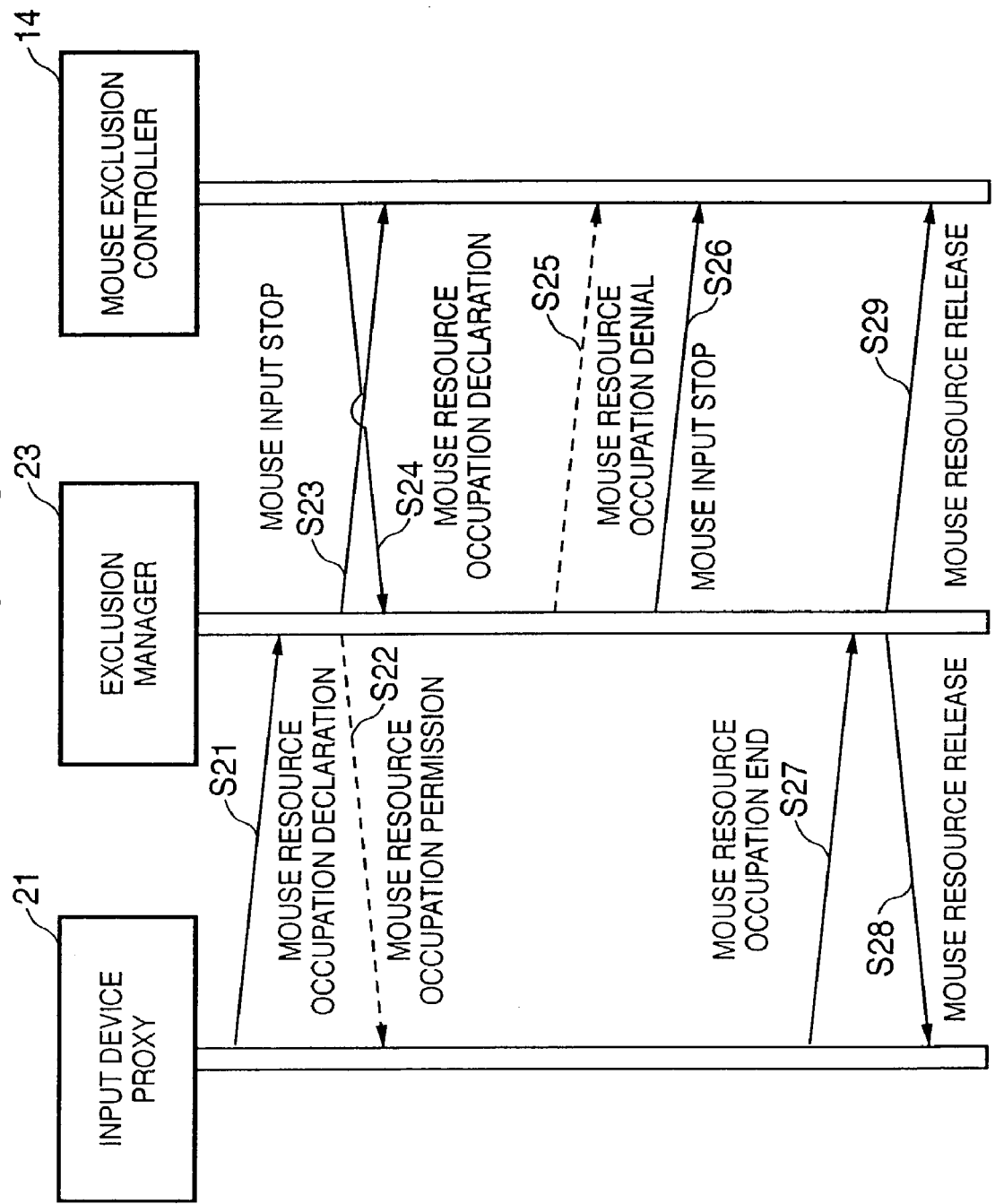
FIG. 5 is a chart showing the sequence of the first embodiment executed when the remote PC gains a control right of a mouse after contention with the host PC.

FIG. 5 is a chart showing communications among the exclusion manager 23, input device proxy 21, and mouse exclusion controller 14 according to the first embodiment. Especially, FIG. 5 shows the sequence executed when the mouse operation input of the remote PC (e.g., the remote PC 3) contends with the input from the mouse 16 connected to the host PC 1, and the mouse operation input of the remote PC gains a control right as a result of arbitration.

Upon detection of the mouse operation input from the remote PC 3, the input device proxy 21 sends a mouse resource occupation declaration message to the exclusion manager 23 in step S21.

Upon reception of the mouse resource occupation declaration message, the exclusion manager 23 checks the occupation state of the mouse resource. If the mouse resource is not occupied by any other processes, the exclusion manager 23 sends a mouse resource occupation permission message to the input device proxy 21 in step S22. In step S23, the exclusion manager 23 sends a mouse input stop message to the mouse exclusion controller 14.

At this time, if the mouse exclusion controller 14 has already sent a mouse resource occupation declaration message to the exclusion manager 23 before reception of a mouse input stop message, the exclusion manager 23 receives the mouse resource occupation declaration message from the mouse exclusion controller 14 in step S24, and checks the occupation state of the mouse resource. In this case, since the input device proxy 21 has occupied the mouse resource, the exclusion manager 23 sends a mouse resource occupation denial message to the mouse exclusion controller 14 in step S25. Furthermore, the exclusion manager 23 re-sends a mouse input stop message to the mouse exclusion controller 14 in step S26.

It is logically impossible to exchange messages among processes at the same time, and respective messages are enqueued in a message queue. The messages in the message queue are dequeued in a FIFO (first-in first-out) order. That is, in the example in FIG. 5, the message from the input device proxy 21 is enqueued in the message queue earlier than that from the mouse exclusion controller 14.

Also, since messages are processed one by one, the exclusion manager 23 receives the message in step S21, sends the message in step S23, and then receives the message in step S24.

Upon completion of the mouse input from the remote PC 3, the input device proxy 21 sends a mouse resource occupation end message to the exclusion manager 23 in step S27.

Upon reception of the mouse resource occupation end message, the exclusion manager 23 sends a mouse resource release message to the input device proxy 21 and mouse exclusion controller 14 in steps S28 and S29, thus ending the exclusion control of the mouse input.

Upon reception of the mouse resource release message, the input device proxy 21 and mouse exclusion controller 14 respectively execute processes for permitting corresponding mouse inputs.

Figure 6:
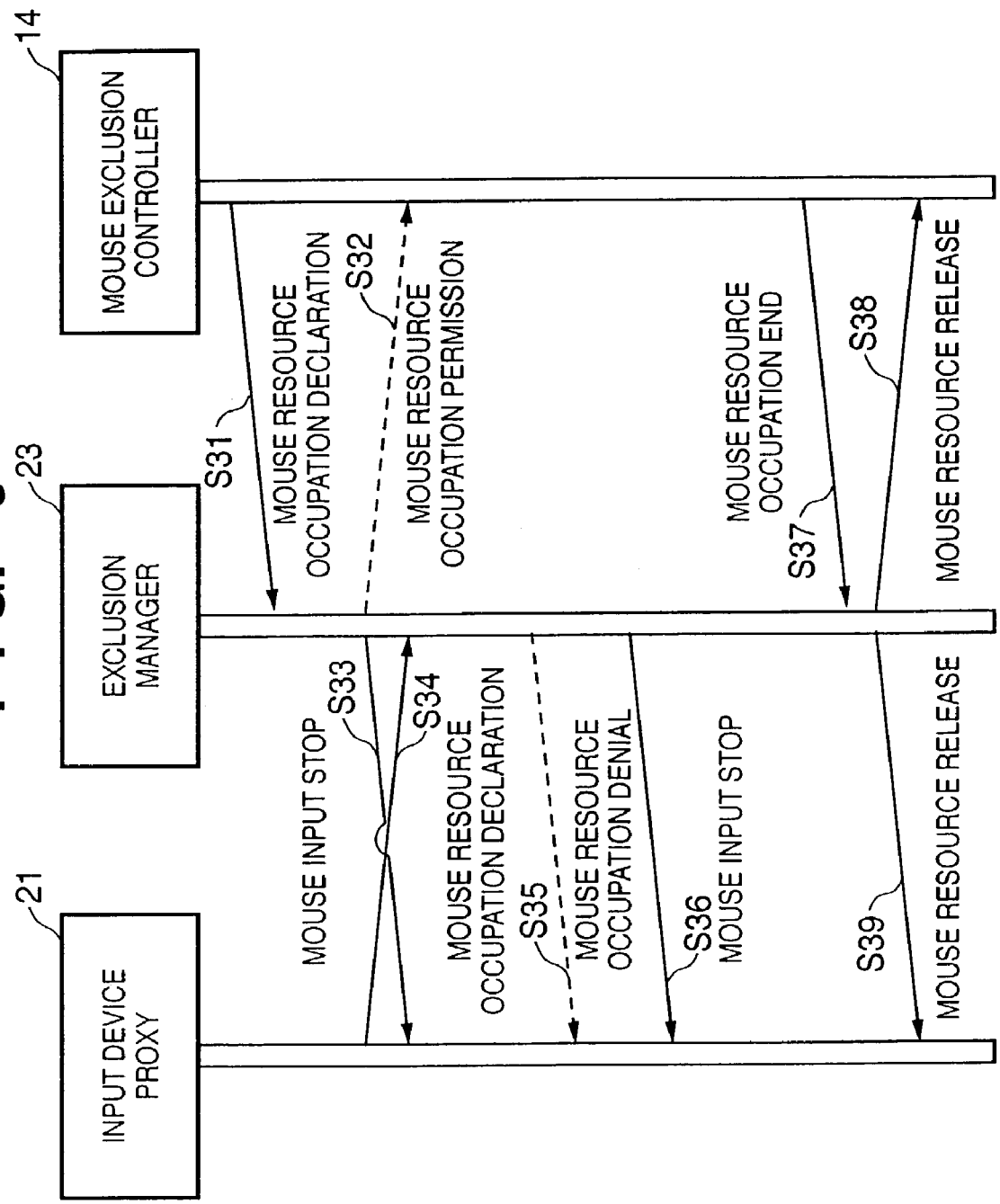
FIG. 6 is a chart showing the sequence of the first embodiment executed when the host PC gains a control right of a mouse after contention with the remote PC.

FIG. 6 is a chart showing communications among the exclusion manager 23, mouse exclusion controller 14, and input device proxy 21 according to the first embodiment. Especially, FIG. 6 shows the sequence executed when an input from the mouse 16 connected to the host PC 1 contends with a mouse operation input of the remote PC (e.g., the remote PC 3), and the mouse input of the host PC 1 gains a control right as a result of arbitration.

Upon detection of a mouse input from the mouse 16 connected to the host PC 1, the mouse exclusion controller 14 sends a mouse resource occupation declaration message to the exclusion manager 23 in step S31.

Upon reception of the mouse resource occupation declaration message, the exclusion manager 23 checks the occupation state of the mouse resource. If the mouse resource is not occupied by any other processes, the exclusion manager 23 sends a mouse resource occupation permission message to the mouse exclusion controller 14 in step S32. In step S33, the exclusion manager 23 sends a mouse input stop message to the input device proxy 21.

At this time, if the input device proxy 21 has already sent a mouse resource occupation declaration message to the exclusion manager 23 before reception of a mouse input stop message, the exclusion manager 23 receives the mouse resource occupation declaration message from the input device proxy 21 in step S34, and checks the occupation state of the mouse resource. In this case, since the mouse exclusion controller 14 has occupied the mouse resource, the exclusion manager 23 sends a mouse resource occupation denial message to the input device proxy 21 in step S35. Furthermore, the exclusion manager 23 re-sends a mouse input stop message to the input device proxy 21 in step S36.

It is logically impossible to exchange messages among processes at the same time, and respective messages are enqueued in a message queue. The messages in the message queue are dequeued in a FIFO (first-in first-out) order. That is, in the example in FIG. 6, the message from the mouse exclusion controller 14 is enqueued in the message queue earlier than that from the input device proxy 21.

Also, since messages are processed one by one, the exclusion manager 23 receives the message in step S31, sends the message in step S33, and then receives the message in step S34.

Upon completion of the mouse input from the host PC 1, the mouse exclusion controller 14 sends a mouse resource occupation end message to the exclusion manager 23 in step S37.

Upon reception of the mouse resource occupation end message, the exclusion manager 23 sends a mouse resource release message to the mouse exclusion controller 14 and input device proxy 21 in steps S38 and S39, thus ending the exclusion control of the mouse input.

Upon reception of the mouse resource release message, the mouse exclusion controller 14 and input device proxy 21 respectively execute processes for permitting corresponding mouse inputs.

<Effect of First Embodiment>

As described above, according to the first embodiment, while the mouse 16 connected to the host PC 1 is in operation, other mouse inputs, i.e., those from the remote PCs are inhibited. On the other hand, while a mouse input from a given remote PC is generated, the operation of the mouse 16 connected to the host PC 1 is inhibited. That is, when a mouse input of a given PC is generated, other mouse inputs can be disabled by executing the exclusion control that denies mouse inputs from other PCs.

This exclusion control can automatically give priority to mouse inputs from the mouse in use without requiring any special mode setting operation.

Second Embodiment

Figure 7:
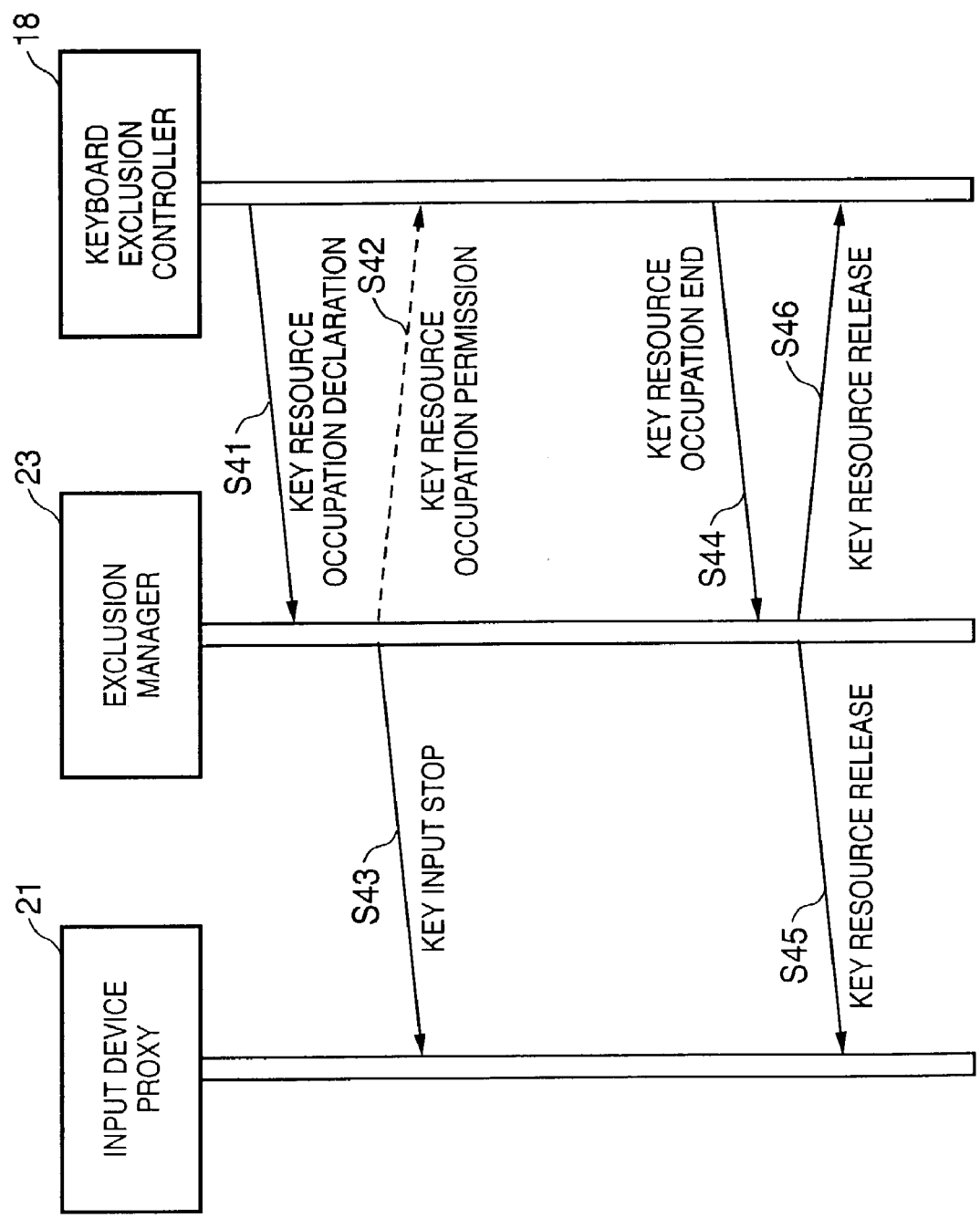
FIG. 7 is a chart showing the sequence of the second embodiment executed when a key input of the host PC gains a control right.

FIG. 7 is a chart showing communications among the exclusion manager 23, input device proxy 21, and keyboard exclusion controller 18 according to the second embodiment. Especially, FIG. 7 shows the sequence executed when the keyboard 20 connected to the host PC 1 gains a control right.

Upon detection of an input from the keyboard 20 connected to the host PC 1, the keyboard exclusion controller 18 sends a key resource occupation declaration message to the exclusion manager 23 in step S41.

Upon reception of the key resource occupation declaration message, the exclusion manager 23 checks the occupation state of the key resource. If the key resource is not occupied by any other processes, the exclusion manager 23 sends a key resource occupation permission message to the keyboard exclusion controller 18 in step S42. In step S43, the exclusion manager 23 sends a key input stop message to the input device proxy 21.

Upon completion of the input from the keyboard 20 connected to the host PC 1, the keyboard exclusion controller 18 sends a key resource occupation end message to the exclusion manager 23 in step S44.

Upon reception of the key resource occupation end message, the exclusion manager 23 sends a key resource release message to the keyboard exclusion controller 18 and input device proxy 21 in steps S46 and S45, thus ending the exclusion control of the key input.

Upon reception of the key resource release message, the keyboard exclusion controller 18 and input device proxy 21 respectively execute processes for permitting corresponding key inputs.

Figure 8:
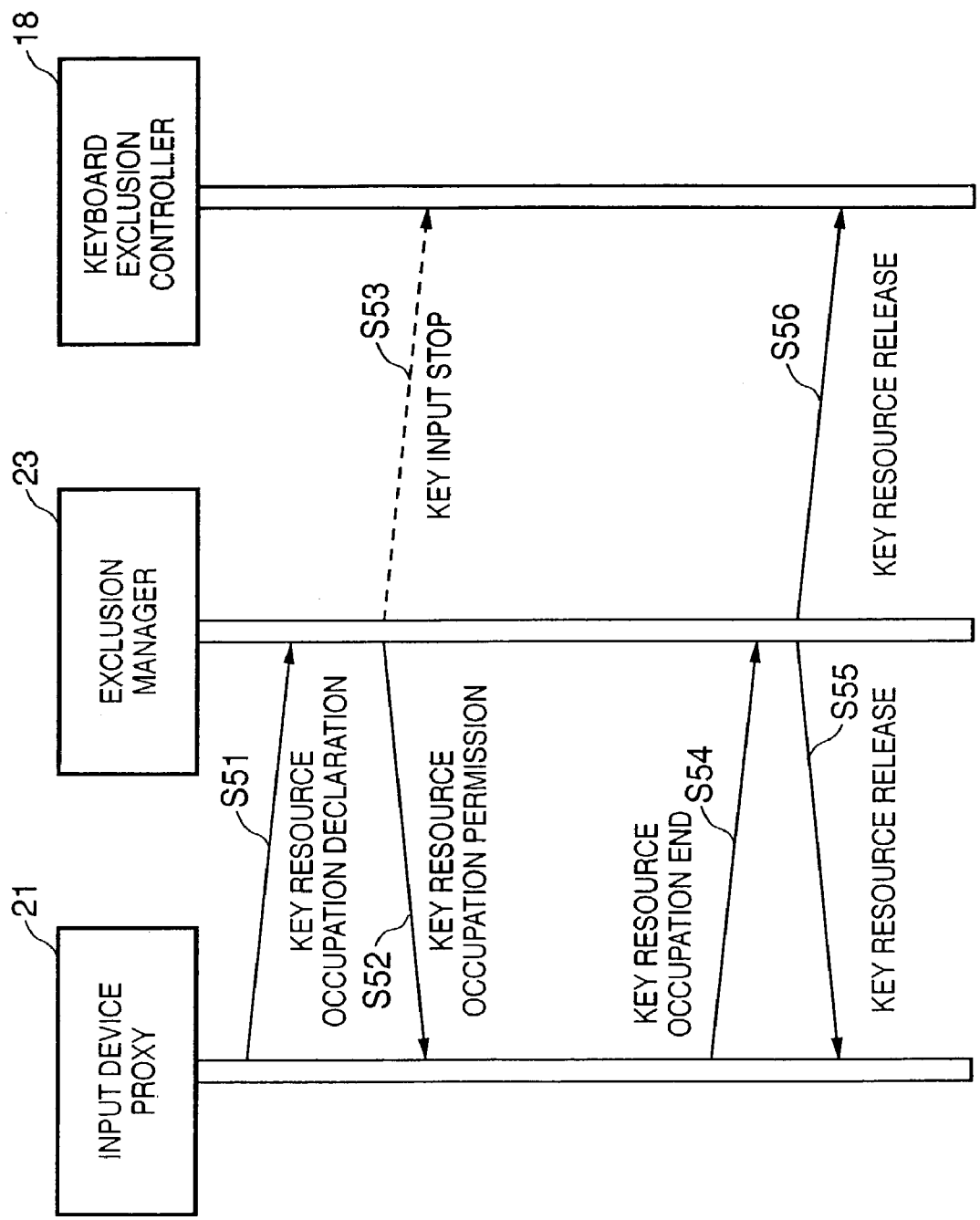
FIG. 8 is a chart showing the sequence of the second embodiment executed when a key input of the remote PC gains a control right.

FIG. 8 is a chart showing communications among the exclusion manager 23, input device proxy 21, and keyboard exclusion controller 18 according to the second embodiment. Especially, FIG. 8 shows the sequence executed when the key operation of the remote PC (e.g., the remote PC 3) gains a control right.

Upon detection of a key input from the remote PC 3, the input device proxy 21 sends a key resource occupation declaration message to the exclusion manager 23 in step S51.

Upon reception of the key resource occupation declaration message, the exclusion manager 23 checks the occupation state of the key resource. If the key resource is not occupied by any other processes, the exclusion manager 23 sends a key resource occupation permission message to the input device proxy 21 in step S52. In step S53, the exclusion manager 23 sends a key input stop message to the keyboard exclusion controller 18.

Upon completion of the key input from the remote PC 3, the input device proxy 21 sends a key resource occupation end message to the exclusion manager 23 in step S54.

Upon reception of the key resource occupation end message, the exclusion manager 23 sends a key resource release message to the input device proxy 21 and keyboard exclusion controller 18 in steps S55 and S56, thus ending the exclusion control of the key input.

Upon reception of the key resource release message, the input device proxy 21 and keyboard exclusion controller 18 respectively execute processes for permitting corresponding key inputs.

Figure 9:
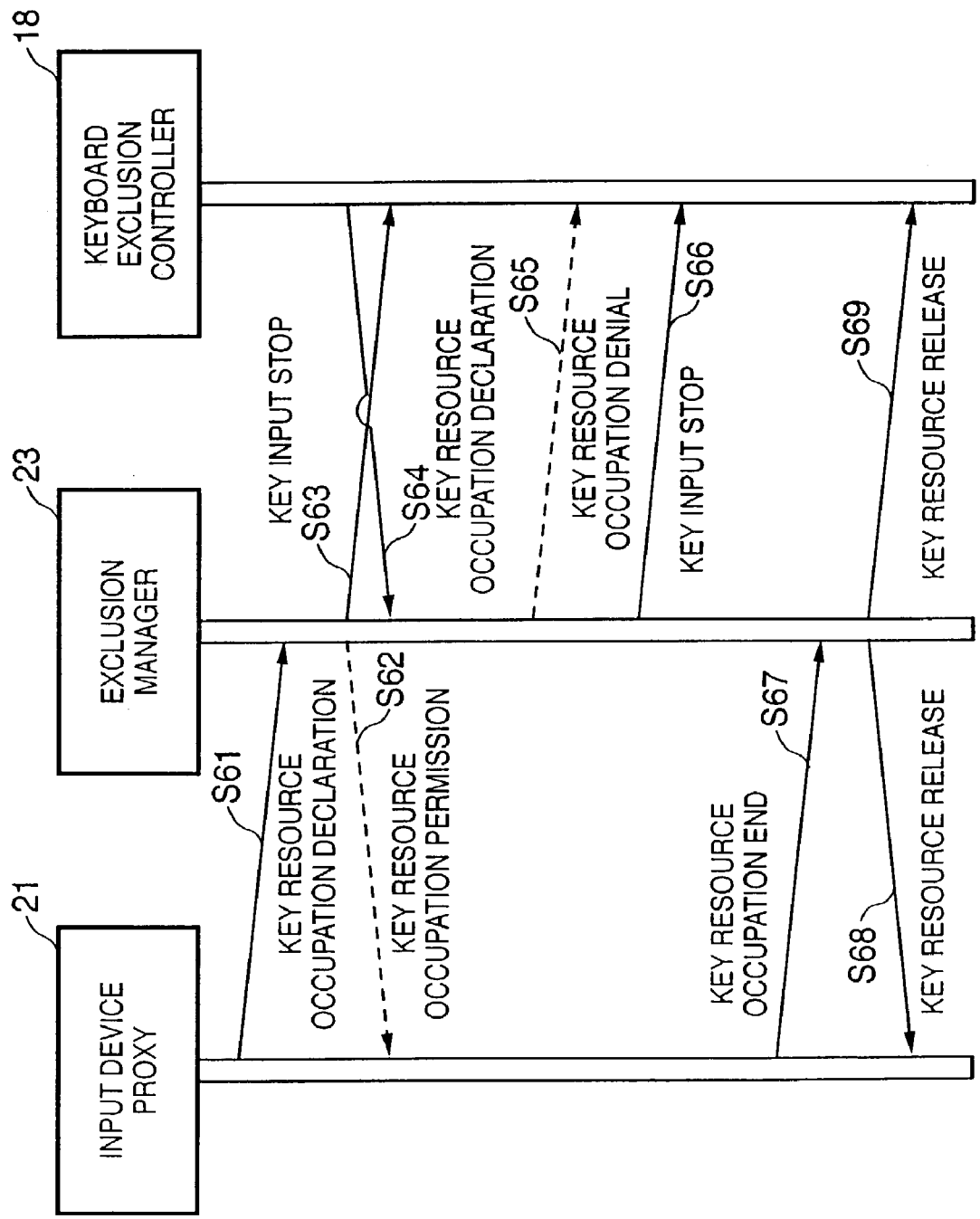
FIG. 9 is a chart showing the sequence of the second embodiment executed when the remote PC gains a control right of a key input after contention with the host PC.

FIG. 9 is a chart showing communications among the exclusion manager 23, input device proxy 21, and keyboard exclusion controller 18 according to the second embodiment. Especially, FIG. 9 shows the sequence executed when the key input of the remote PC (e.g., the remote PC 3) contends with the key input of the host PC 1, and the key input of the remote PC 3 gains a control right as a result of arbitration.

Upon detection of the key input from the remote PC 3, the input device proxy 21 sends a key resource occupation declaration message to the exclusion manager 23 in step S61.

Upon reception of the key resource occupation declaration message, the exclusion manager 23 checks the occupation state of the key resource. If the key resource is not occupied by any other processes, the exclusion manager 23 sends a key resource occupation permission message to the input device proxy 21 in step S62. In step S63, the exclusion manager 23 sends a key input stop message to the keyboard exclusion controller 18.

At this time, if the keyboard exclusion controller 18 has already sent a key resource occupation declaration message to the exclusion manager 23 before reception of a key input stop message, the exclusion manager 23 receives the key resource occupation declaration message from the keyboard exclusion controller 18 in step S64, and checks the occupation state of the key resource. In this case, since the input device proxy 21 has occupied the key resource, the exclusion manager 23 sends a key resource occupation denial message to the keyboard exclusion controller 18 in step S65. Furthermore, the exclusion manager 23 re-sends a key input stop message to the keyboard exclusion controller 18 in step S66.

It is logically impossible to exchange messages among processes at the same time, and respective messages are enqueued in a message queue. The messages in the message queue are dequeued in a FIFO (first-in first-out) order. That is, in the example in FIG. 9, the message from the input device proxy 21 is enqueued in the message queue earlier than that from the keyboard exclusion controller 18.

Also, since messages are processed one by one, the exclusion manager 23 receives the message in step S61, sends the message in step S63, and then receives the message in step S64.

Upon completion of the key input from the remote PC 3, the input device proxy 21 sends a key resource occupation end message to the exclusion manager 23 in step S67.

Upon reception of the key resource occupation end message, the exclusion manager 23 sends a key resource release message to the input device proxy 21 and keyboard exclusion controller 18 in steps S68 and S69, thus ending the exclusion control of the key input.

Upon reception of the key resource release message, the input device proxy 21 and keyboard exclusion controller 18 respectively execute processes for permitting corresponding key inputs.

Figure 10:
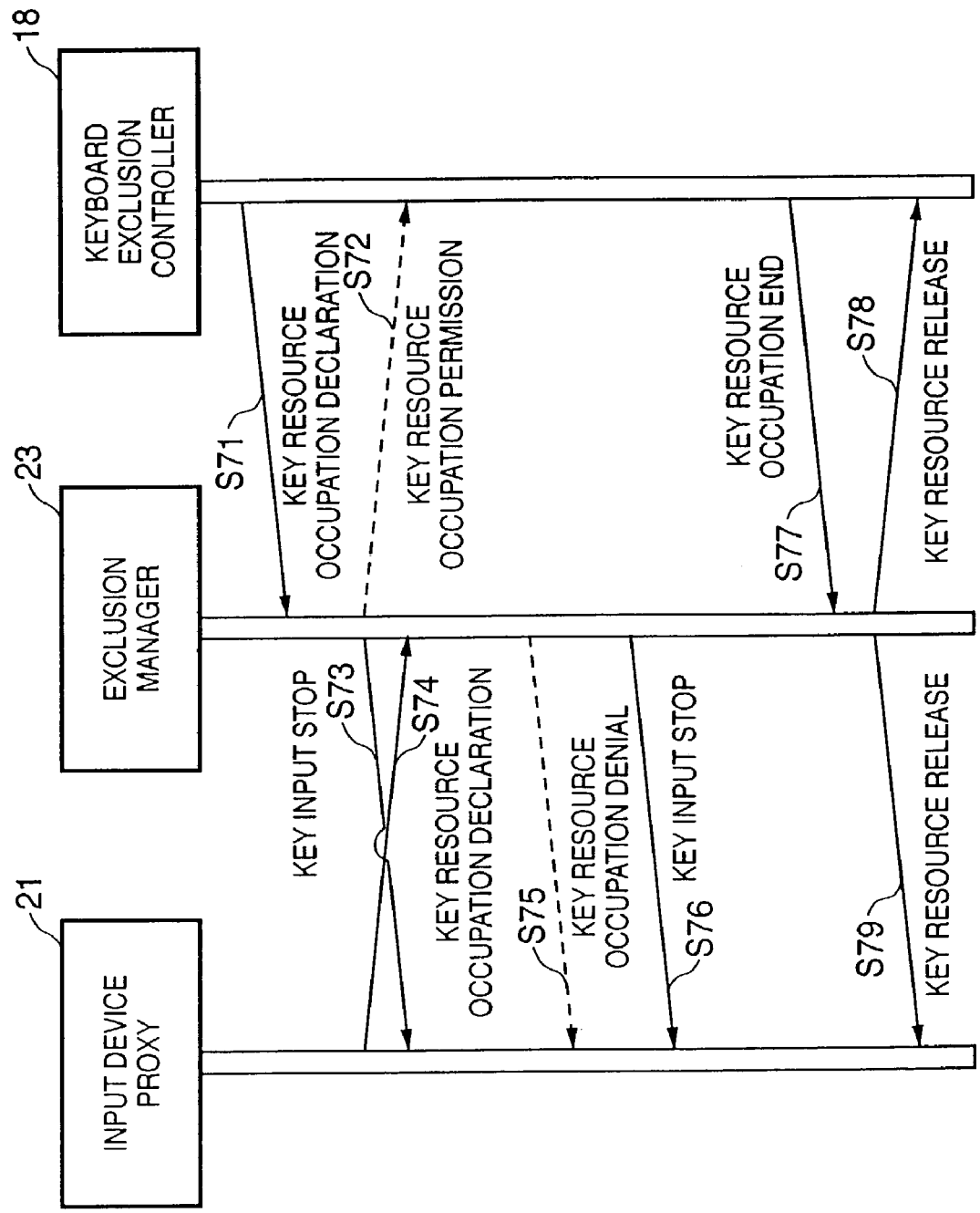
FIG. 10 is a chart showing the sequence of the second embodiment executed when the host PC gains a control right of a key input after contention with the remote PC.

FIG. 10 is a chart showing communications among the exclusion manager 23, keyboard exclusion controller 18, and input device proxy 21 according to the second embodiment. Especially, FIG. 10 shows the sequence executed when a key input from the keyboard 20 connected to the host PC 1 contends with a key input of the remote PC (e.g., the remote PC 3), and the key input from the keyboard 20 connected to the host PC 1 gains a control right as a result of arbitration.

Upon detection of a key input from the keyboard 20 connected to the host PC 1, the keyboard exclusion controller 18 sends a key resource occupation declaration message to the exclusion manager 23 in step S71.

Upon reception of the key resource occupation declaration message, the exclusion manager 23 checks the occupation state of the key resource. If the key resource is not occupied by any other processes, the exclusion manager 23 sends a key resource occupation permission message to the keyboard exclusion controller 18 in step S72. In step S73, the exclusion manager 23 sends a key input stop message to the input device proxy 21.

At this time, if the input device proxy 21 has already sent a key resource occupation declaration message to the exclusion manager 23 before reception of a key input stop message, the exclusion manager 23 receives the key resource occupation declaration message from the input device proxy 21 in step S74, and checks the occupation state of the key resource. In this case, since the keyboard exclusion controller 18 has occupied the key resource, the exclusion manager 23 sends a key resource occupation denial message to the input device proxy 21 in step S75. Furthermore, the exclusion manager 23 re-sends a key input stop message to the input device proxy 21 in step S76.

It is logically impossible to exchange messages among processes at the same time, and respective messages are enqueued in a message queue. The messages in the message queue are dequeued in a FIFO (first-in first-out) order. That is, in the example in FIG. 10, the message from the keyboard exclusion controller 18 is enqueued in the message queue earlier than that from the input device proxy 21.

Also, since messages are processed one by one, the exclusion manager 23 receives the message in step S71, sends the message in step S73, and then receives the message in step S74.

Upon completion of the key input from the host PC 1, the keyboard exclusion controller 18 sends a key resource occupation end message to the exclusion manager 23 in step S77.

Upon reception of the key resource occupation end message, the exclusion manager 23 sends a key resource release message to the keyboard exclusion controller 18 and input device proxy 21 in steps S78 and S79, thus ending the exclusion control of the key input.

Upon reception of the key resource release message, the keyboard exclusion controller 18 and input device proxy 21 respectively execute processes for permitting corresponding key inputs.

<Effect of Second Embodiment>

As described above, according to the second embodiment, while the keyboard 20 connected to the host PC 1 is in operation, other key inputs, i.e., those from the remote PCs are inhibited. On the other hand, while a key input from a given remote PC is generated, the operation of the keyboard 20 connected to the host PC 1 is inhibited. That is, when a key input of a given PC is generated, other key inputs can be disabled by executing the exclusion control that denies key inputs from other PCs.

This exclusion control can automatically give priority to key inputs from the keyboard in use without requiring any special mode setting operation.

Third Embodiment

Figure 11:
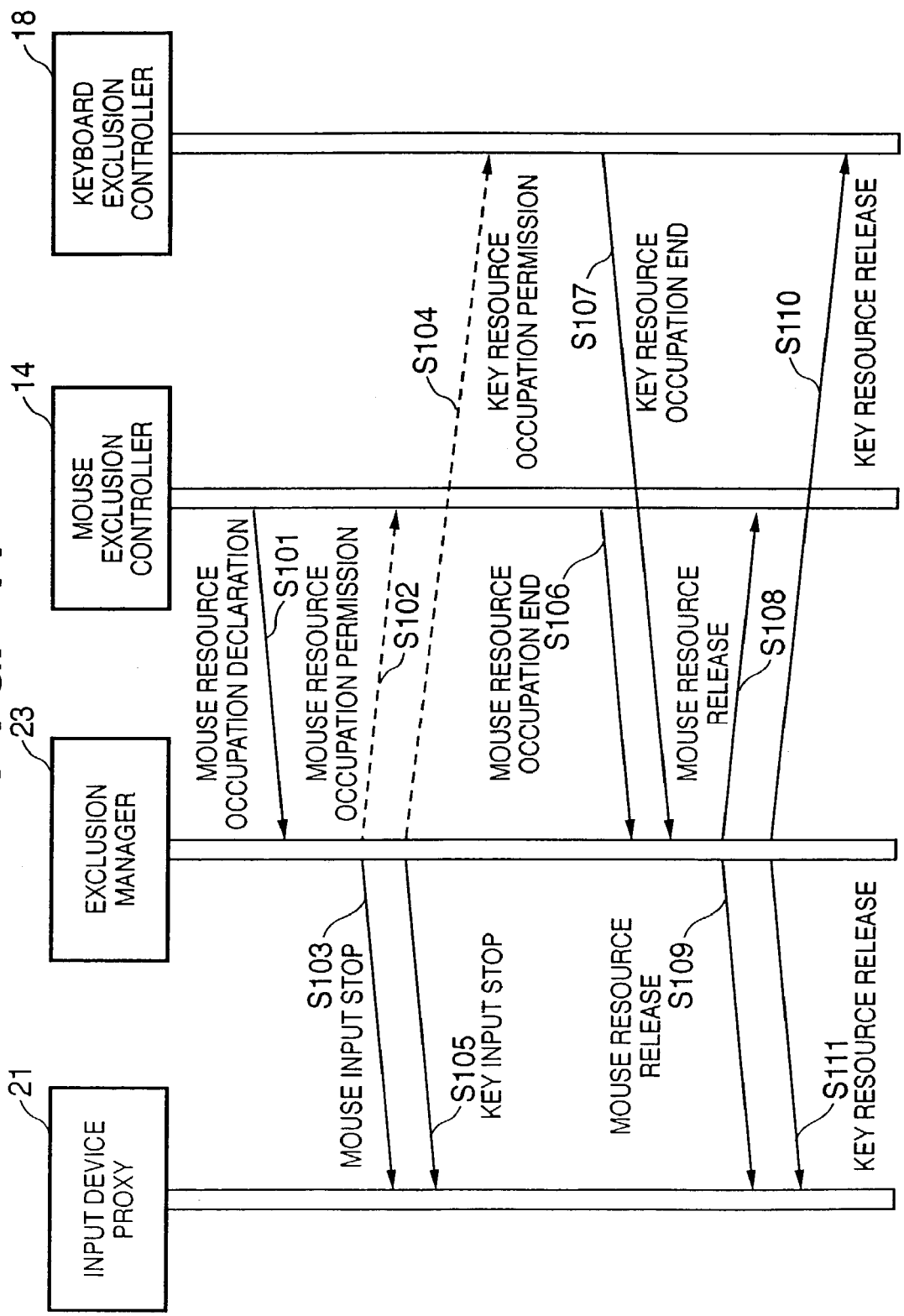
FIG. 11 is a chart showing the sequence of the third embodiment executed when the host PC gains control rights of mouse and key inputs by its mouse input.

FIG. 11 is a chart showing communications among the exclusion manager 23, input device proxy 21, mouse exclusion controller 14, and keyboard exclusion controller 18 according to the third embodiment. Especially, FIG. 11 shows the sequence executed when the host PC 1 gains control rights of mouse and key inputs.

Upon detection of an input from the mouse 16 connected to the host PC 1, the mouse exclusion controller 14 sends a mouse resource occupation declaration message to the exclusion manager 23 in step S101.

Upon reception of the mouse resource occupation declaration message, the exclusion manager 23 checks the occupation states of the mouse and key inputs. If the mouse and/or key inputs are not occupied by any other processes, the exclusion manager 23 sends a mouse resource occupation permission message to the mouse exclusion controller 14 in step S102. In step S103, the exclusion manager 23 sends a mouse input stop message to the input device proxy 21.

Furthermore, the exclusion manager 23 sends a key resource occupation permission message to the keyboard exclusion controller 18 in step S104. In step S105, the exclusion manager 23 sends a key input stop message to the input device proxy 21.

Upon completion of the inputs from the mouse 16 and keyboard 20 connected to the host PC 1, the mouse exclusion controller 14 sends a mouse resource occupation end message to the exclusion manager 23 in step S106. At the same time, the keyboard exclusion controller 18 sends a key resource occupation end message to the exclusion manager 23 in step S107.

Upon reception of the mouse and key resource occupation end messages, the exclusion manager 23 sends a mouse resource release message to the mouse exclusion controller 14 and input device proxy 21 in steps S108 and S109, thus ending the exclusion control of the mouse input. At the same time, the exclusion manager 23 sends a key resource release message to the keyboard exclusion controller 18 and input device proxy 21 in steps S110 and S111, thus ending the exclusion control of the key input.

Upon reception of the mouse resource release message, the mouse exclusion controller 14 and input device proxy 21 respectively execute processes for permitting corresponding mouse inputs. Also, upon reception of the key resource release message, the keyboard exclusion controller 18 and input device proxy 21 respectively execute processes for permitting corresponding key inputs.

Figure 12:
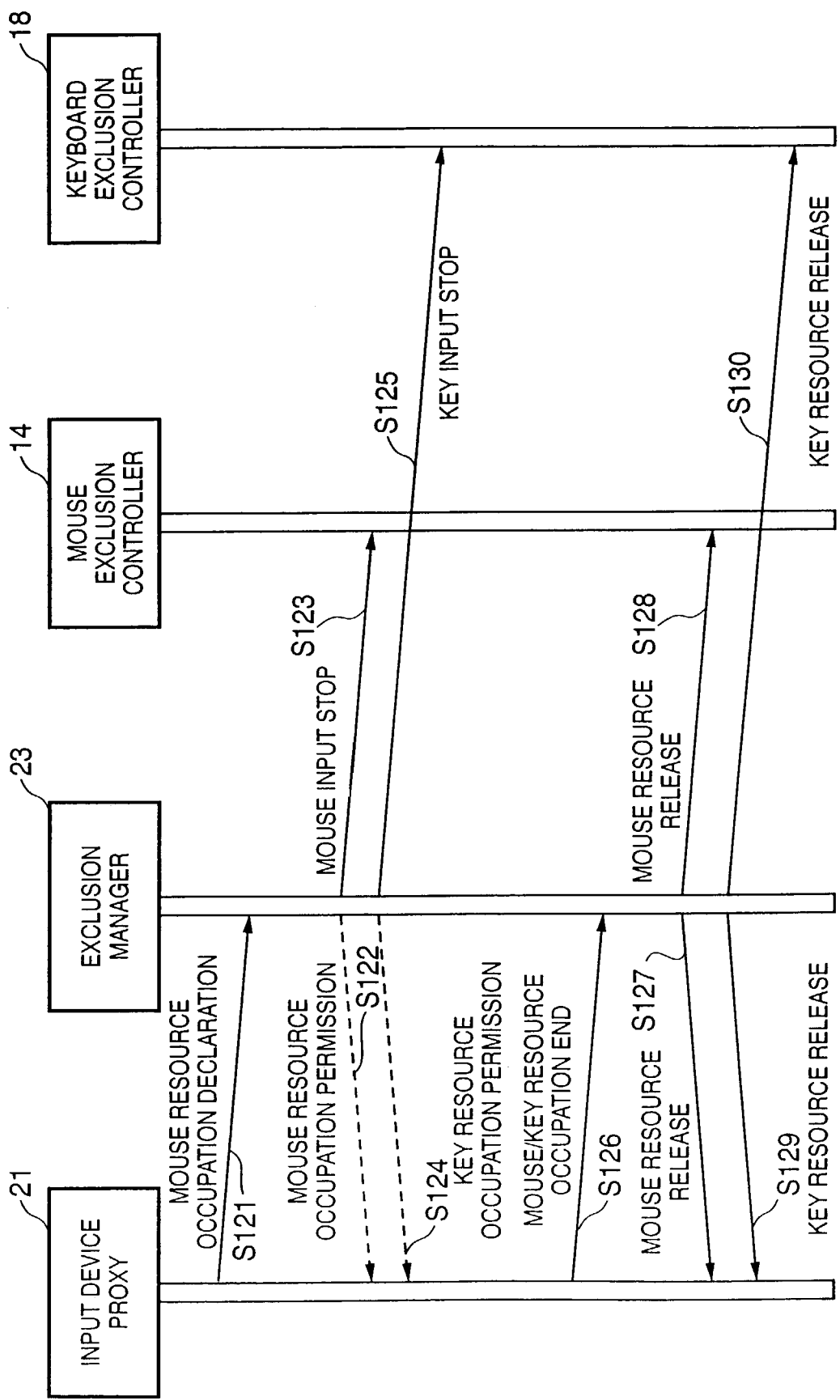
FIG. 12 is a chart showing the sequence of the third embodiment executed when the remote PC gains control rights of mouse and key inputs by its mouse input.

FIG. 12 is a chart showing communications among the exclusion manager 23, input device proxy 21, mouse exclusion controller 14, and keyboard exclusion controller 18 according to the third embodiment. Especially, FIG. 12 shows the sequence executed when the remote PC (e.g., the remote PC 3) gains control rights of mouse and key inputs.

Upon detection of a mouse input from the remote PC 3, the input device proxy 21 sends a mouse resource occupation declaration message to the exclusion manager 23 in step S121.

Upon reception of the mouse resource occupation declaration message, the exclusion manager 23 checks the occupation states of the mouse and key inputs. If the mouse and/or key inputs are not occupied by any other processes, the exclusion manager 23 sends a mouse resource occupation permission message to the input device proxy 21 instep S122. In step S123, the exclusion manager 23 sends a mouse input stop message to the mouse exclusion controller 14.

Furthermore, the exclusion manager 23 sends a key resource occupation permission message to the input device proxy 21 in step S124. In step S125, the exclusion manager 23 sends a key input stop message to the keyboard exclusion controller 18.

Upon completion of the mouse and key inputs from the remote PC 3, the input device proxy 21 sends a mouse/key resource occupation end message to the exclusion manager 23 in step S126.

Upon reception of the mouse/key resource occupation end message, the exclusion manager 23 sends a mouse resource release message to the input device proxy 21 and mouse exclusion controller 14 in steps S127 and S128, thus ending the exclusion control of the mouse input. At the same time, the exclusion manager 23 sends a key resource release message to the input device proxy 21 and keyboard exclusion controller 18 in steps S129 and S130, thus ending the exclusion control of the key input.

Upon reception of the mouse resource release message, the mouse exclusion controller 14 and input device proxy 21 respectively execute processes for permitting corresponding mouse inputs. Also, upon reception of the key resource release message, the keyboard exclusion controller 18 and input device proxy 21 respectively execute processes for permitting corresponding key inputs.

Figure 13:
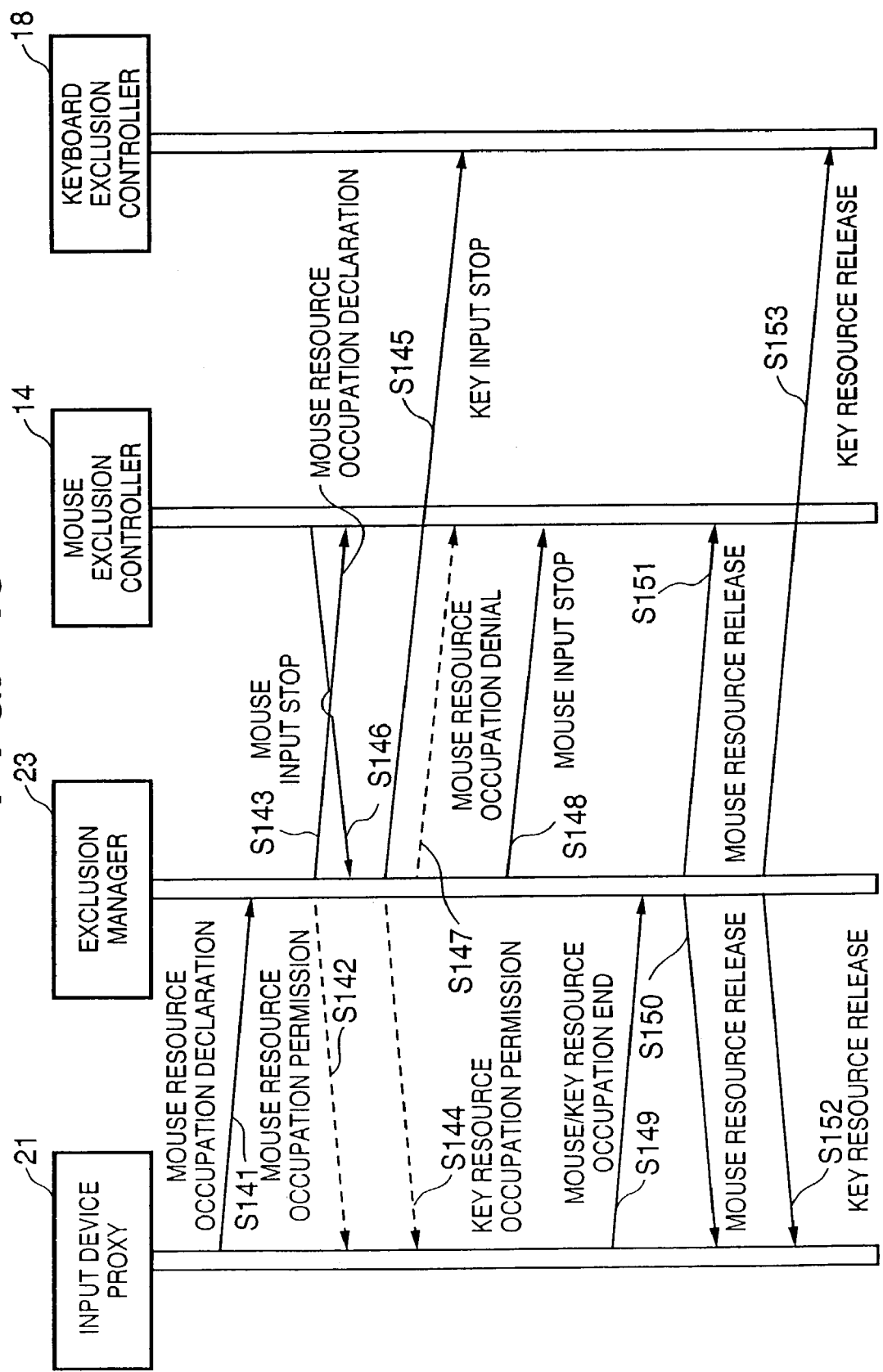
FIG. 13 is a chart showing the sequence of the third embodiment executed when the remote PC gains control rights of mouse and key inputs after contention between mouse inputs of the remote and host PCs.

FIG. 13 is a chart showing communications among the exclusion manager 23, input device proxy 21, mouse exclusion controller 14, and keyboard exclusion controller 18 according to the third embodiment. Especially, FIG. 13 shows the sequence executed when a mouse operation input of the remote PC (e.g., the remote PC 3) contends with an input from the mouse 16 connected to the host PC 1, and the remote PC 3 gains control rights of mouse and key inputs as a result of arbitration.

Upon detection of a mouse input from the remote PC 3, the input device proxy 21 sends a mouse resource occupation declaration message to the exclusion manager 23 in step S141.

Upon reception of the mouse resource occupation declaration message, the exclusion manager 23 checks the occupation states of the mouse and key inputs. If the mouse and key inputs are not occupied by any other processes, the exclusion manager 23 sends a mouse resource occupation permission message to the input device proxy 21 in step S142. In step S143, the exclusion manager 23 sends a mouse input stop message to the mouse exclusion controller 14.

Furthermore, the exclusion manager 23 sends a key resource occupation permission message to the input device proxy 21 in step S144. In step S145, the exclusion manager 23 sends a key input stop message to the keyboard exclusion controller 18.

At this time, if the mouse exclusion controller 14 has already sent a mouse resource occupation declaration message to the exclusion manager 23 before reception of a mouse input stop message, the exclusion manager 23 receives the mouse resource occupation declaration message from the mouse exclusion controller 14 in step S146, and checks the occupation state of the mouse resource. In this case, since the input device proxy 21 has occupied the mouse resource, the exclusion manager 23 sends a mouse resource occupation denial message to the mouse exclusion controller 14 in step S147. Furthermore, the exclusion manager 23 re-sends a mouse input stop message to the mouse exclusion controller 14 in step S148.

It is logically impossible to exchange messages among processes at the same time, and respective messages are enqueued in a message queue. The messages in the message queue are dequeued in a FIFO (first-in first-out) order. That is, in the example in FIG. 13, the message from the input device proxy 21 is enqueued in the message queue earlier than that from the mouse exclusion controller 14.

Also, since messages are processed one by one, the exclusion manager 23 receives the message in step S141, sends the message in step S143, and then receives the message in step S146.

Upon completion of the mouse and key inputs from the remote PC 3, the input device proxy 21 sends a mouse/key resource occupation end message to the exclusion manager 23 in step S149.

Upon reception of the mouse/key resource occupation end message, the exclusion manager 23 sends a mouse resource release message to the input device proxy 21 and mouse exclusion controller 14 in steps S150 and S151, thus ending the exclusion control of the mouse input. At the same time, the exclusion manager 23 sends a key resource release message to the input device proxy 21 and keyboard exclusion controller 18 in steps S152 and S153, thus ending the exclusion control of the key input.

Upon reception of the mouse resource release message, the mouse exclusion controller 14 and input device proxy 21 respectively execute processes for permitting corresponding mouse inputs. Also, upon reception of the key resource release message, the keyboard exclusion controller 18 and input device proxy 21 respectively execute processes for permitting corresponding key inputs.

Figure 14:
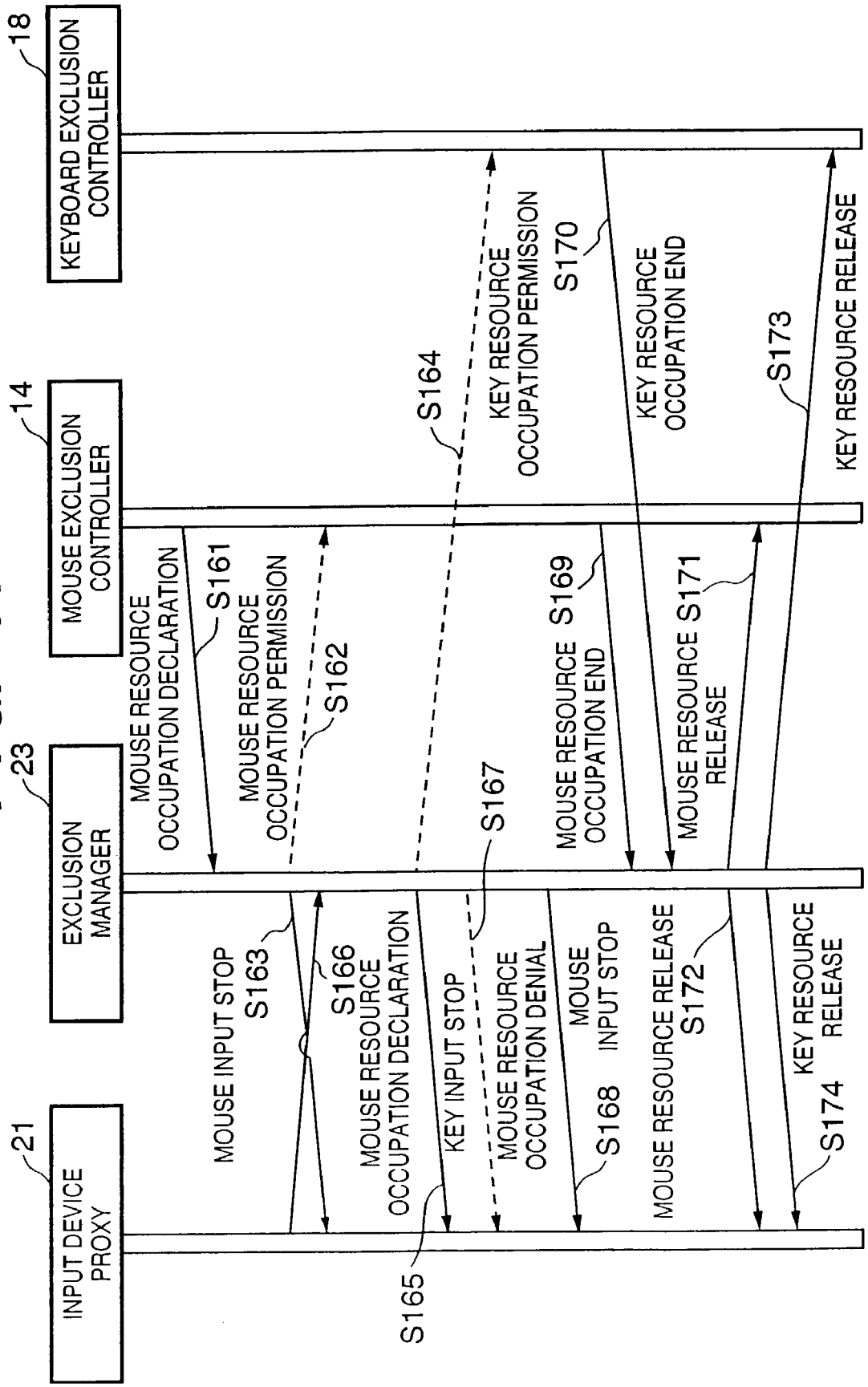
FIG. 14 is a chart showing the sequence of the third embodiment executed when the host PC gains control rights of mouse and key inputs after contention between mouse inputs of the remote and host PCs.

FIG. 14 is a chart showing communications among the exclusion manager 23, input device proxy 21, mouse exclusion controller 14, and keyboard exclusion controller 18 according to the third embodiment. Especially, FIG. 14 shows the sequence executed when an input from the mouse 16 connected to the host PC 1 contends with a mouse operation input of the remote PC (e.g., the remote PC 3), and the host PC 1 gains control rights of mouse and key inputs as a result of arbitration.

Upon detection of a mouse input from the host PC 1, the mouse exclusion controller 14 sends a mouse resource occupation declaration message to the exclusion manager 23 in step S161.

Upon reception of the mouse resource occupation declaration message, the exclusion manager 23 checks the occupation state of the mouse and key inputs. If the mouse and/or key inputs are not occupied by any other processes, the exclusion manager 23 sends a mouse resource occupation permission message to the mouse exclusion controller 14 in step S162. In step S163, the exclusion manager 23 sends a mouse input stop message to the input device proxy 21.

Furthermore, the exclusion manager 23 sends a key resource occupation permission message to the keyboard exclusion controller 18 in step S164. In step S165, the exclusion manager 23 sends a key input stop message to the input device proxy 21.

At this time, if the input device proxy 21 has already sent a mouse resource occupation declaration message to the exclusion manager 23 before reception of a mouse input stop message, the exclusion manager 23 receives the mouse resource occupation declaration message from the input device proxy 21 in step S166, and checks the occupation state of the mouse resource. In this case, since the mouse exclusion controller 14 has occupied the mouse resource, the exclusion manager 23 sends a mouse resource occupation denial message to the input device proxy 21 in step S167. Furthermore, the exclusion manager 23 re-sends a mouse input stop message to the input device proxy 21 in step S168.

It is logically impossible to exchange messages among processes at the same time, and respective messages are enqueued in a message queue. The messages in the message queue are dequeued in a FIFO (first-in first-out) order. That is, in the example in FIG. 14, the message from the mouse exclusion controller 14 is enqueued in the message queue earlier than that from the input device proxy 21.

Also, since messages are processed one by one, the exclusion manager 23 receives the message in step S161, sends the message in step S163, and then receives the message in step S166.

Upon completion of the inputs from the mouse 16 and keyboard 20 connected to the host PC 1, the mouse exclusion controller 14 sends a mouse resource occupation end message to the exclusion manager 23 in step S169. At the same time, the keyboard exclusion controller 18 sends a key resource occupation end message to the exclusion manager 23 in step S170.

Upon reception of the mouse and key resource occupation end messages, the exclusion manager 23 sends a mouse resource release message to the mouse exclusion controller 14 and input device proxy 21 in steps S171 and S172, thus ending the exclusion control of the mouse input. At the same time, the exclusion manager 23 sends a key resource release message to the keyboard exclusion controller 18 and input device proxy 21 in steps S173 and S174, thus ending the exclusion control of the key input.

Upon reception of the mouse resource release message, the mouse exclusion controller 14 and input device proxy 21 respectively execute processes for permitting corresponding mouse inputs. Also, upon reception of the key resource release message, the keyboard exclusion controller 18 and input device proxy 21 respectively execute processes for permitting corresponding key inputs.

<Effect of Third Embodiment>

As described above, according to the third embodiment, when the exclusion control of the mouse input from the mouse 16 connected to the host PC 1 is executed, the exclusion control of the key input from the keyboard 20 is also done. On the other hand, when the exclusion control of the mouse input of the remote PC is executed, the exclusion control of the key input is also done. In this manner, in addition to the effects explained in the first embodiment, even when the user designates a text input position using a mouse of the host PC 1 or remote PC, and then inputs text using its keyboard, key inputs from other PCs can be disabled.

This exclusion control can automatically give priority to the key input from the keyboard in use without requiring any special mode setting operation.

Fourth Embodiment

Figure 15:
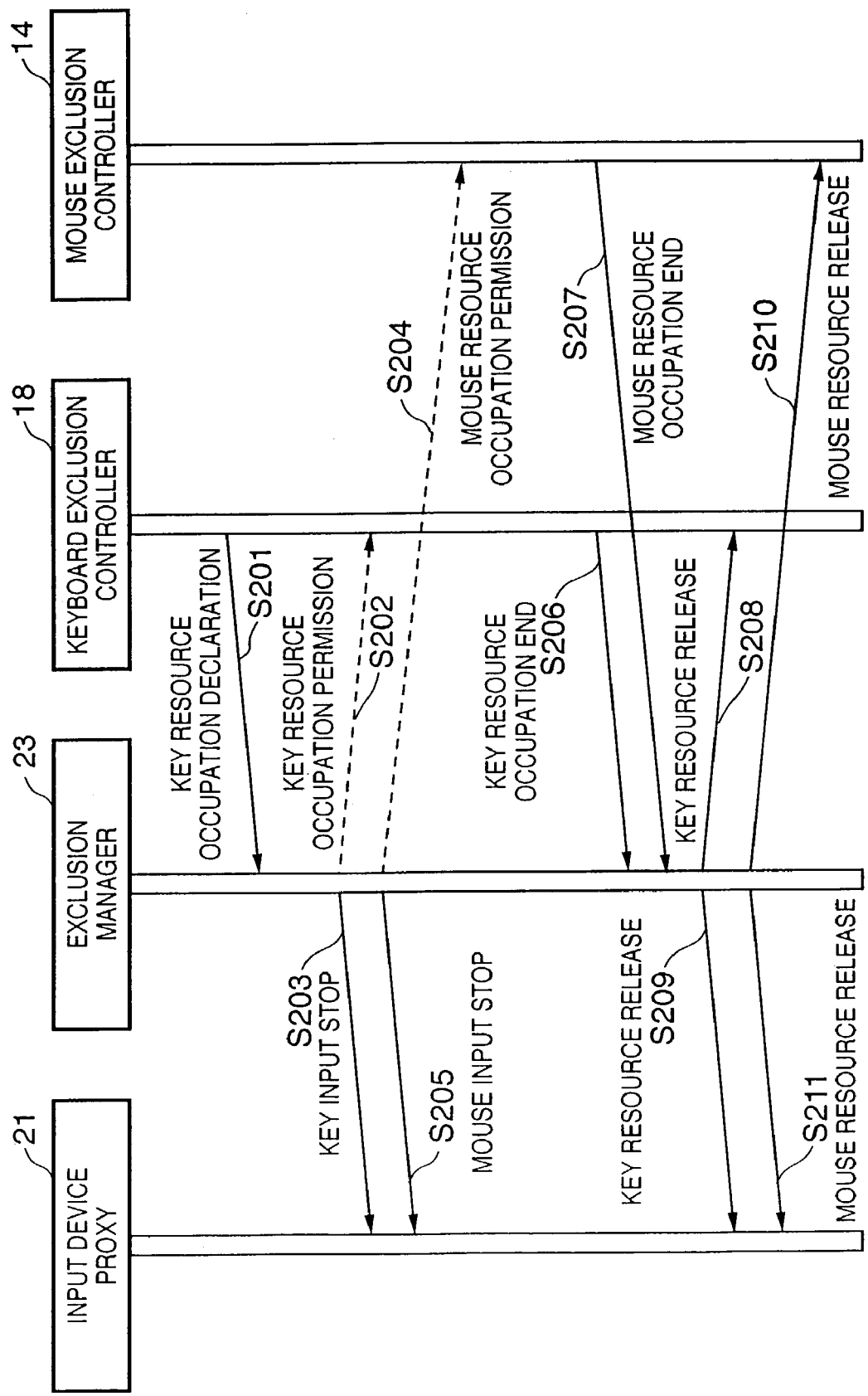
FIG. 15 is a chart showing the sequence of the fourth embodiment executed when the host PC gains control rights of mouse and key inputs by its key input.

FIG. 15 is a chart showing communications among the exclusion manager 23, input device proxy 21, mouse exclusion controller 14, and keyboard exclusion controller 18 according to the fourth embodiment. Especially, FIG. 15 shows the sequence executed when the host PC 1 gains control rights of mouse and key inputs.

Upon detection of an input from the keyboard 20 connected to the host PC 1, the keyboard exclusion controller 18 sends a key resource occupation declaration message to the exclusion manager 23 in step S201.

Upon reception of the key resource occupation declaration message, the exclusion manager 23 checks the occupation states of the key and mouse inputs. If the key and/or mouse inputs are not occupied by any other processes, the exclusion manager 23 sends a key resource occupation permission message to the keyboard exclusion controller 18 in step S202. In step S203, the exclusion manager 23 sends a key input stop message to the input device proxy 21.

Furthermore, the exclusion manager 23 sends a mouse resource occupation permission message to the mouse exclusion controller 14 in step S204. In step S205, the exclusion manager 23 sends a mouse input stop message to the input device proxy 21.

Upon completion of the inputs from the keyboard 20 and mouse 16 connected to the host PC 1, the keyboard exclusion controller 18 sends a key resource occupation end message to the exclusion manager 23 in step S206. At the same time, the mouse exclusion controller 14 sends a mouse resource occupation end message to the exclusion manager 23 in step S207.

Upon reception of the key and mouse resource occupation end messages, the exclusion manager 23 sends a key resource release message to the keyboard exclusion controller 18 and input device proxy 21 in steps S208 and S209, thus ending the exclusion control of the key input. At the same time, the exclusion manager 23 sends a mouse resource release message to the mouse exclusion controller 14 and input device proxy 21 in steps S210 and S211, thus ending the exclusion control of the mouse input.

Upon reception of the key resource release message, the keyboard exclusion controller 18 and input device proxy 21 respectively execute processes for permitting corresponding key inputs. Also, upon reception of the mouse resource release message, the mouse exclusion controller 14 and input device proxy 21 respectively execute processes for permitting corresponding mouse inputs.

Figure 16:
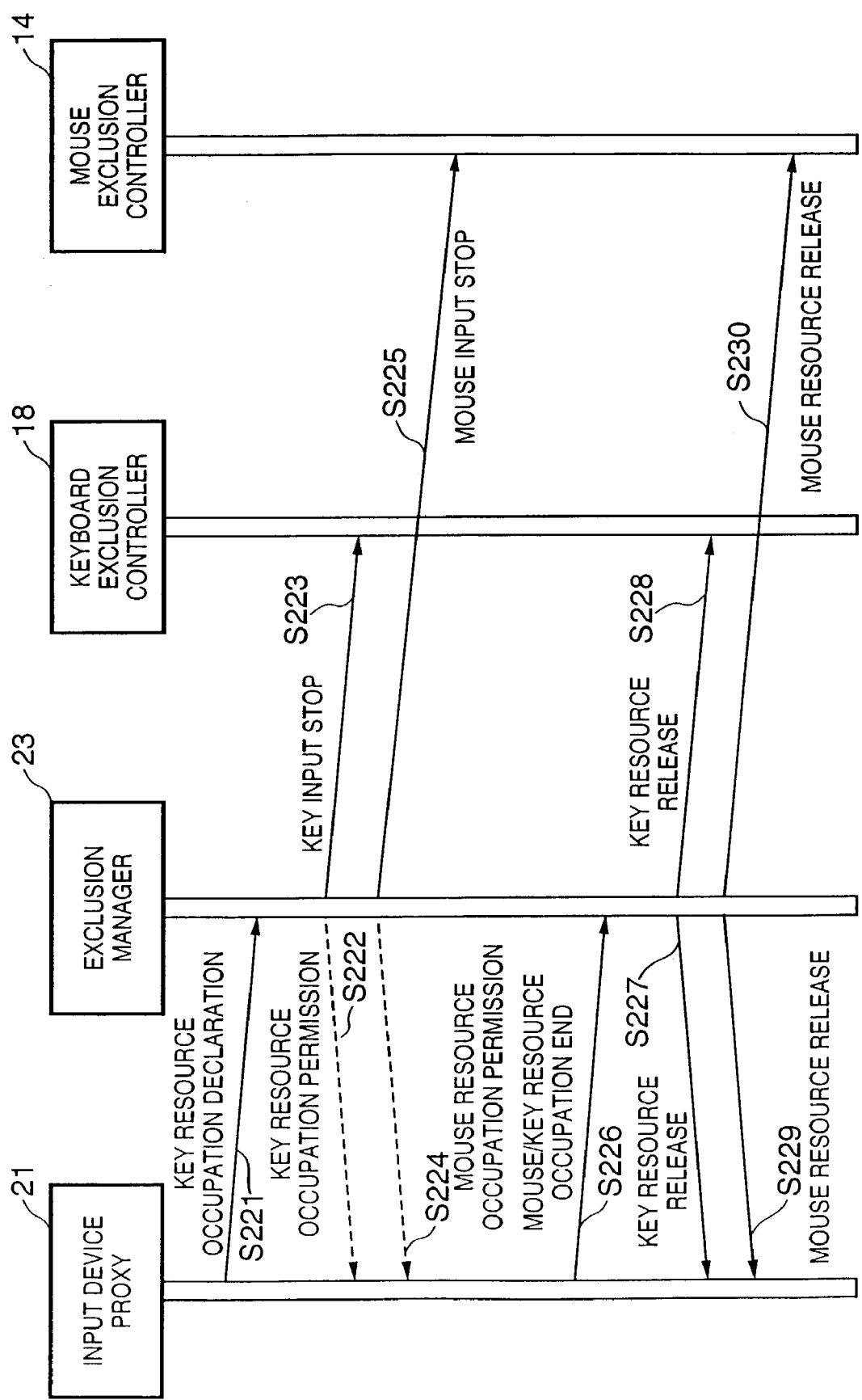
FIG. 16 is a chart showing the sequence of the fourth embodiment executed when the remote PC gains control rights of mouse and key inputs by its key input.

FIG. 16 is a chart showing communications among the exclusion manager 23, input device proxy 21, mouse exclusion controller 14, and keyboard exclusion controller 18 according to the fourth embodiment. Especially, FIG. 16 shows the sequence executed when the remote PC (e.g., the remote PC 3) gains control rights of mouse and key inputs.

Upon detection of a key input from the remote PC 3, the input device proxy 21 sends a key resource occupation declaration message to the exclusion manager 23 in step S221.

Upon reception of the key resource occupation declaration message, the exclusion manager 23 checks the occupation states of the key and mouse inputs. If the key and/or mouse inputs are not occupied by any other processes, the exclusion manager 23 sends a key resource occupation permission message to the input device proxy 21 in step S222. In step S223, the exclusion manager 23 sends a key input stop message to the keyboard exclusion controller 18.

Furthermore, the exclusion manager 23 sends a mouse resource occupation permission message to the input device proxy 21 in step S224. In step S225, the exclusion manager 23 sends a mouse input stop message to the mouse exclusion controller 14.

Upon completion of the key and mouse inputs from the remote PC 3, the input device proxy 21 sends a mouse/key resource occupation end message to the exclusion manager 23 in step S226.

Upon reception of the mouse/key resource occupation end message, the exclusion manager 23 sends a key resource release message to the input device proxy 21 and keyboard exclusion controller 18 in steps S227 and S228, thus ending the exclusion control of the mouse input. At the same time, the exclusion manager 23 sends a mouse resource release message to the input device proxy 21 and mouse exclusion controller 14 in steps S229 and S230, thus ending the exclusion control of the mouse input.

Upon reception of the key resource release message, the input device proxy 21 and keyboard exclusion controller 18 respectively execute processes for permitting corresponding key inputs. Also, upon reception of the mouse resource release message, the mouse exclusion controller 14 and input device proxy 21 respectively execute processes for permitting corresponding mouse inputs.

Figure 17:
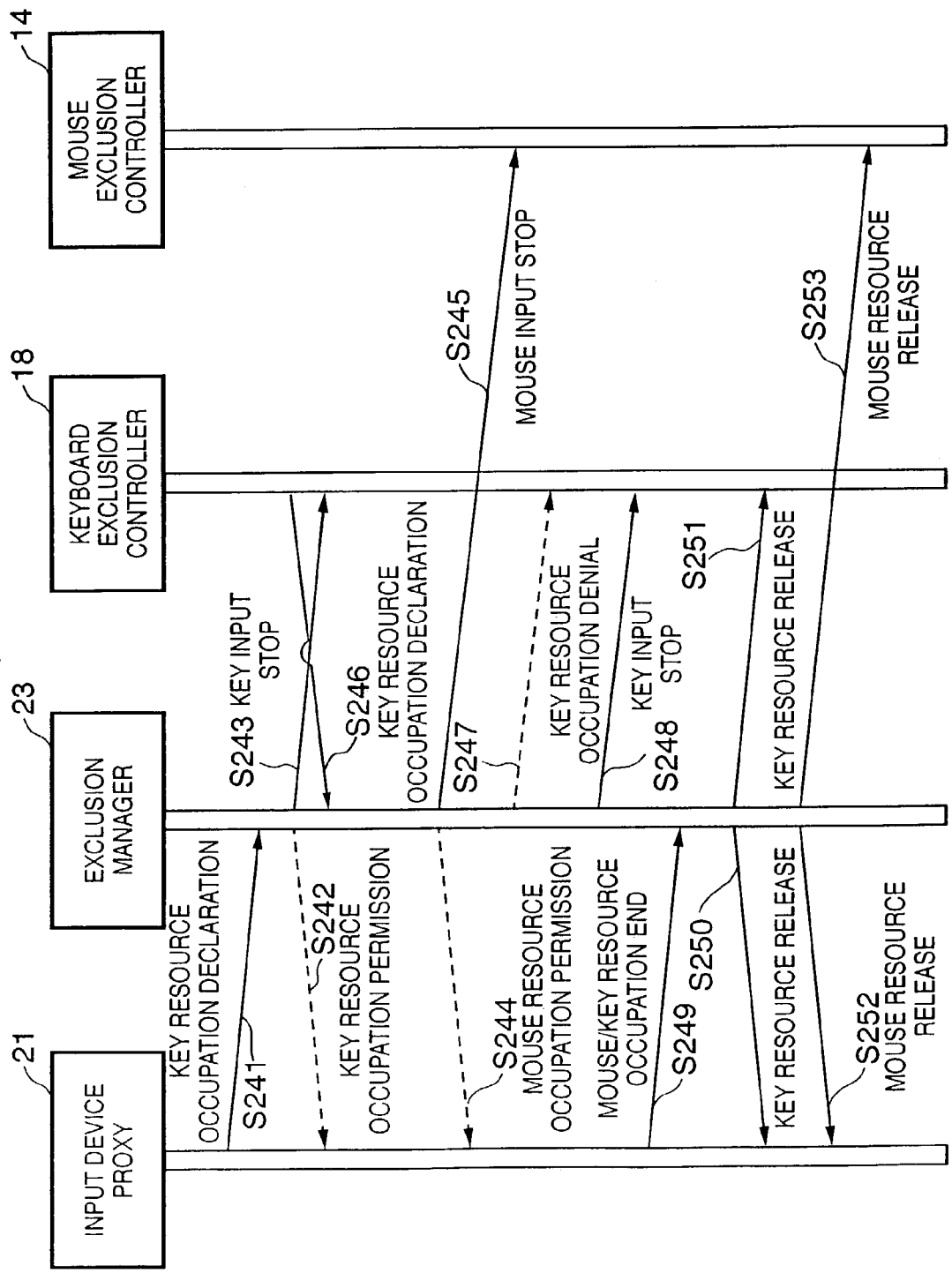
FIG. 17 is a chart showing the sequence of the fourth embodiment executed when the remote PC gains control rights of mouse and key inputs after contention between key inputs of the remote and host PCs.

FIG. 17 is a chart showing communications among the exclusion manager 23, input device proxy 21, mouse exclusion controller 14, and keyboard exclusion controller 18 according to the fourth embodiment. Especially, FIG. 17 shows the sequence executed when a key input of the remote PC (e.g., the remote PC 3) contends with an input from the keyboard 20 connected to the host PC 1, and the remote PC 3 gains control rights of key and mouse inputs as a result of arbitration.

Upon detection of a key input from the remote PC 3, the input device proxy 21 sends a key resource occupation declaration message to the exclusion manager 23 in step S241.

Upon reception of the key resource occupation declaration message, the exclusion manager 23 checks the occupation states of the key and mouse inputs. If the key and/or mouse inputs are not occupied by any other processes, the exclusion manager 23 sends a key resource occupation permission message to the input device proxy 21 instep S242. In step S243, the exclusion manager 23 sends a key input stop message to the keyboard exclusion controller 18.

Furthermore, the exclusion manager 23 sends a mouse resource occupation permission message to the input device proxy 21 in step S244. In step S245, the exclusion manager 23 sends a mouse input stop message to the mouse exclusion controller 14.

At this time, if the keyboard exclusion controller 18 has already sent a key resource occupation declaration message to the exclusion manager 23 before reception of a key input stop message, the exclusion manager 23 receives the key resource occupation declaration message from the keyboard exclusion controller 18 in step S246, and checks the occupation state of the key resource. In this case, since the input device proxy 21 has occupied the key resource, the exclusion manager 23 sends a key resource occupation denial message to the keyboard exclusion controller 18 in step S247. Furthermore, the exclusion manager 23 re-sends a key input stop message to the keyboard exclusion controller 18 in step S248.

It is logically impossible to exchange messages among processes at the same time, and respective messages are enqueued in a message queue. The messages in the message queue are dequeued in a FIFO (first-in first-out) order. That is, in the example in FIG. 17, the message from the input device proxy 21 is enqueued in the message queue earlier than that from the keyboard exclusion controller 18.

Also, since messages are processed one by one, the exclusion manager 23 receives the message in step S241, sends the message in step S243, and then receives the message in step S246.

Upon completion of the key and mouse inputs from the remote PC 3, the input device proxy 21 sends a mouse/key resource occupation end message to the exclusion manager 23 in step S249.

Upon reception of the mouse/key resource occupation end message, the exclusion manager 23 sends a key resource release message to the input device proxy 21 and keyboard exclusion controller 18 in steps S250 and S251, thus ending the exclusion control of the key input. At the same time, the exclusion manager 23 sends a mouse resource release message to the input device proxy 21 and mouse exclusion controller 14 in steps S252 and S253, thus ending the exclusion control of the mouse input.

Upon reception of the key resource release message, the keyboard exclusion controller 18 and input device proxy 21 respectively execute processes for permitting corresponding key inputs. Also, upon reception of the mouse resource release message, the mouse exclusion controller 14 and input device proxy 21 respectively execute processes for permitting corresponding mouse inputs.

Figure 18:
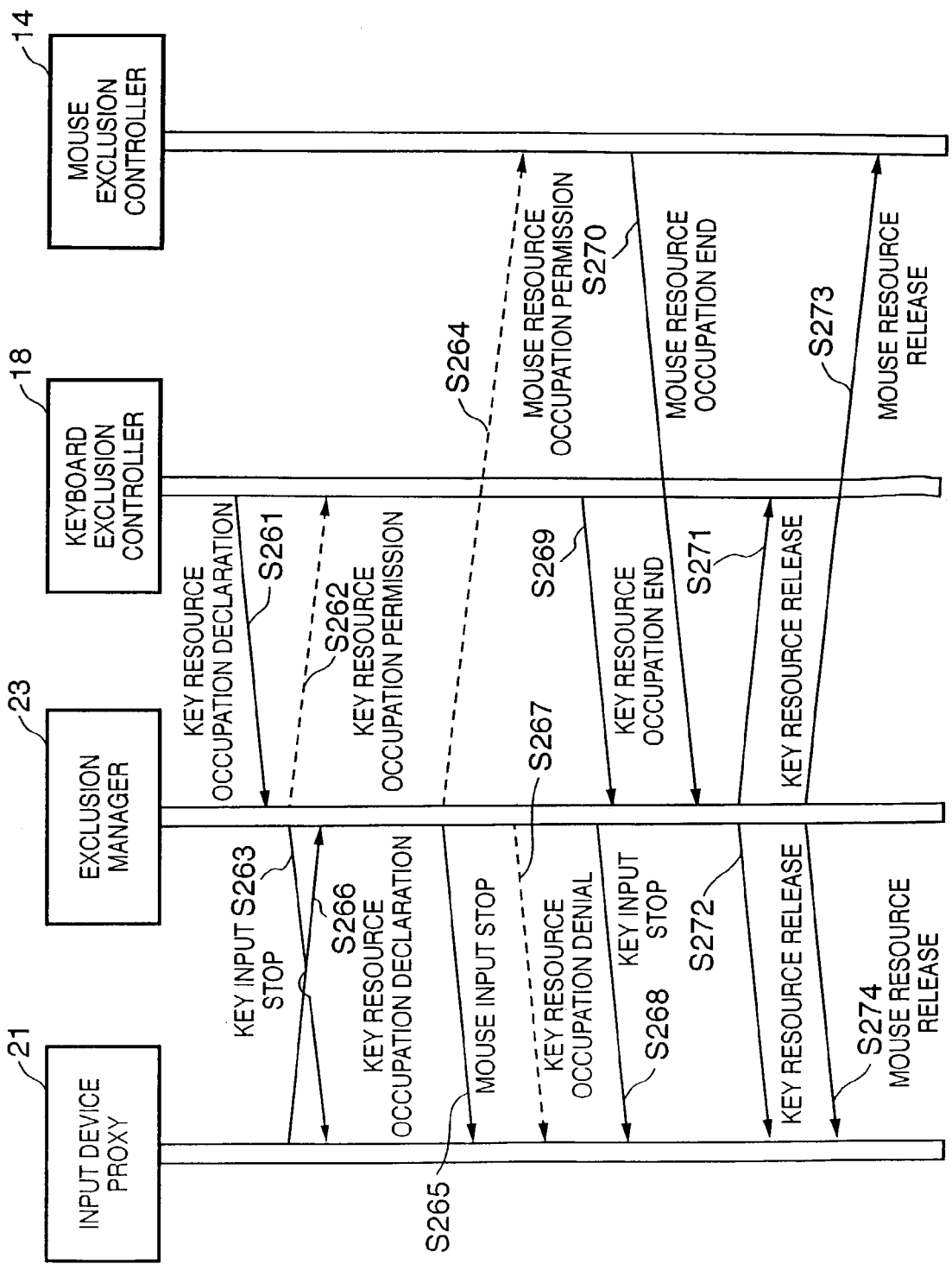
FIG. 18 is a chart showing the sequence of the fourth embodiment executed when the host PC gains control rights of mouse and key inputs after contention between key inputs of the remote and host PCs.

FIG. 18 is a chart showing communications among the exclusion manager 23, input device proxy 21, mouse exclusion controller 14, and keyboard exclusion controller 18 according to the fourth embodiment. Especially, FIG. 18 shows the sequence executed when a key input from the keyboard 20 connected to the host PC 1 contends with a key input of the remote PC (e.g., the remote PC 3), and the host PC 1 gains control rights of key and mouse inputs as a result of arbitration.

Upon detection of a key input from the host PC 1, the keyboard exclusion controller 18 sends a key resource occupation declaration message to the exclusion manager 23 in step S261.

Upon reception of the key resource occupation declaration message, the exclusion manager 23 checks the occupation state of the key and mouse inputs. If the key and/or mouse inputs are not occupied by any other processes, the exclusion manager 23 sends a key resource occupation permission message to the keyboard exclusion controller 18 in step S262. In step S263, the exclusion manager 23 sends a key input stop message to the input device proxy 21.

Furthermore, the exclusion manager 23 sends a mouse resource occupation permission message to the mouse exclusion controller 14 in step S264. In step S265, the exclusion manager 23 sends a mouse input stop message to the input device proxy 21.

At this time, if the input device proxy 21 has already sent a key resource occupation declaration message to the exclusion manager 23 before reception of a key input stop message, the exclusion manager 23 receives the key resource occupation declaration message from the input device proxy 21 in step S266, and checks the occupation state of the key resource. In this case, since the keyboard exclusion controller 18 has occupied the key resource, the exclusion manager 23 sends a key resource occupation denial message to the input device proxy 21 in step S267. Furthermore, the exclusion manager 23 re-sends a key input stop message to the input device proxy 21 in step S268.

It is logically impossible to exchange messages among processes at the same time, and respective messages are enqueued in a message queue. The messages in the message queue are dequeued in a FIFO (first-in first-out) order. That is, in the example in FIG. 18, the message from the keyboard exclusion controller 18 is enqueued in the message queue earlier than that from the input device proxy 21.

Also, since messages are processed one by one, the exclusion manager 23 receives the message in step S261, sends the message in step S263, and then receives the message in step S266.

Upon completion of the inputs from the keyboard 20 and mouse 16 connected to the host PC 1, the keyboard exclusion controller 18 sends a key resource occupation end message to the exclusion manager 23 in step S269. At the same time, the mouse exclusion controller 14 sends a mouse resource occupation end message to the exclusion manager 23 in step S270.

Upon reception of the key and mouse resource occupation end messages, the exclusion manager 23 sends a key resource release message to the keyboard exclusion controller 18 and input device proxy 21 in steps S271 and S272, thus ending the exclusion control of the key input. At the same time, the exclusion manager 23 sends a mouse resource release message to the mouse exclusion controller 14 and input device proxy 21 in steps S273 and S274, thus ending the exclusion control of the mouse input.

Upon reception of the key resource release message, the keyboard exclusion controller 18 and input device proxy 21 respectively execute processes for permitting corresponding key inputs. Also, upon reception of the mouse resource release message, the mouse exclusion controller 14 and input device proxy 21 respectively execute processes for permitting corresponding mouse inputs.

<Effect of Fourth Embodiment>

As described above, according to the fourth embodiment, when the exclusion control of the key input from the keyboard 20 connected to the host PC 1 is executed, the exclusion control of the mouse input from the mouse 16 is also done. On the other hand, when the exclusion control of the key input of the remote PC is executed, the exclusion control of the mouse input is also done. In this manner, in addition to the effects explained in the second embodiment, during a key input at the host PC 1 or remote PC, a mouse input from another PC (e.g., a mouse input from another PC that designates to move a text input cursor) can be disabled.

This exclusion control can automatically give priority to key inputs from the keyboard in use without requiring any special mode setting operation.

Fifth Embodiment

Figure 19:
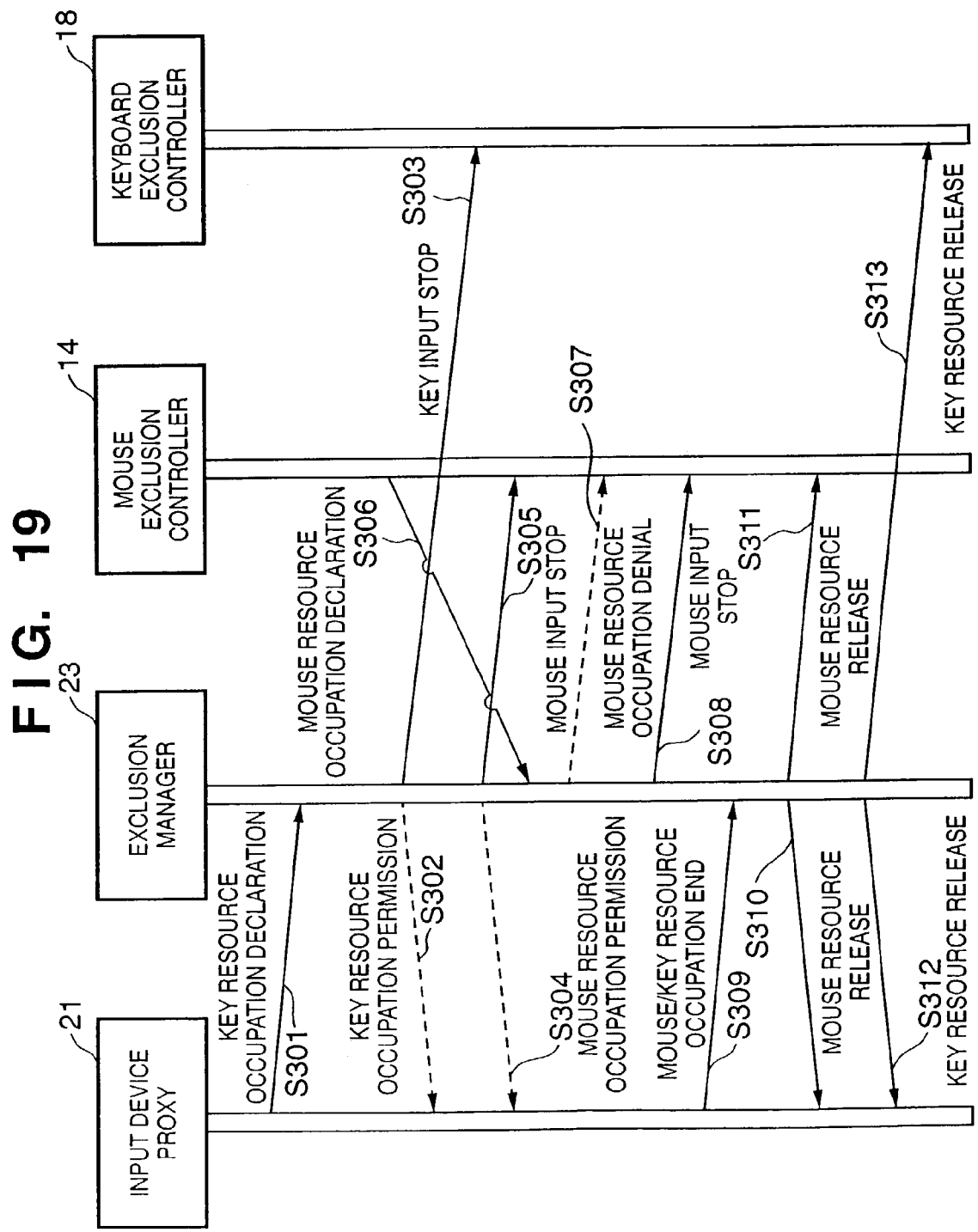
FIG. 19 is a chart showing the sequence of the fifth embodiment executed when the remote PC gains control rights of mouse and key inputs after contention between a key input of the remote PC and a mouse input of the host PC.

FIG. 19 is a chart showing communications among the exclusion manager 23, input device proxy 21, mouse exclusion controller 14, and keyboard exclusion controller 18 according to the fifth embodiment. Especially, FIG. 19 shows the sequence executed when a key input of the remote PC (e.g., the remote PC 3) contends with an input from the mouse 16 connected to the host PC 1, and the remote PC 3 gains control rights of mouse and key inputs as a result of arbitration.

Upon detection of a key input from the remote PC 3, the input device proxy 21 sends a key resource occupation declaration message to the exclusion manager 23 in step S301.

Upon reception of the key resource occupation declaration message, the exclusion manager 23 checks the occupation states of the key and mouse inputs. If the key and/or mouse inputs are not occupied by any other processes, the exclusion manager 23 sends a key resource occupation permission message to the input device proxy 21 in step S302. In step S303, the exclusion manager 23 sends a key input stop message to the keyboard exclusion controller 18.

Furthermore, the exclusion manager 23 sends a mouse resource occupation permission message to the input device proxy 21 in step S304. In step S305, the exclusion manager 23 sends a mouse input stop message to the mouse exclusion controller 14.

At this time, if the mouse exclusion controller 14 has already sent a mouse resource occupation declaration message to the exclusion manager 23 before reception of a mouse input stop message, the exclusion manager 23 receives the mouse resource, occupation declaration message from the mouse exclusion controller 14 in step S306, and checks the occupation state of the mouse and key resource.

In this case, since the input device proxy 21 has occupied the mouse resource, the exclusion manager 23 sends a mouse resource occupation denial message to the mouse exclusion controller 14 in step S307. Furthermore, the exclusion manager 23 re-sends a mouse input stop message to the mouse exclusion controller 14 in step S308.

It is logically impossible to exchange messages among processes at the same time, and respective messages are enqueued in a message queue. The messages in the message queue are dequeued in a FIFO (first-in first-out) order. That is, in the example in FIG. 19, the message from the input device proxy 21 is enqueued in the message queue earlier than that from the mouse exclusion controller 14.

Also, since messages are processed one by one, the exclusion manager 23 receives the message in step S301, sends the messages in steps S303 and S305, and then receives the message in step S306.

Upon completion of the key and mouse inputs from the remote PC 3, the input device proxy 21 sends a mouse/key resource occupation end message to the exclusion manager 23 in step S309.

Upon reception of the mouse/key resource occupation end message, the exclusion manager 23 sends a mouse resource release message to the input device proxy 21 and mouse exclusion controller 14 in steps S310 and S311, thus ending the exclusion control of the mouse input. At the same time, the exclusion manager 23 sends a key resource release message to the input device proxy 21 and keyboard exclusion controller 18 in steps S312 and S313, thus ending the exclusion control of the key input.

Upon reception of the mouse resource release message, the mouse exclusion controller 14 and input device proxy 21 respectively execute processes for permitting corresponding mouse inputs. Also, upon reception of the key resource release message, the keyboard exclusion controller 18 and input device proxy 21 respectively execute processes for permitting corresponding key inputs.

Figure 20:
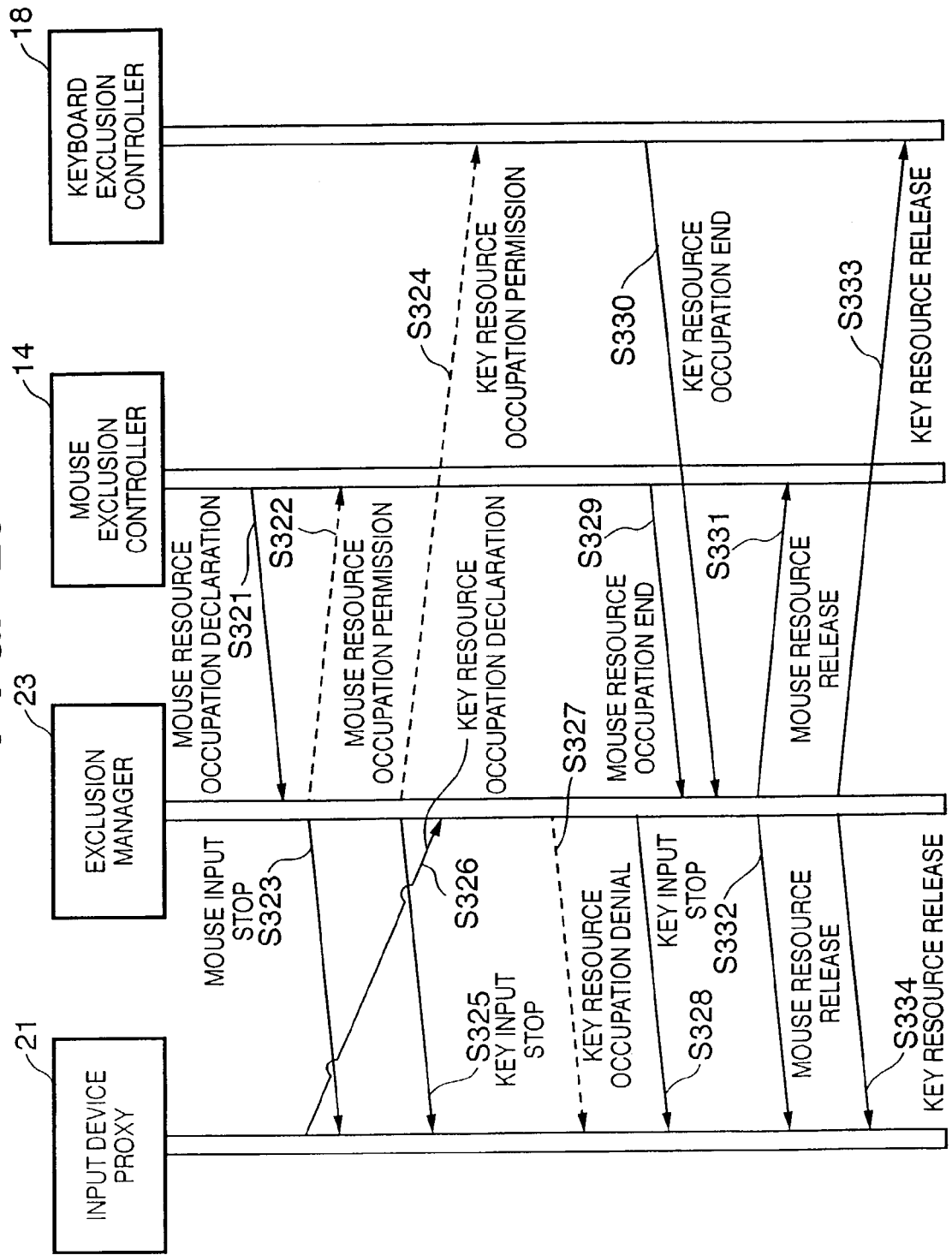
FIG. 20 is a chart showing the sequence of the fifth embodiment executed when the host PC gains control rights of mouse and key inputs after contention between a mouse input of the host PC and a key input of the remote PC.

FIG. 20 is a chart showing communications among the exclusion manager 23, input device proxy 21, mouse exclusion controller 14, and keyboard exclusion controller 18 according to the fifth embodiment. Especially, FIG. 20 shows the sequence executed when an input from the mouse 16 connected to the host PC 1 contends with a key input of the remote PC (e.g., the remote PC 3), and the host PC 1 gains control rights of mouse and key inputs as a result of arbitration.

Upon detection of a mouse input from the host PC 1, the mouse exclusion controller 14 sends a mouse resource occupation declaration message to the exclusion manager 23 in step S321.

Upon reception of the mouse resource occupation declaration message, the exclusion manager 23 checks the occupation state of the mouse and key inputs. If the mouse and/or key inputs are not occupied by any other processes, the exclusion manager 23 sends a mouse resource occupation permission message to the mouse exclusion controller 14 in step S322. In step S323, the exclusion manager 23 sends a mouse input stop message to the input device proxy 21.

Furthermore, the exclusion manager 23 sends a key resource occupation permission message to the keyboard exclusion controller 18 in step S324. In step S325, the exclusion manager 23 sends a key input stop message to the input device proxy 21.

At this time, if the input device proxy 21 has already sent a key resource occupation declaration message to the exclusion manager 23 before reception of a key input stop message, the exclusion manager 23 receives the key resource occupation declaration message from the input device proxy 21 in step S326, and checks the occupation state of the key resource. In this case, since the keyboard exclusion controller 18 has occupied the key resource, the exclusion manager 23 sends a key resource occupation denial message to the input device proxy 21 in step S327. Furthermore, the exclusion manager 23 re-sends a key input stop message to the input device proxy 21 in step S328.

It is logically impossible to exchange messages among processes at the same time, and respective messages are enqueued in a message queue. The messages in the message queue are dequeued in a FIFO (first-in first-out) order. That is, in the example in FIG. 20, the message from the mouse exclusion controller 14 is enqueued in the message queue earlier than that from the input device proxy 21.

Also, since messages are processed one by one, the exclusion manager 23 receives the message in step S321, sends the messages in steps S323 and S325, and then receives the message in step S326.

Upon completion of the inputs from the mouse 16 and keyboard 20 connected to the host PC 1, the mouse exclusion controller 14 sends a mouse resource occupation end message to the exclusion manager 23 in step S329. At the same time, the keyboard exclusion controller 18 sends a key resource occupation end message to the exclusion manager 23 in step S330.

Upon reception of the mouse and key resource occupation end messages, the exclusion manager 23 sends a mouse resource release message to the mouse exclusion controller 14 and input device proxy 21 in steps S331 and S332, thus ending the exclusion control of the mouse input. At the same time, the exclusion manager 23 sends a key resource release message to the keyboard exclusion controller 18 and input device proxy 21 in steps S333 and S334, thus ending the exclusion control of the key input.

Upon reception of the mouse resource release message, the mouse exclusion controller 14 and input device proxy 21 respectively execute processes for permitting corresponding mouse inputs. Also, upon reception of the key resource release message, the keyboard exclusion controller 18 and input device proxy 21 respectively execute processes for permitting corresponding key inputs.

Figure 21:
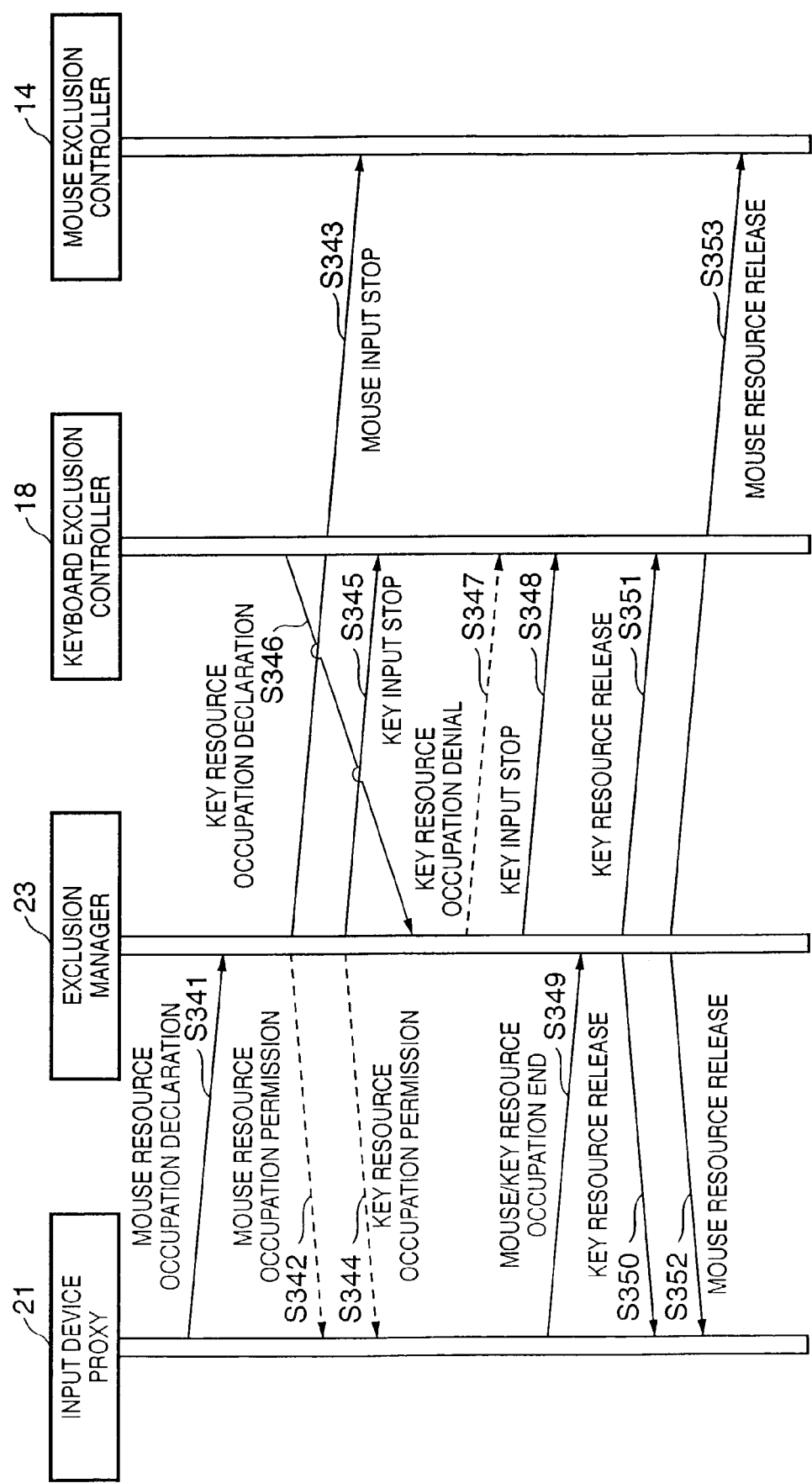
FIG. 21 is a chart showing the sequence of the fifth embodiment executed when the remote PC gains control rights of mouse and key inputs after contention between a mouse input of the remote PC and a key input of the host PC.

FIG. 21 is a chart showing communications among the exclusion manager 23, input device proxy 21, keyboard exclusion controller 18, and mouse exclusion controller 14 according to the fifth embodiment. Especially, FIG. 21 shows the sequence executed when a mouse input of the remote PC (e.g., the remote PC 3) contends with a key input from the keyboard 20 connected to the host PC 1, and the remote PC 3 gains control rights of mouse and key inputs as a result of arbitration.

Upon detection of a mouse input from the remote PC 3, the input device proxy 21 sends a mouse resource occupation declaration message to the exclusion manager 23 in step S341.

Upon reception of the mouse resource occupation declaration message, the exclusion manager 23 checks the occupation states of the mouse and key inputs. If the mouse and/or key inputs are not occupied by any other processes, the exclusion manager 23 sends a mouse resource occupation permission message to the input device proxy 21 in step S342. In step S343, the exclusion manager 23 sends a mouse input stop message to the mouse exclusion controller 14.

Furthermore, the exclusion manager 23 sends a key resource occupation permission message to the input device proxy 21 in step S344. In step S345, the exclusion manager 23 sends a key input stop message to the keyboard exclusion controller 18.

At this time, if the keyboard exclusion controller 18 has already sent a key resource occupation declaration message to the exclusion manager 23 before reception of a key input stop message, the exclusion manager 23 receives the key resource occupation declaration message from the keyboard exclusion controller 18 in step S346, and checks the occupation state of the key resource. In this case, since the input device proxy 21 has occupied the key resource, the exclusion manager 23 sends a key resource occupation denial message to the keyboard exclusion controller 18 in step S347. Furthermore, the exclusion manager 23 re-sends a key input stop message to the keyboard exclusion controller 18 in step S348.

It is logically impossible to exchange messages among processes at the same time, and respective messages are enqueued in a message queue. The messages in the message queue are dequeued in a FIFO (first-in first-out) order. That is, in the example in FIG. 21, the message from the input device proxy 21 is enqueued in the message queue earlier than that from the keyboard exclusion controller 18.

Also, since messages are processed one by one, the exclusion manager 23 receives the message in step S341, sends the messages in steps S343 and S345, and then receives the message in step S346.

Upon completion of the mouse and key inputs from the remote PC 3, the input device proxy 21 sends a mouse/key resource occupation end message to the exclusion manager 23 in step S349.

Upon reception of the mouse/key resource occupation end message, the exclusion manager 23 sends a key resource release message to the input device proxy 21 and keyboard exclusion controller 18 in steps S350 and S351, thus ending the exclusion control of the key input. At the same time, the exclusion manager 23 sends a mouse resource release message to the input device proxy 21 and mouse exclusion controller 14 in steps S352 and S353, thus ending the exclusion control of the mouse input.

Upon reception of the key resource release message, the keyboard exclusion controller 18 and input device proxy 21 respectively execute processes for permitting corresponding key inputs. Also, upon reception of the mouse resource release message, the mouse exclusion controller 14 and input device proxy 21 respectively execute processes for permitting corresponding mouse inputs.

Figure 22:
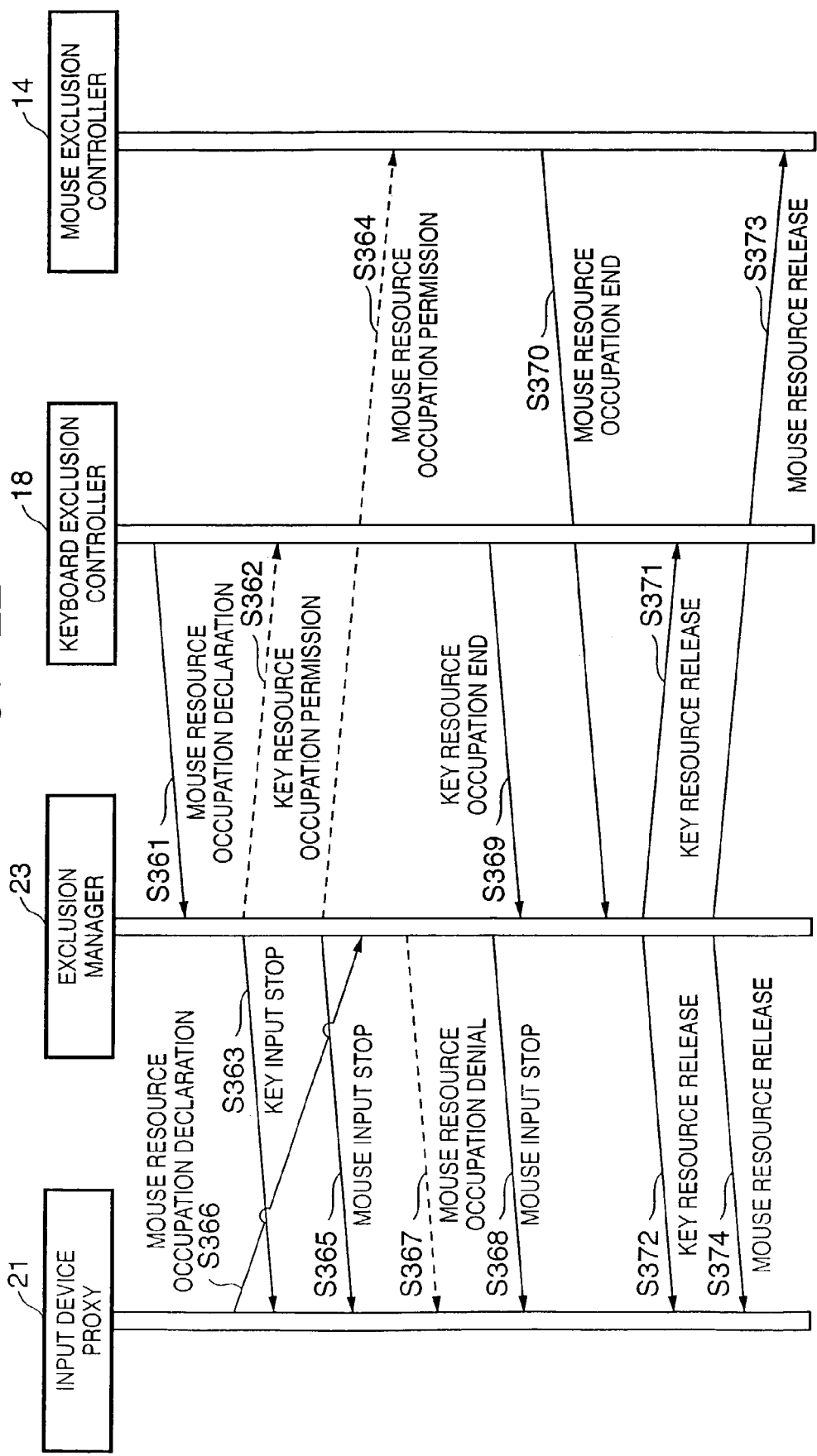
FIG. 22 a chart showing the sequence of the fifth embodiment executed when the host PC gains control rights of mouse and key inputs after contention between a key input of the host PC and a mouse input of the remote PC.

FIG. 22 is a chart showing communications among the exclusion manager 23, input device proxy 21, keyboard exclusion controller 18, and mouse exclusion controller 14 according to the fifth embodiment. Especially, FIG. 22 shows the sequence executed when an input from the keyboard 20 connected to the host PC 1 contends with a mouse input of the remote PC (e.g., the remote PC 3), and the host PC 1 gains control rights of key and mouse inputs as a result of arbitration.

Upon detection of a key input from the host PC 1, the keyboard exclusion controller 18 sends a key resource occupation declaration message to the exclusion manager 23 in step S361.

Upon reception of the key resource occupation declaration message, the exclusion manager 23 checks the occupation state of the key and mouse inputs. If the key and/or mouse inputs are not occupied by any other processes, the exclusion manager 23 sends a key resource occupation permission message to the keyboard exclusion controller 18 in step S362. In step S363, the exclusion manager 23 sends a key input stop message to the input device proxy 21.

Furthermore, the exclusion manager 23 sends a mouse resource occupation permission message to the mouse exclusion controller 14 in step S364. In step S365, the exclusion manager 23 sends a mouse input stop message to the input device proxy 21.

At this time, if the input device proxy 21 has already sent a mouse resource occupation declaration message to the exclusion manager 23 before reception of a mouse input stop message, the exclusion manager 23 receives the mouse resource occupation declaration message from the input device proxy 21 in step S366, and checks the occupation state of the mouse resource. In this case, since the mouse exclusion controller 14 has occupied the mouse resource, the exclusion manager 23 sends a mouse resource occupation denial message to the input device proxy 21 in step S367. Furthermore, the exclusion manager 23 re-sends a mouse input stop message to the input device proxy 21 in step S368.

It is logically impossible to exchange messages among processes at the same time, and respective messages are enqueued in a message queue. The messages in the message queue are dequeued in a FIFO (first-in first-out) order. That is, in the example in FIG. 22, the message from the keyboard exclusion controller 18 is enqueued in the message queue earlier than that from the input device proxy 21.

Also, since messages are processed one by one, the exclusion manager 23 receives the message in step S361, sends the message in step S363 and S365, and then receives the message in step S366.

Upon completion of the inputs from the keyboard and mouse connected to the host PC 1, the keyboard exclusion controller 18 sends a key resource occupation end message to the exclusion manager 23 in step S369. At the same time, the mouse exclusion controller 14 sends a mouse resource occupation end message to the exclusion manager 23 in step S370.

Upon reception of the key and mouse resource occupation end messages, the exclusion manager 23 sends a key resource release message to the keyboard exclusion controller 18 and input device proxy 21 in steps S371 and S372, thus ending the exclusion control of the key input. At the same time, the exclusion manager 23 sends a mouse resource release message to the mouse exclusion controller 14 and input device proxy 21 in steps S373 and S374, thus ending the exclusion control of the mouse input.

Upon reception of the key resource release message, the keyboard exclusion controller 18 and input device proxy 21 respectively execute processes for permitting corresponding key inputs. Also, upon reception of the mouse resource release message, the mouse exclusion controller 14 and input device proxy 21 respectively execute processes for permitting corresponding mouse inputs.

<Effect of Fifth Embodiment>

As described above, according to the fifth embodiment, when the exclusion control of one of a key input from the keyboard 20 and a mouse input from the mouse 16 connected to the host PC 1 is executed, that of the other input is also done. On the other hand, when the exclusion control of one of the key input and mouse input of the remote PC is executed, that of the other input is also done.

In this way, in addition to the effects explained in the third and fourth embodiments, during a mouse input for designating a text input position at the host PC 1 or remote PC, a key input from another PC (e.g., a key input which is enabled at the position designated by that mouse operation and disturbs a normal text input) can be disabled.

Also, during a key input from an arbitrary PC, a mouse input from another PC (e.g., a mouse input which enables a key input at a position designated by that mouse input and disturbs a normal text input) can be disabled.

This exclusion control can automatically give priority to key inputs from the keyboard in use without requiring any special mode setting operation.

<<Outline of Another System>>

The aforementioned information processing system shown in FIG. 1 is formed by connecting the host PC 1 and the plurality of remote PCs 3 to 6 via the network 2. In addition to these remote PCs 3 to 6, a portable information terminal such as a PDA, portable phone, or the like may be connected to the network 2 to implement various inputs to the host PC 1.

Hence, the sixth embodiment will explain an information processing system in which the host PC 1 and a plurality of portable information terminals 103 to 106 are interconnected via the network 2.

Figure 23:
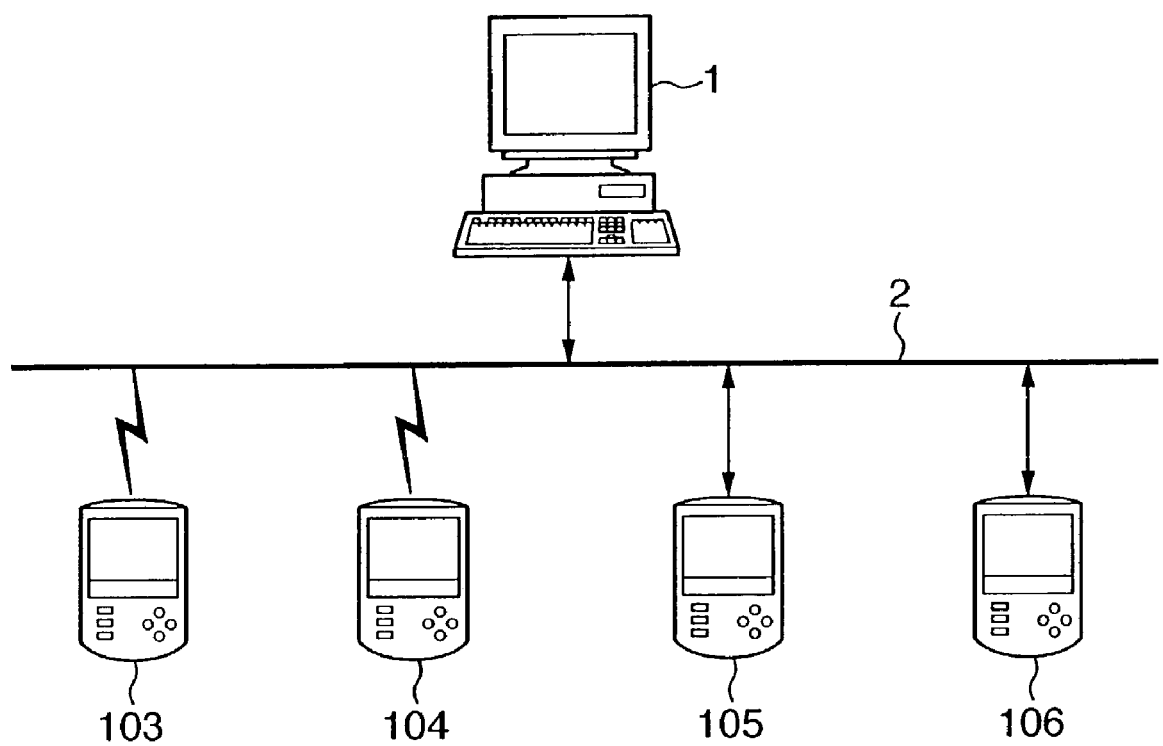
FIG. 23 is a schematic diagram showing the arrangement of an information processing system which can be applied to respective embodiments of the present invention.

FIG. 23 is a schematic diagram showing the arrangement of an information processing system which can be applied to respective embodiments of the present invention.

Referring to FIG. 23, reference numeral 1 denotes a host PC (personal computer) which implements the present invention. Reference numeral 2 denotes a network such as a LAN or the like. Reference numerals 103 to 106 denote portable information terminals which remotely control the host PC 1. Inputs from a mouse and keyboard connected to the host PC 1 and remote control mouse and key inputs from the portable information terminals 103 to 106 are both enabled.

Although details are not shown in FIG. 23, each of the host PC 1 and portable information terminals 103 to 106 has standard building elements (e.g., a CPU, RAM, ROM, hard disk, external storage device, network interface, display, keyboard, mouse, and the like) equipped in a versatile computer. Also, each of the host PC 1 and portable information terminals is assigned, e.g., a unique IP address.

Of the portable information terminals 103 to 106, the portable information terminals 103 and 104 are connected to the network 2 via wireless communications, and the portable information terminals 105 and 106 are connected to the network 2 via wired communications.

Figure 24:
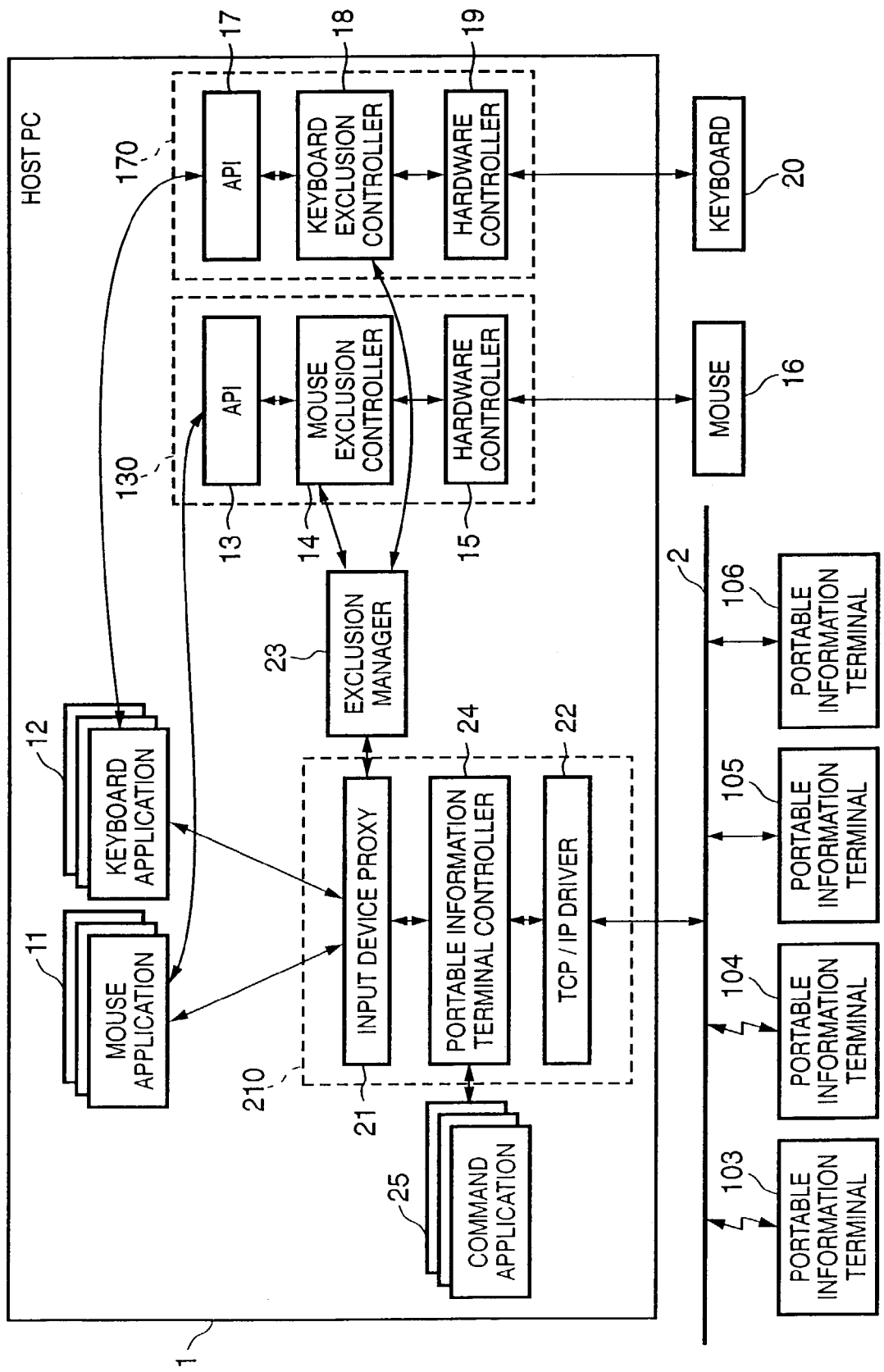
FIG. 24 is a functional block diagram of an information processing system implemented by each of the embodiments of the present invention.

FIG. 24 is a functional block diagram of an information processing system implemented by each of the embodiments of the present invention.

Note that various functions implemented by the functional arrangement shown in FIG. 24 may be implemented by executing a program stored in the ROM or external storage device in the host PC 1 by the CPU or by dedicated hardware.

Also, the same reference numerals in FIG. 24 denote the same building components as those in FIG. 2, and a detailed description thereof will be omitted.

Reference numeral 210 denotes an input processor for processing mouse and key inputs from the portable information terminals 103 to 106. In the input processor 210, reference numeral 21 denotes an input device proxy which interprets a TCP/IP packet, determines a portable information terminal as the source of that packet on the basis of an IP address, and also determines a mouse or key input on the basis of a port number.

If the input device proxy 21 determines a mouse input from the portable information terminal, it outputs a mouse event equivalent to that generated by the mouse 16 of the host PC 1 to the OS of the host PC 1 as a mouse event corresponding to that mouse input.

On the other hand, if the input device proxy 21 determines a key input from the portable information terminal, it outputs a key event equivalent to that generated by the keyboard 20 of the host PC 1 to the OS of the host PC 1 as a key event corresponding to that key input.

Reference numeral 24 denotes a portable information terminal controller which interprets a TCP/IP packet sent from the portable information terminal, and determines a TCP/IP packet of an input device or that of another command. As a result of determination, if the TCP/IP packet is that of a command, the controller 24 sends that command to command applications 25 that process commands. On the other hand, if the TCP/IP packet is that of an input device, the controller 24 executes the exclusion control of input devices among the portable information terminals, and then sends that TCP/IP packet to the input device proxy 21.

Note that the portable information terminal controller 24 is a part that relates to the exclusion control of the present invention, and has means for determining completion of an input from each portable information terminal.

Completion of a mouse or key input to be described later in each of the embodiments is determined, for example, when a predetermined period of time has elapsed after generation of the mouse or key input while that input is no longer detected. The exclusion control of the mouse or key input to be described later in each of the embodiments inhibits, upon generation of a given mouse or key input, those from other portable information terminals until a predetermined period of time elapses after completion of that input. An occupation timer that measures this predetermined period of time is used inside the portable information terminal controller 24.

Reference numeral 22 denotes a TCP/IP driver used by the host PC 1 to communicate with the portable information terminals via TCP/IP.

Reference numeral 23 denotes an exclusion manager which arbitrates exclusion control between the mouse 16 and keyboard 20 of the host PC 1 and the mouse and key inputs from the portable information terminal. The exclusion manager 23 communicates with the input device proxy 21, a mouse exclusion controller 14, and a keyboard exclusion controller 18 via inter-process message exchange means.

The portable information terminals 103 to 106 remote control applications 11 and 12 which run on the host PC 1. Mouse and key inputs by the remote control are converted into a TCP/IP packet, which is sent from a network port.

The network 2 is used to make TCP/IP communications between the host PC 1 and the portable information terminals 103 to 106. The network 2 may adopt either a wired connection such as a wired LAN, IEEE1394, USB, or the like or a wireless connection such as a wireless LAN, Bluetooth, mobile communication network, or the like.

The TCP/IP protocol is used in communications between the host PC 1 and the portable information terminals 103 to 106. However, other protocols may be used.

In FIG. 24, the portable information terminal controller 24 is configured as an independent process, but may be configured as a module in the input device proxy 21 or TCP/IP driver 23.

An example of the arrangement of each of the portable information terminals 103 to 106 will be explained below using FIGS. 25 to 28.

Note that each of the portable information terminals 103 to 106 has a digitizer area that implements a digitizer function on its screen. This digitizer area is divided into a plurality of areas to implement a plurality of kinds of input forms (touch pad input, handwriting character input, software keyboard key input, and the like), and is configured to be able to implement one of the plurality of kinds of input forms in correspondence with one of the divided areas.

Figure 25:
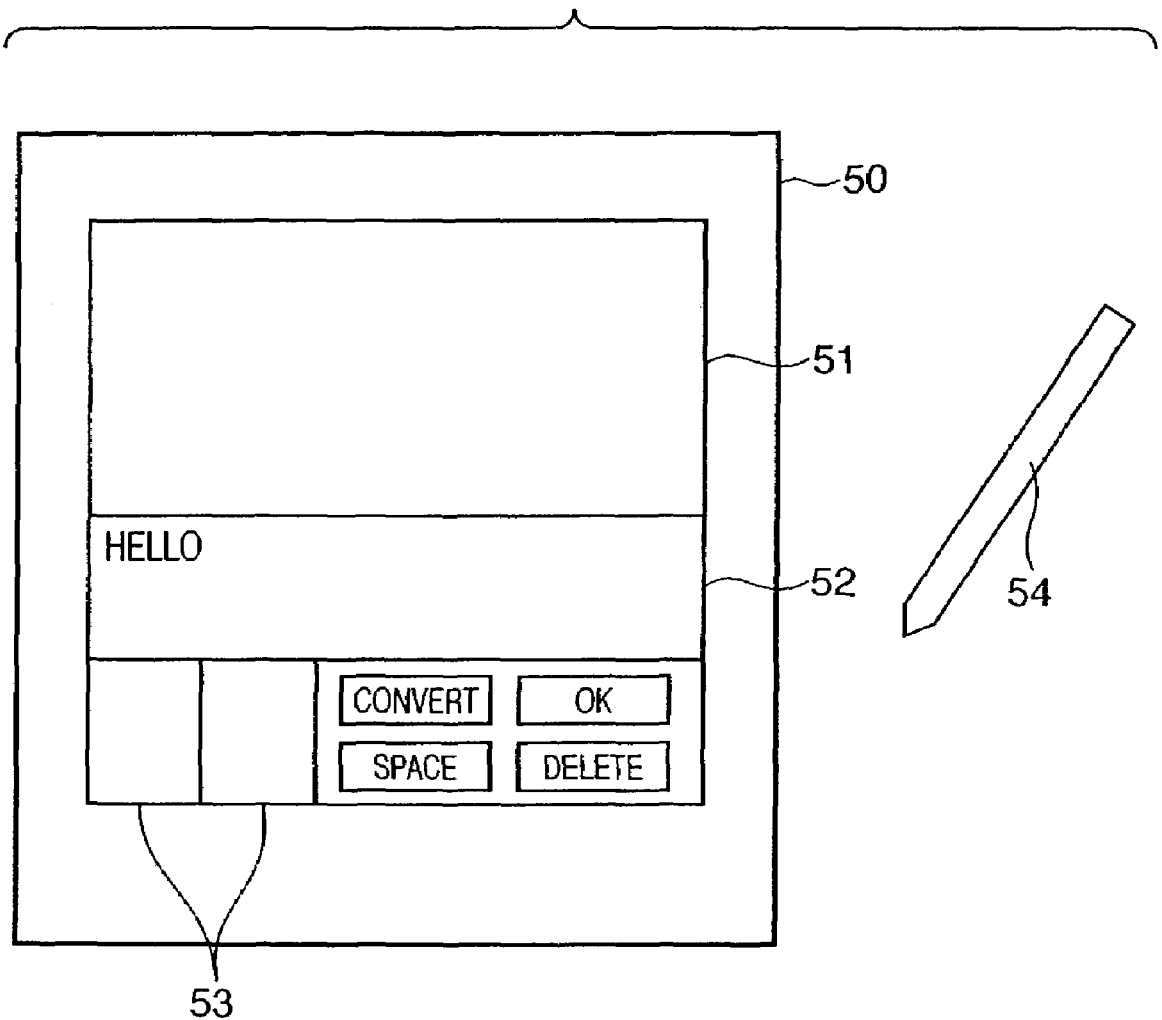
FIG. 25 is a plan view showing the arrangement of a portable information terminal to which the present invention is applied.

FIG. 25 shows the arrangement of a portable information terminal to which the present invention is applied.

In FIG. 25, reference numeral 50 denotes a portrait style portable information terminal which is an example of the portable information terminals 103 to 106, and especially has a vertically elongated screen.

Reference numeral 51 denotes a touch pad area prepared within the screen of the portable information terminal 50. Contents (coordinate information) input on this touch pad area 51 are sent as coordinate (mouse) information of the host PC 1 to the host PC 1. Reference numeral 52 denotes a text input area prepared within the screen of the portable information terminal 50. Contents (text data) input on this text input area 52 are sent to the host PC 1.

Reference numeral 53 denotes a handwriting character input area prepared within the screen of the portable information terminal 50. A character which has been input on this handwriting character input area 53 and whose handwritten strokes have been recognized is transferred to the text input area 52.

Reference numeral 54 denotes an input pen which is a designation tool used to make input operations on the touch pad area 51 and handwriting character input area 53. Upon an actual input, the user touches a digitizer mounted on the screen with the input pen, and the touch pad area 51 or handwriting character input area 53 functions in correspondence with the touch position.

Figure 26:
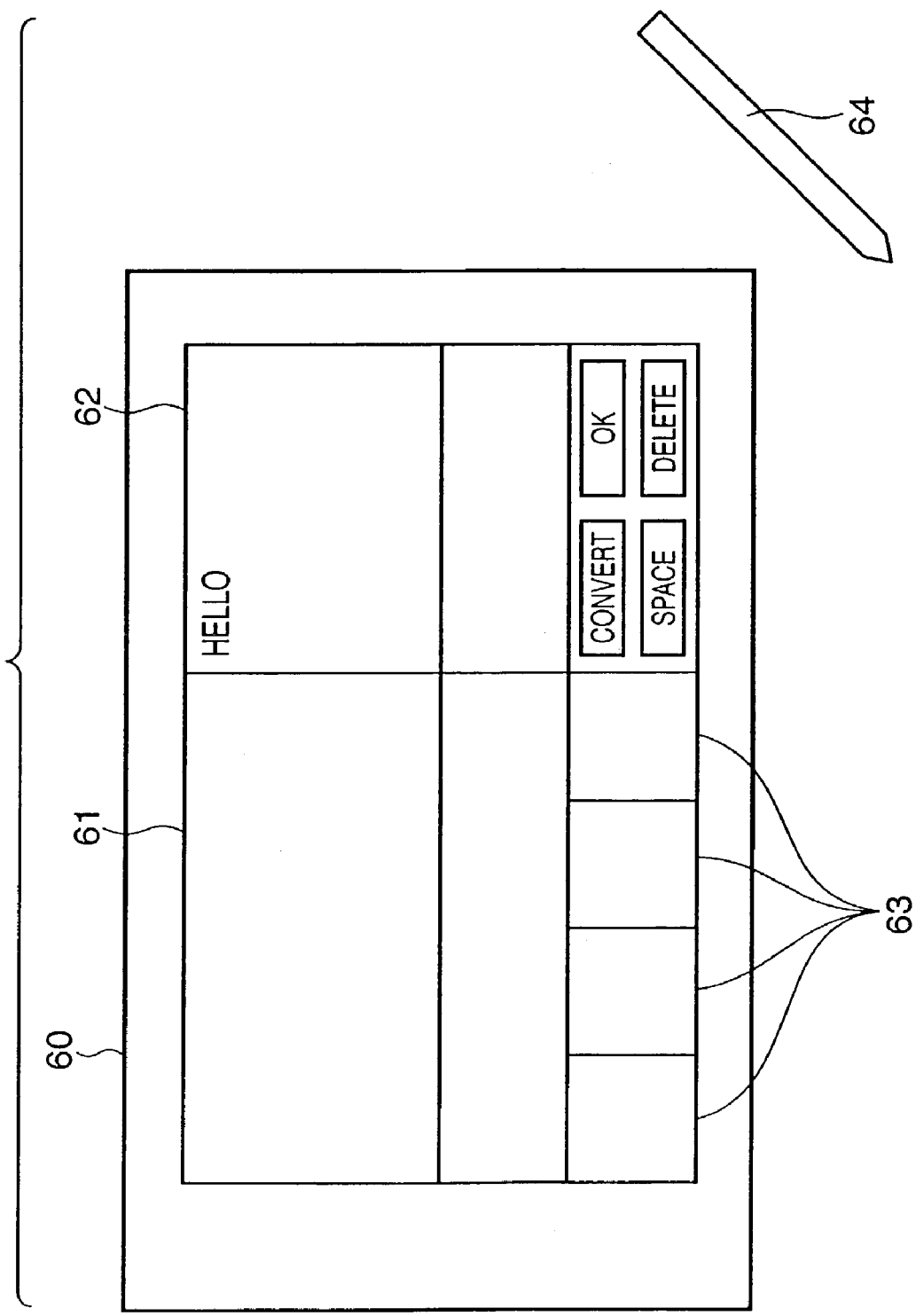
FIG. 26 is a plan view showing the arrangement of a portable information terminal to which the present invention is applied.

FIG. 26 shows the arrangement of a portable information terminal to which the present invention is applied.

In FIG. 26, reference numeral 60 denotes a landscape style portable information terminal which is an example of the portable information terminals 103 to 106, and especially has a horizontally elongated screen.

Reference numeral 61 denotes a touch pad area prepared within the screen of the portable information terminal 60. Contents (coordinate information) input on this touch pad area 61 are sent as coordinate (mouse) information of the host PC 1 to the host PC 1. Reference numeral 62 denotes a text input area prepared within the screen of the portable information terminal 60. Contents (text data) input on this text input area 62 are sent to the host PC 1.

Reference numeral 63 denotes a handwriting character input area prepared within the screen of the portable information terminal 60. A character which has been input on this handwriting character input area 63 and whose handwritten strokes have been recognized is transferred to the text input area 62.

Reference numeral 64 denotes an input pen which is a designation tool used to make input operations on the touch pad area 61 and handwriting character input area 63.

Figure 27:
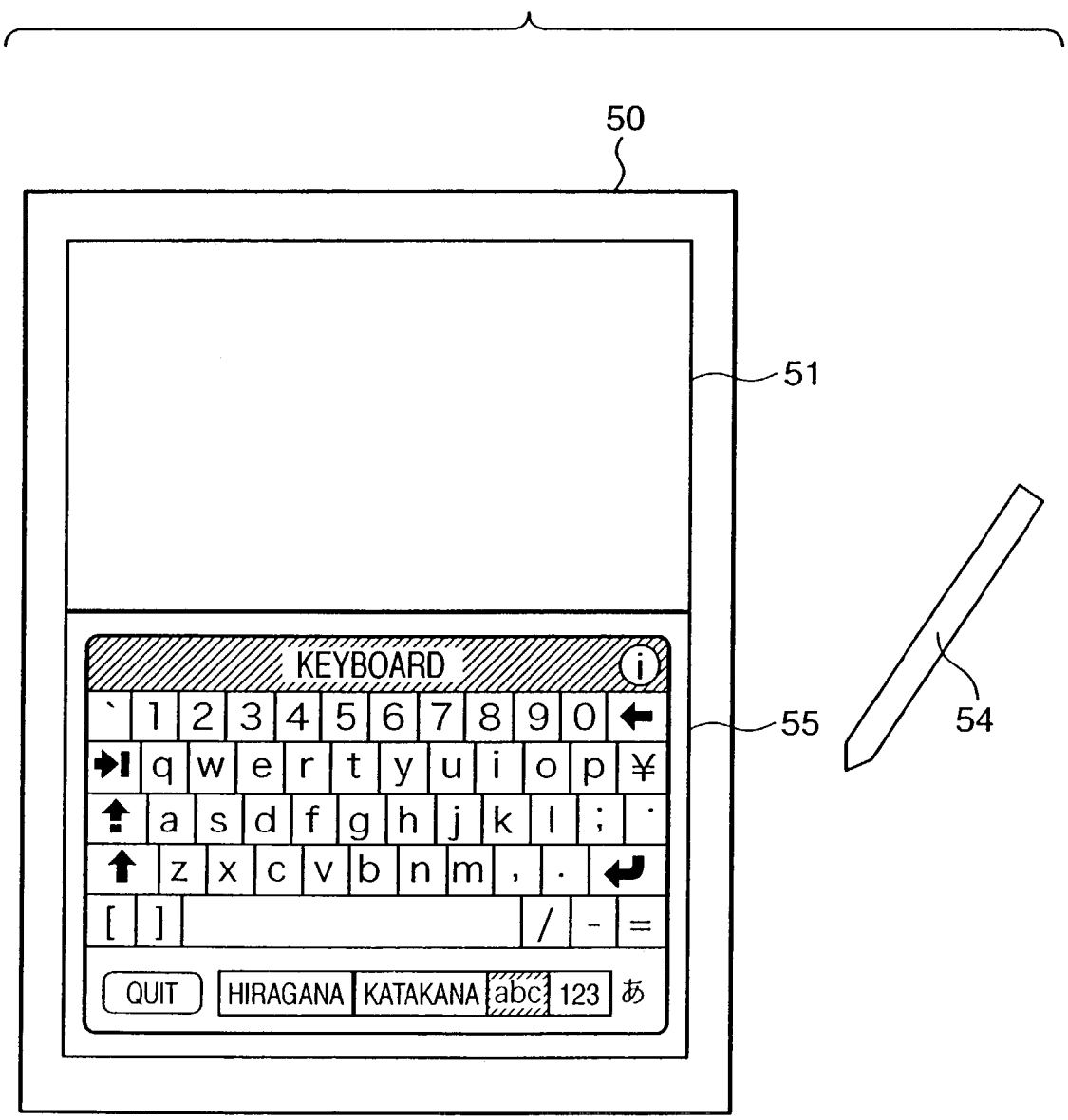
FIG. 27 is a plan view showing the arrangement of a portable information terminal to which the present invention is applied.

FIG. 27 shows the arrangement of a portable information terminal to which the present invention is applied.

Note that FIG. 27 shows another example of the arrangement of the portable information terminal shown in FIG. 25, and the same reference numerals in FIG. 27 denote the same building components as in FIG. 25.

Referring to FIG. 27, reference numeral 55 denotes a software keyboard input area prepared within the screen of the portable information terminal 50. A key code of a key selected on the software keyboard input area 55 is sent to the host PC 1.

Figure 28:
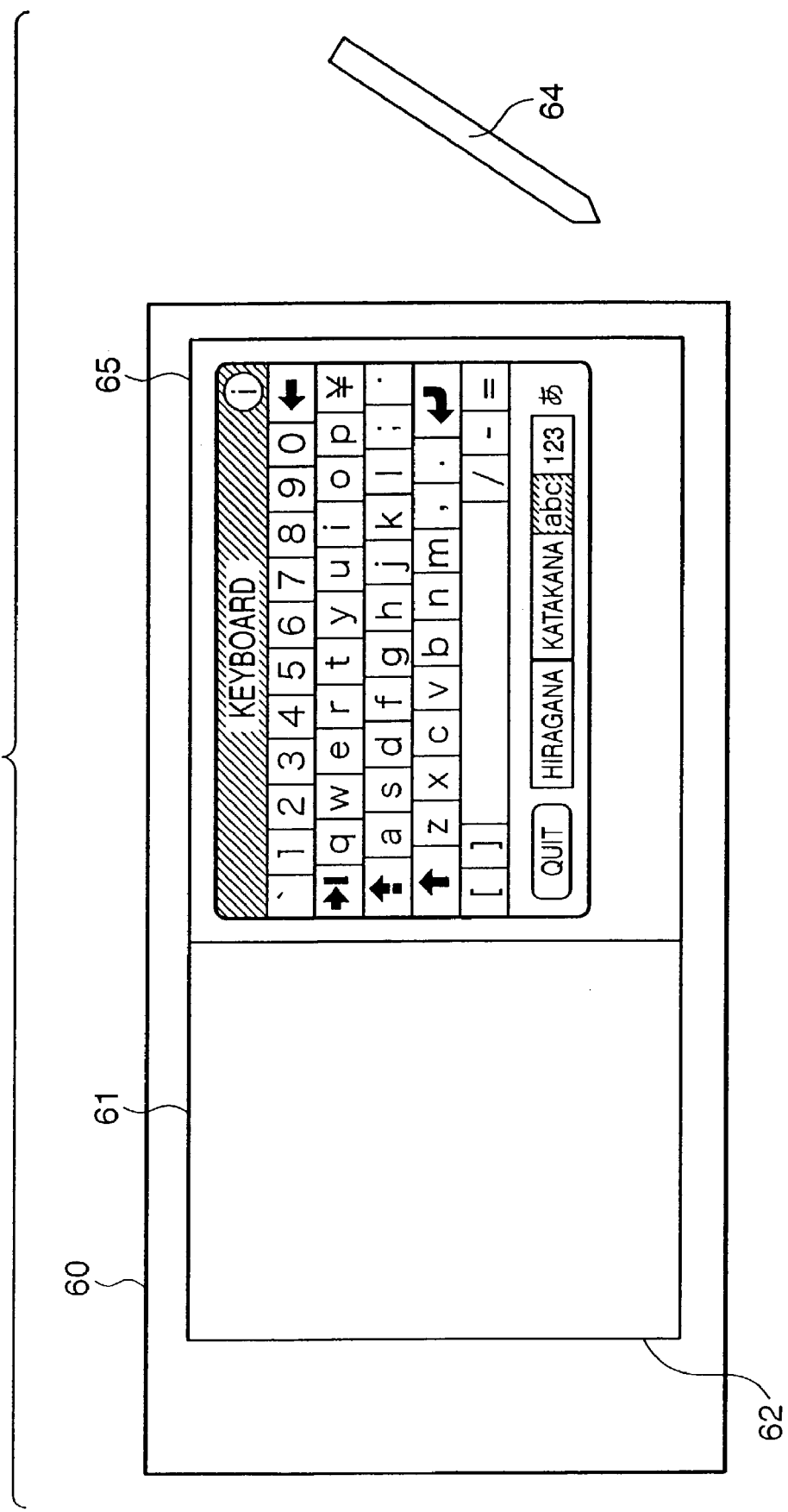
FIG. 28 is a plan view showing the arrangement of a portable information terminal to which the present invention is applied.

FIG. 28 shows the arrangement of a portable information terminal to which the present invention is applied.

Note that FIG. 28 shows another example of the arrangement of the portable information terminal shown in FIG. 26, and the same reference numerals in FIG. 28 denote the same building components as in FIG. 26.

Referring to FIG. 28, reference numeral 65 denotes a software keyboard input area prepared within the screen of the portable information terminal 60. A key code of a key selected on the software keyboard input area 65 is sent to the host PC 1.

Note that FIGS. 25 to 28 above show merely examples of the portable information terminals, and portable information terminals, each having a touch pad area, handwriting character input area, text input area, and software keyboard input area on its screen may have arrangements other than those described above.

In addition, by physical operation buttons arranged on a portable information terminal, and an operation menu provided by a program which implements a GUI of the portable information terminal, arbitrary combinations of a touch pad area, handwriting character input area, text input area, and software keyboard input area may be formed on the screen.

Sixth Embodiment

The sixth embodiment will exemplify a case wherein input information input at each of the portable information terminals 103 to 106 is used as that of the host PC 1, i.e., the portable information terminals 103 to 106 are used as input devices of the host PC 1.

Note that input information input at each of the portable information terminals 103 to 106 can be used as self input information in addition to that of the host PC 1, as a matter of course.

Whether or not input information input at each of the portable information terminals 103 to 106 is used as that of the host PC 1 or self input information may be switched by physical operation buttons arranged on a portable information terminal, and an operation menu provided by a program which implements a GUI of the portable information terminal. Alternatively, after completion of a connection authentication process with the host PC 1, input information input at each of the portable information terminals 103 to 106 may be automatically used as that of the host PC 1.

Figure 29:
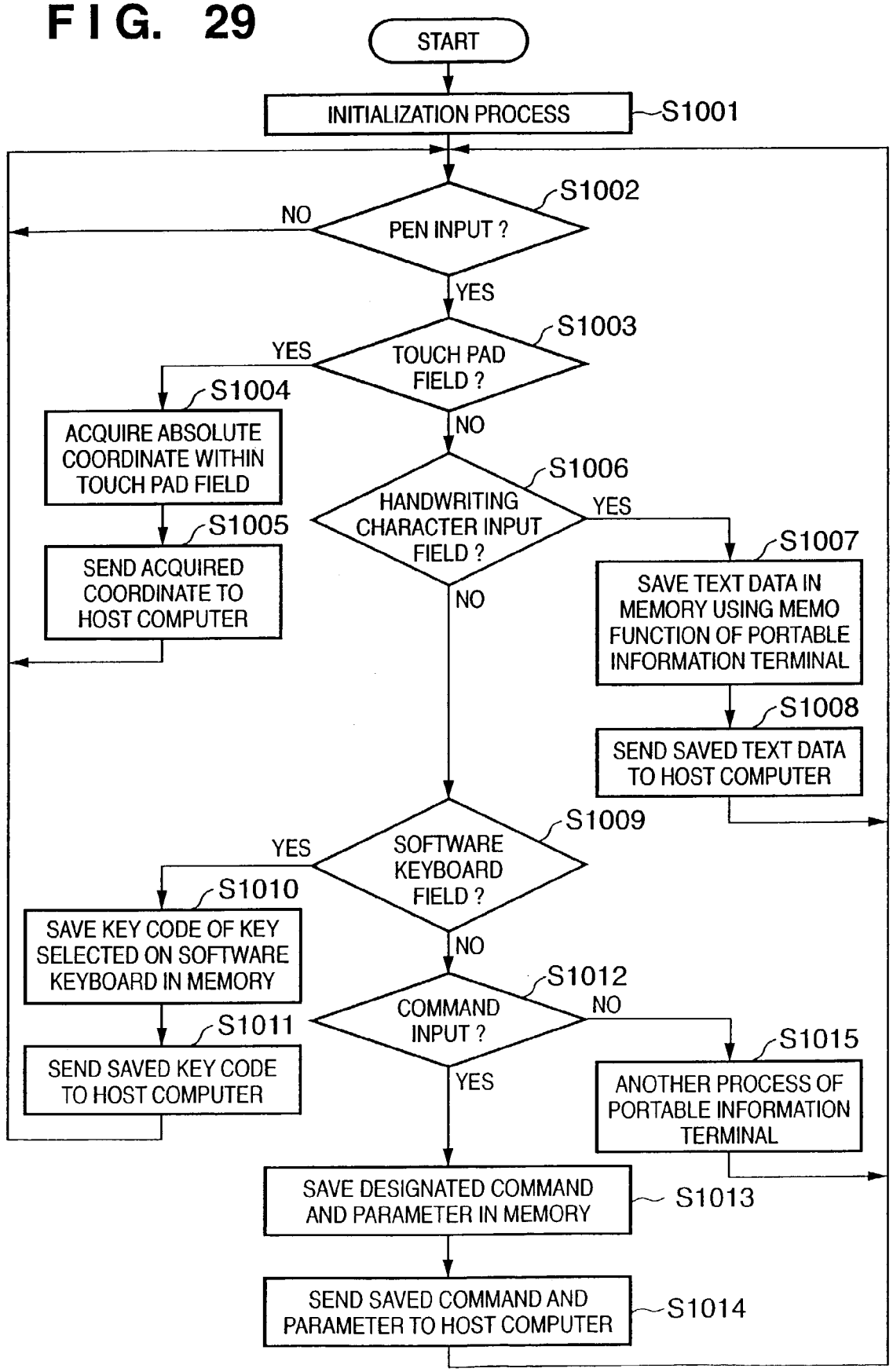
FIG. 29 is a flow chart showing the process to be executed by a portable information terminal according to the sixth embodiment of the present invention.

FIG. 29 is a flow chart showing the process to be executed by the portable information terminal according to the sixth embodiment of the present invention.

In step S1001, a touch pad program, handwriting character input program, software keyboard input program, and text input program which respectively implement the functions of the touch pad area, handwriting character input area, software keyboard input area, and text input area of the portable information terminal undergo an initialization process. Note that these programs are stored in a memory of the portable information terminal.

In this initialization process, a series of launch procedures of those programs, and a process for notifying the host PC 1 that the touch pad program, handwriting character input program, software keyboard input program, and text input program are valid are executed.

In step S1002, the presence/absence of an input by the input pen of the portable information terminal is checked. If no input is detected (NO in step S1002), the control waits until an input is detected. On the other hand, if an input is detected (YES in step S1002), the flow advances to step S1003 to check if the input position of that input falls within a touch pad field of the touch pad area.

If the input position falls within the touch pad field (YES in step S1003), the flow advances to step S1004, and the coordinate value of the input position of the input pen within the touch pad field is acquired. In step S1005, the acquired coordinate value (absolute coordinate value) is converted into coordinate information of the host PC 1 (relative coordinate value with respect to the mouse 16), and that coordinate information is sent to the TCP/IP driver 23 of the host PC 1 via the network 2. After that, the flow returns to step S1002.

On the other hand, if it is determined in step S1003 that the input position falls outside the touch pad field (NO in step S1003), the flow advances to step S1006 to check if the input position falls within a handwriting character input field of the handwriting character input area.

If the input position falls within the handwriting character input field (YES in step S1006), the flow advances to step S1007. Instep S1007, input strokes are recognized using a memo generation function of the handwriting character input program to generate text data, and that text data is saved in a memory.

Note that this memo generation function can directly use a function installed in the portable information terminal.

In step S1008, the text data saved in the memory is sent to the TCP/IP driver 23 of the host PC 1 via the network 2, and the flow returns to step S1002.

If it is determined in step S1006 that the input position falls outside the handwriting character input field (NO in step S1006), the flow advances to step S1009 to check if the input position falls within a software keyboard input field of the software keyboard input area.

If the input position falls within the software keyboard field (YES in step S1009), the flow advances to step S1010. In step S1010, a key code of a key on the software keyboard, which corresponds to that input position, is generated, and is saved in the memory. In step S1011, the key code saved in the memory is sent to the TCP/IP driver 23 of the host PC 1 via the network 2.

If it is determined in step S1009 that the input position falls outside the software keyboard field (NO in step S1009), the flow advances to step S1012 to determine the presence/absence of a command input.

Note that this command input means a command generated upon operation of various operation menus displayed on the screen by the GUI of the portable information terminal. Such commands include, e.g., launch and end commands of application programs which run on the host PC 1, various operation commands of files managed by an active application program, and the like.

If it is determined in step S1012 that the input is not a command input (NO in step S1012), a process of the portable information terminal corresponding to that input is executed, and the flow returns to step S1002.

If the input is a command input (YES in step S1012), the flow advances to step S1013 to save a command and parameter input by a command input program in the memory. The command and parameter saved in the memory are sent to the TCP/IP driver 23 of the host PC 1 via the network 2 in step S1014, and the flow returns to step S1002.

The process to be executed by the portable information terminal controller 23 which serves as a device driver of the host PC 1 will be explained below using FIG. 30.

Figure 30:
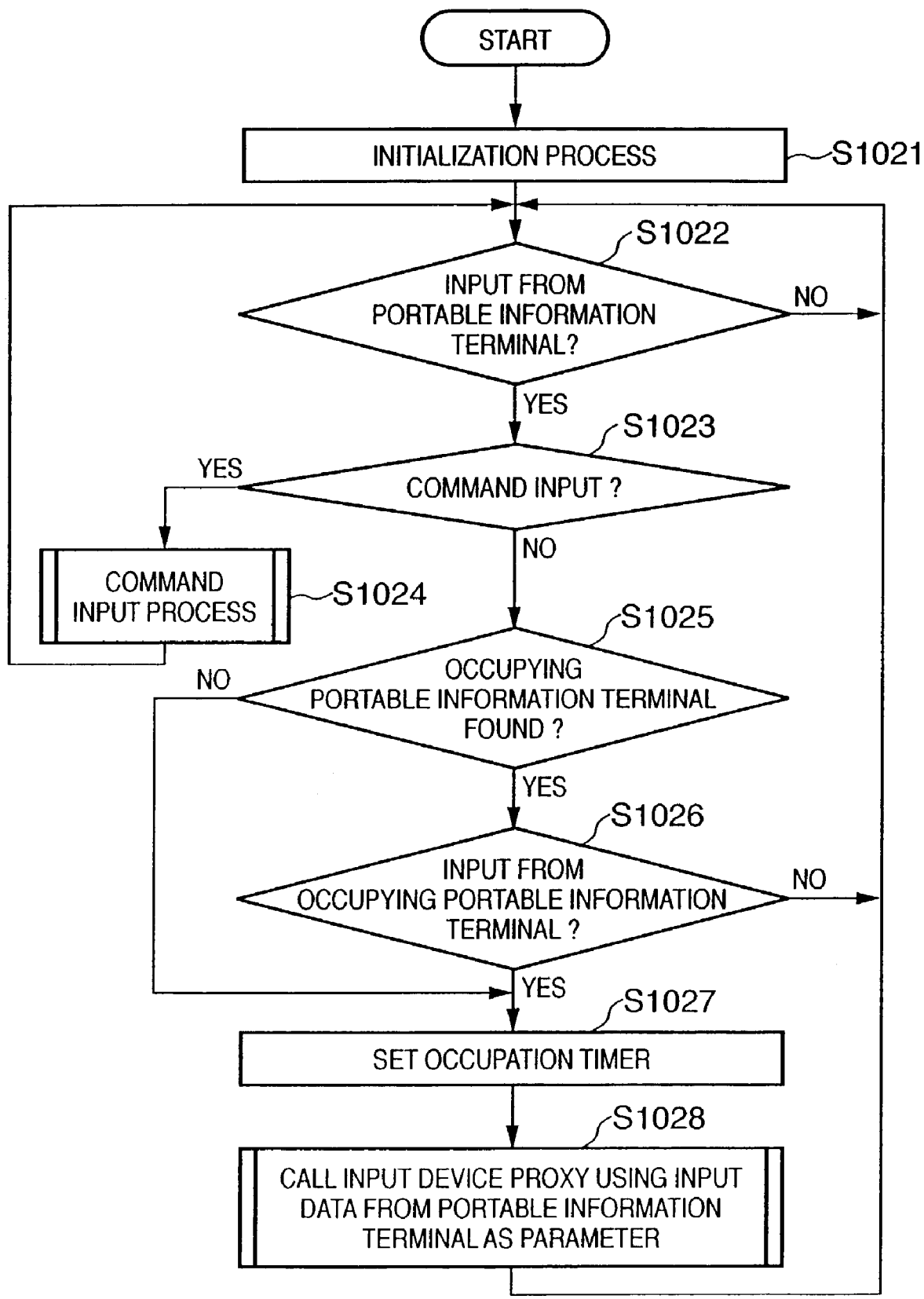
FIG. 30 is a flow chart showing the process to be executed by a portable information terminal controller of a host PC according to the sixth embodiment of the present invention.

FIG. 30 is a flow chart showing the process to be executed by the portable information terminal controller of the host PC according to the sixth embodiment of the present invention.

In step S1021, an initialization process of the portable information terminal controller 24 is executed. In this initialization process, the same process as in a conventional initialization process of a device driver, and a confirmation process for confirming if various program such as a touch pad program, text input program, key input program, and command input program on each portable information terminal are valid, are executed.

In step S1022, the presence/absence of an input from a portable information terminal is checked. If no input is detected (NO in step S1022), the control waits until an input is detected. On the other hand, if an input is detected (YES in step S1022), the flow advances to step S1023 to check if that input is a command input.

If the input is a command input (YES in step S1023), the flow advances to step S1024 to execute a command input process (subroutine), and the flow returns to step S1022. On the other hand, if the input is not a command input (NO in step S1023), the flow advances to step S1025.

In step S1025, the presence/absence of a portable information terminal which is now occupying the input resource of the host PC (to be referred to as an occupying portable information terminal hereinafter) is checked. If no occupying portable information terminal is found (NO in step S1025), the flow jumps to step S1027. On the other hand, if an occupying portable information terminal is found (YES in step S1025), the flow advances to step S1026 to check if the input detected in step S1022 is that from the occupying portable information terminal.

Note that this checking process is implemented by determining whether or not an occupation timer which starts time measurement in response to an input has measured a predetermined period of time after completion of the input.

If it is determined in step S1026 that the input is not the one from the occupying portable information terminal (NO in step S1026), the flow returns to step S1022. On the other hand, if the input is the one from the occupying portable information terminal (YES in step S1026), the flow advances to step S1027.

In step S1027, the occupation timer used to exclusively occupy mouse and text inputs from the portable information terminal is re-set.

In step S1028, the input device proxy 21 is called using input data from the portable information terminal as a parameter, and the flow returns to step S1022.

Details of the command input process in step S1024 will be explained below using FIG. 31.

Figure 31:
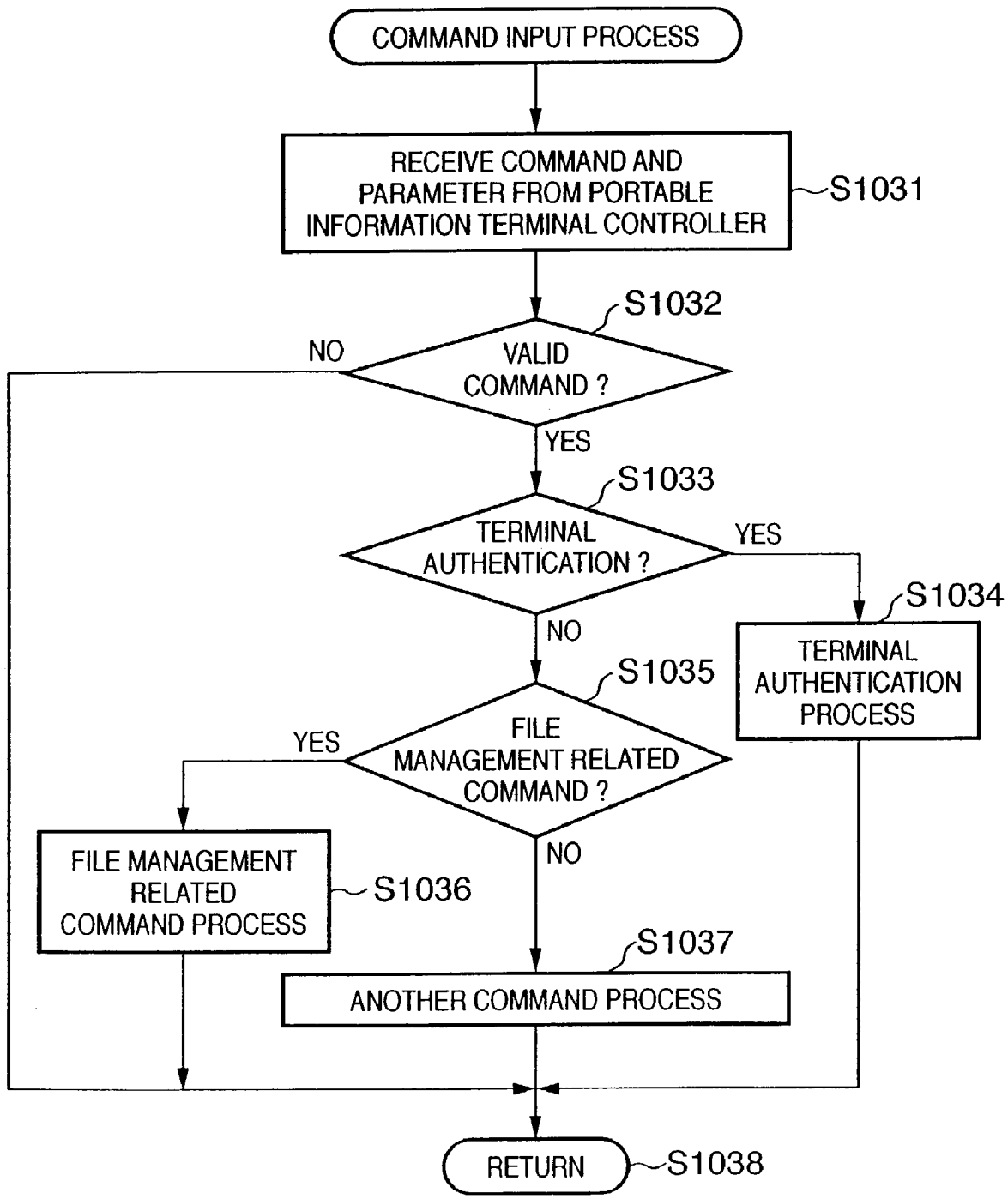
FIG. 31 is a flow chart showing details of a command input process according to the sixth embodiment of the present invention.

FIG. 31 is a flow chart showing details of the command input process according to the sixth embodiment of the present invention.

In step S1031, a command and parameter are received from the portable information terminal controller 24. It is checked in step S1032 if the received command is valid. If the received command is invalid (NO in step S1032), the flow jumps to step S1038. On the other hand, if the received command is valid (YES in step S1032), the flow advances to step S1033.

It is determined in step S1033 whether or not the received command is a terminal authentication command. If the received command is a terminal authentication command (YES in step S1033), the flow advances to step S1034 to execute a terminal authentication process for authenticating availability of application programs on the host PC 1. After that, the flow advances to step S1038. On the other hand, if the received command is not a terminal authentication command (NO in step S1033), the flow advances to step S1035.

It is determined in step S1035 whether or not the received command is a file management related command. If the received command is a file management related command (YES in step S1035), the flow advances to step S1036 to execute a file management related process such as copy, move, and the like of a file. The flow then advances to step S1038. On the other hand, if the received command is not a file management related command (NO in step S1035), the flow advances to step S1037 to execute another command process. After that, the flow advances to step S1038.

In step S1038, the command input process ends, and the control returns to step S1022 in FIG. 30. At this time, the processing status of the command input process may be returned.

Details of the process to be executed by the input device proxy in step S1028 will be explained below using FIG. 32.

Figure 32:
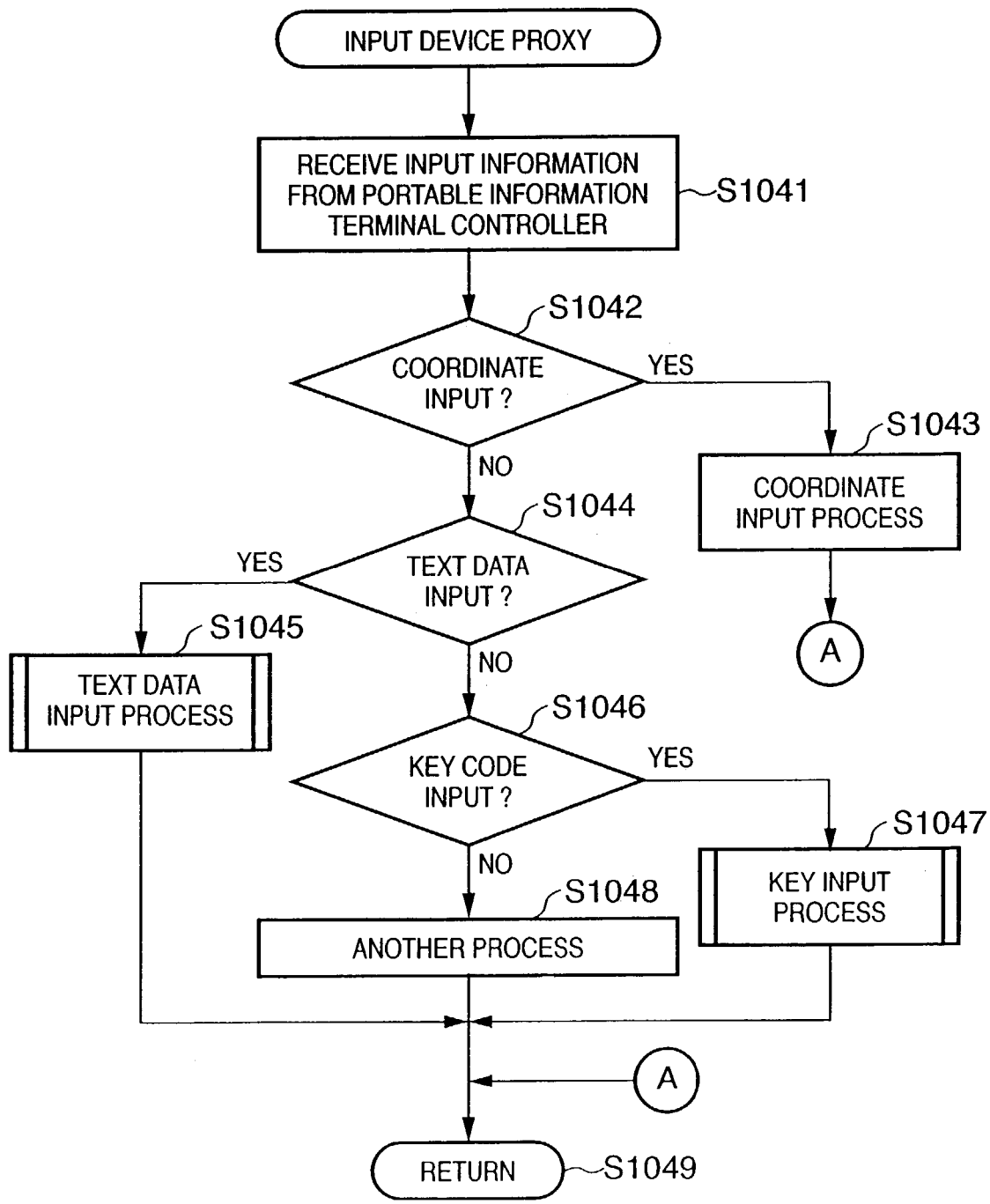
FIG. 32 is a flowchart showing details of the process to be executed by an input device proxy according to the sixth embodiment of the present invention.

FIG. 32 is a flow chart showing details of the process to be executed by the input device proxy according to the sixth embodiment of the present invention.

In step S1041, input information such as coordinate information, a key code, text data, or the like is received from the portable information terminal controller 24. It is determined in step S1042 whether or not the input information is a coordinate input using the touch pad area of the portable information terminal. If the input information is a coordinate input (YES in step S1042), the flow advances to step S1043, and a coordinate input process is executed by a touch pad device driver or mouse driver 130. Note that an existing touch pad device driver or mouse driver may be used.

If it is determined in step S1042 that the input information is not a coordinate input (NO in step S1042), the flow advances to step S1044 to check if the input information is a text data input. If the input information is a text data-input (YES in step S1044), the flow advances to step S1045 to execute a text data input process (subroutine). After that, the flow advances to step S1049.

On the other hand, if it is determined in step S1044 that the input information is not a text data input (NO in step S1044), the flow advances to step S1046 to check if the input information is a key code input. If the input information is not a key code input (NO in step S1046), the flow advances to step S1048 to execute another process. After that, the flow advances to step S1049.

On the other hand, if the input information is a key code input (YES in step S1046), the flow advances to step S1047 to execute a key code input process (subroutine). After that, the flow advances to step S1049.

In step S1049, the process of the input device proxy ends, and the control returns to step S1022 in FIG. 30. At this time, the processing status of the input device proxy process may be returned.

Details of the text data input process in step S1045 will be described below using FIG. 33.

Figure 33:
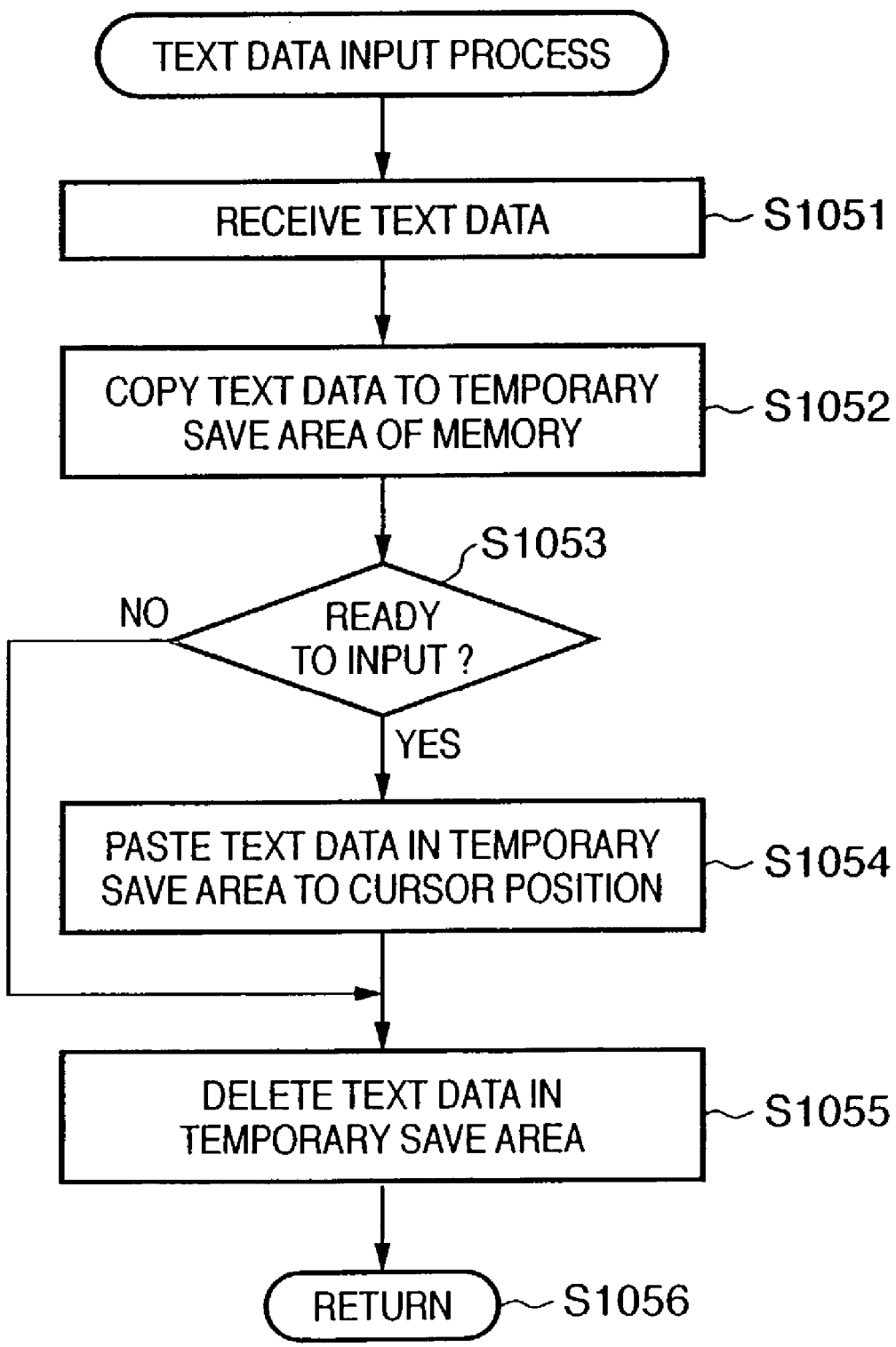
FIG. 33 is a flow chart showing details of a text data input process according to the sixth embodiment of the present invention.

FIG. 33 is a flow chart showing details of the text data input process according to the sixth embodiment of the present invention.

In step S1051, text data is received. In step S1052, the received text data is copied to a temporary save area (e.g., a clipboard of Microsoft Windows) of a memory.

It is checked in step S1053 if an active application program on the host PC 1 is set in a character input state, and a character cursor is ready to input a character. If the character cursor is not ready to input a character (NO in step S1053), the flow jumps to step S1055 to delete the text data in the temporary save area.

On the other hand, if the character cursor is ready to input a character (YES in step S1053), the flow advances to step S1054 to paste the text data in the temporary saved area at the character cursor position. In step S1055, the text data in the temporary save area is deleted.

In step S1056, the text data input process ends, and the flow returns to step S1049 in FIG. 32. At this time, the processing status of the text data input process may be returned.

Details of the key code input process in step S1047 will be described below using FIG. 34.

Figure 34:
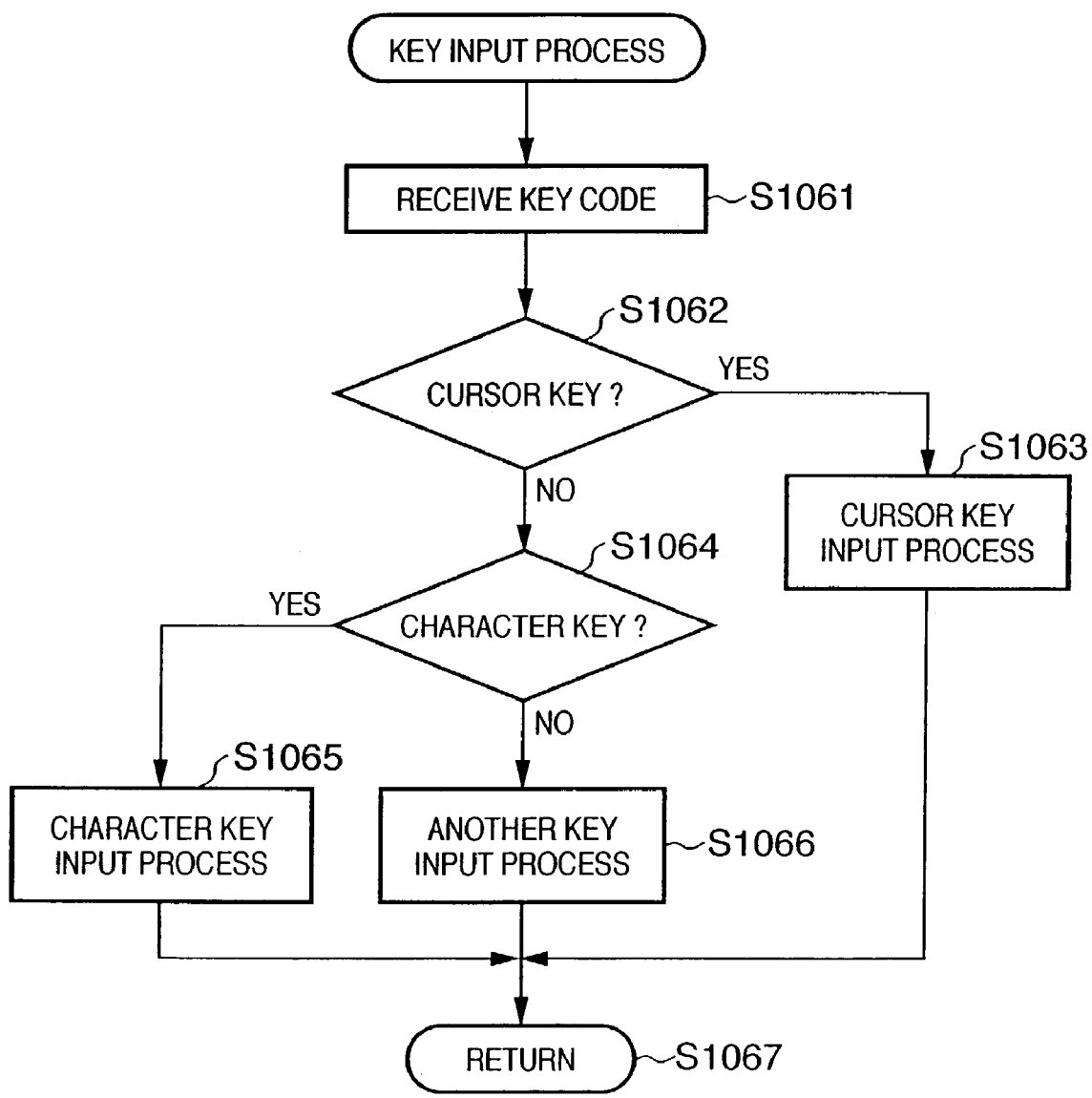
FIG. 34 is a flow chart showing details of a key code input process according to the sixth embodiment of the present invention.

FIG. 34 is a flow chart showing details of the key code input process according to the sixth embodiment of the present invention.

In step S1061, a key code is received. It is checked in step S1062 if the received key code is a key code of a cursor key. If the received key code is a key code of a cursor key (YES in step S1062), the flow advances to step S1063, and a keyboard driver 170 executes a cursor key input process corresponding to that key code. After that, the flow advances to step S1067.

On the other hand, if it is determined in step S1062 that the received key code is not a key code of a cursor key (NO in step S1062), the flow advances to step S1064 to check if the received key code is a key code of a character key as one of alphanumeric keys and the like. If the received key code is a key code of a character key (YES in step S1064), the flow advances to step S1065, and the keyboard driver 170 executes a character key input process. After that, the flow advances to step S1067.

If it is determined in step S1064 that the received key code is not a key code of a character key (NO in step S1064), the flow advances to step S1066 to execute another key input process by the keyboard driver 170. After that, the flow advances to step S1067.

In step S1067, the key input process ends, and the control returns to step S1049 in FIG. 32. At this time, the processing status of the key input process may be returned.

Note that an existing keyboard driven may be used.

When the user makes input operations to the host PC 1 at one of the portable information terminals 103 to 106, the host PC 1 can apply the exclusion control described in the first to fifth embodiments so as to inhibit input operations from other portable information terminals.

Also, the remote PCs 3 to 6 and portable information terminals 103 to 106 may be connected together to the network 2, and in such case, the exclusion control described in the first to fifth embodiments can be applied.

<Effect of Sixth Embodiment>

According to the sixth embodiment, the user can make mouse and text inputs to the host PC 1 at the portable information terminal.

Upon receiving a mouse or text input from an arbitrary portable information terminal, the host PC 1 inhibits mouse and text inputs from other portable information terminals. That is, upon receiving a mouse or text input from an arbitrary portable information terminal, the exclusion control that denies mouse, text, and key inputs from other portable information terminals is executed to disable those mouse, text, and key inputs from other portable information terminals.

The preferred embodiments of the present invention have been explained, and the present invention can be practiced in the forms of a system, apparatus, method, program, storage medium, and the like. More specifically, the present invention can be applied to either a system constituted by a plurality of devices, or an apparatus consisting of a single equipment.

Note that the present invention includes a case wherein the invention is achieved by directly or remotely supplying a program of software that implements the functions of the aforementioned embodiments (programs corresponding to the illustrated flow charts in the above embodiments) to a system or apparatus, and reading out and executing the supplied program code by a computer of that system or apparatus.

Therefore, the program code itself installed in a computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy (tradename) disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that can be used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, an information processing apparatus which can efficiently and easily implement input control associated with a host terminal in a system that can remotely control the host terminal, its control method, and a program can be provided.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus which is connected to an external terminal having an input unit for inputting operation via a network, and said information processing apparatus has its own input unit, comprising:
external terminal input means for receiving input from the input unit of said external terminal;
monitoring means for monitoring an input received by said external terminal input means, and an input from the input unit of said information processing apparatus; and
exclusion management means for, when an input of a given input unit is generated as a result of monitoring by said monitoring means, executing exclusion control that inhibits an input from another input unit until the input has measured a predetermined period of time after the input is completed.

2. The apparatus according to claim 1, wherein said monitoring means monitors an input from the input unit of said information processing apparatus via a driver that controls the input unit, and monitors an input from the input unit of the external terminal without the intervention of the driver.

3. The apparatus according to claim 2, wherein the driver includes at least one of a mouse driver and a keyboard driver.

4. The apparatus according to claim 1, wherein each of the input units of the external terminal and said information processing apparatus includes at least one of an input device which can input coordinate information, and an input device which can input key information.

5. The apparatus according to claim 1, wherein the network comprises either a wired or a wireless network.

6. The apparatus according to claim 1, wherein when an input from one input unit of said information processing apparatus is generated as a result of monitoring by said monitoring means, said exclusion management means permits an input from an input unit of said information processing apparatus other than that input unit and inhibits an input from the input unit of the external terminal until the generated input is completed.

7. The apparatus according to claim 1, wherein when an input from one input unit of the external terminal is generated as a result of monitoring by said monitoring means, said exclusion management means permits an input from an input unit of the external terminal other than that input unit and inhibits an input from the input unit of said information processing apparatus until the generated input is completed.

8. The apparatus according to claim 1, wherein each of the input units of the external terminal and said information processing apparatus comprises a keyboard, and
when a key input from one of the keyboards of the external terminal and said information processing apparatus is generated as a result of monitoring by said monitoring means, said exclusion management means executes exclusion control that inhibits an input from the other keyboard until that key input is completed.

9. The apparatus according to claim 1, wherein each of the input units of the external terminal and said information processing apparatus comprises a mouse, and when a mouse input from one of the mice of the external terminal and said information processing apparatus is generated as a result of monitoring by said monitoring means, said exclusion management means executes exclusion control that inhibits an input from the other mouse until that mouse input is completed.

10. A method of controlling an information processing apparatus, which is connected to an external terminal having an input unit for inputting operation via a network, and said information processing apparatus has its own input unit, comprising:

an external terminal input step of receiving input from the input unit of said external terminal;

a monitoring step of monitoring an input received in said external terminal input step, and an input from the input unit of the information processing apparatus; and an exclusion management step of executing, when an input of a given input unit is generated as a result of monitoring in the monitoring step, exclusion control that inhibits an input from another input unit until the input has measured a predetermined period of time after the input is completed.

11. The method according to claim 10, wherein the monitoring step includes a step of monitoring an input from the input unit of the information processing apparatus via a driver that controls the input unit, and monitoring an input from the input unit of the external terminal without the intervention of the driver.

12. The method according to claim 11, wherein the driver includes at least one of a mouse driver and a keyboard driver.

13. The method according to claim 10, wherein each of the input units of the external terminal and the information processing apparatus includes at least one of an input device which can input coordinate information, and an input device which can input key information.

14. The method according to claim 10, wherein the network comprises either a wired or a wireless network.

15. The method according to claim 10, wherein the exclusion management step includes a step of permitting, when an input from one input unit of the information processing apparatus is generated as a result of monitoring in the monitoring step, an input from an input unit of the information processing apparatus other than that input unit, and inhibiting an input from the input unit of the external terminal until the generated input is completed.

16. The method according to claim 10, wherein the exclusion management step includes a step of permitting, when an input from one input unit of the external terminal is generated as a result of monitoring in the monitoring step, an input from an input unit of the external terminal other than that input unit, and inhibiting an input from the input unit of the information processing apparatus until the generated input is completed.

17. The method according to claim 10, wherein each of the input units of the external terminal and the information processing apparatus comprises a keyboard, and the exclusion management step includes a step of executing, when a key input from one of the keyboards of the external terminal and the information processing apparatus is generated as a result of monitoring in the monitoring step, exclusion control that inhibits an input from the other keyboard until that key input is completed.

18. The method according to claim 10, wherein each of the input units of the external terminal and the information processing apparatus comprises a mouse, and the exclusion management step includes a step of executing, when a mouse input from one of the mice of the external terminal and the information processing apparatus is generated as a result of monitoring in the monitoring step, exclusion control that inhibits an input from the other mouse until that mouse input is completed.

19. A program stored on a computer-readable storage medium for making a computer function as an information processing apparatus, which is connected to an external terminal having an input unit for inputting operation via a network, and said information processing apparatus has its own input unit, comprising:

a program code of an external terminal input step of receiving input from the input unit of said external terminal;

a program code of a monitoring step of monitoring an input received by said external terminal input means, and an input from the input unit of the information processing apparatus; and a program code of an exclusion management step of executing, when an input of a given input unit is generated as a result of monitoring in the monitoring step, exclusion control that inhibits an input from another input unit until the input has measured a predetermined period of time after the input is completed.

* * * * *